United States Patent
Haneda

(10) Patent No.: US 6,483,602 B1
(45) Date of Patent: Nov. 19, 2002

(54) LABORATORY SYSTEM, METHOD OF CONTROLLING OPERATION THEREOF, PLAYBACK APPARATUS AND METHOD, FILM IMAGE MANAGEMENT METHOD, IMAGE DATA COPYING SYSTEM AND METHOD OF COPYING IMAGE DATA

(75) Inventor: Norihisa Haneda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/044,121

(22) Filed: Mar. 19, 1998

Related U.S. Application Data

(62) Division of application No. 08/508,614, filed on Jul. 28, 1995, now Pat. No. 6,243,171.

(30) Foreign Application Priority Data

| Jul. 29, 1994 | (JP) | 6-196213 |
| Jul. 29, 1994 | (JP) | 6-196214 |
| Sep. 30, 1994 | (JP) | 6-261678 |
| Jun. 29, 1995 | (JP) | 7-185012 |

(51) Int. Cl.[7] .............................................. G06K 15/00
(52) U.S. Cl. ....................... 358/1.16; 358/404; 358/444
(58) Field of Search .................... 358/487, 468, 358/400, 404, 527, 444, 453, 441, 1.16, 1.9, 1.18

(56) References Cited

U.S. PATENT DOCUMENTS

| 5,313,572 A | * | 5/1994 | Yamamoto | 395/145 |
| 5,440,401 A | * | 8/1995 | Parulski | 358/342 |
| 5,477,353 A | * | 12/1995 | Yamasaki | 358/487 |
| 5,713,022 A | * | 1/1998 | Yamashita | 395/615 |
| 5,813,017 A | * | 9/1998 | Morris | 707/204 |
| 6,011,897 A | * | 1/2000 | Koyama | 386/95 |

* cited by examiner

*Primary Examiner*—Jerome Grant, II
(74) *Attorney, Agent, or Firm*—Birch, Stewart, Kolasch & Birch, LLP

(57) ABSTRACT

Developed images are captured by image sensing and converted to original digital image data, which is used to represent the developed images. The original digital image data is converted to reduced digital image data representing images that are reduced in size. The reduced digital image data is stored on a user's disk, and the original digital image data is stored on a laboratory recording medium together with an identification code identifying the roll of film. The identification code is applied to the film and to the user's disk on which the reduced digital image data has been stored. The original digital image data is read out of the laboratory recording medium and photographs of the images represented by this data are printed. The identification code may be recorded on the user's disk instead of being applied thereto. A program (hypertext) for reproducing the images is also stored on the user's disk.

23 Claims, 67 Drawing Sheets

EVENT CODE = 01

EVENT CODE = 03

EVENT CODE = 05

EVENT CODE = 99

VIDEO COMPONENT NO. 0

IMAGE #1 + VIDEO COMPONENT NO. 1

IMAGE #2 + VIDEO COMPONENT NO. 2

IMAGE #n + VIDEO COMPONENT NO. m (n = m)

IMAGE #n +
VIDEO COMPONENT
NO. m+1

Fig. 51

SCRIPT FILE

PLAY   Audio   Cast   (0)

PLAY   Image   Cast   (0)

PLAY   Image   Cast   (1)

PLAY   Audio   Cast   (1)

PLAY   Audio   Cast   (2)

PLAY   Image   Cast   (2)

. . . . . . .

PLAY   Audio   Cast   (j+1)

PLAY   Image   Cast   (j+1)

IMAGE CAST

| HEADER |
| ALBUM NAME |
| (MERGED-TYPE) IMAGE FILE NAME |
| MERGE INFORMATION TYPE OF IMAGE TO BE (MERGED AND MERGING METHOD) |
| TRANSITION TIME (DISPLAY TIME) |
| IMAGE APPEARANCE EFFECT |
| IMAGE APPEARANCE EFFECT TIME |
| IMAGE RESOLUTION |
| POSITION INFORMATION |
| ENLARGEMENT MAGNIFICATION |
| ⋮ |

Fig. 53

AUDIO CAST

| HEADER |
|---|
| AUDIO COMPONENT NO. |
| TRANSITION TIME |

INDEX FILE

ALBUM
(IMAGE FILE)

CLASS FILE

SUB-CLASS FILE

INDEX FILE

LABORATORY SYSTEM, METHOD OF CONTROLLING OPERATION THEREOF, PLAYBACK APPARATUS AND METHOD, FILM IMAGE MANAGEMENT METHOD, IMAGE DATA COPYING SYSTEM AND METHOD OF COPYING IMAGE DATA

This application is divisional of copending application Ser. No. 08/508,614 now U.S. Pat. No. 6,243,171, filed on Jul. 28, 1995, the entire contents of which are hereby incorporated by reference.

BACKGROUND OF THE INVENTION

1. Field of the Invention

This invention relates to a laboratory system well suited for use in photographic film processing laboratories (inclusive of photography stores capable of providing developing and printing services), a method of controlling the operation of such a system, a playback apparatus primarily placed in the home of the customer (user), a method of playback using this apparatus, and a film image management method using this system and apparatus.

The invention further relates to a copying system and method for transferring image data from a "source" recording medium to another recording medium or "destination" recording medium and recording the image data on the destination recording medium. The source recording medium may be a photographic film, a semiconductor memory on which image data read from a photographic film has been stored, a memory card (or memory cartridge) on which image data obtained by photography using a digital still-video camera has been stored, or a recording medium (optical disk, magneto-optical disk, magnetic disk, optical tape, magnetic tape, etc.) on which an image file (a collection of image data representing a plurality of images) has been stored. The destination recording medium may be an optical disk, magneto-optical disk, magnetic disk, optical tape, magnetic tape, semiconductor memory, etc.

2. Description of the Prior Art

In order to obtain developed photographic film and prints, an ordinary user takes exposed undeveloped film to a processing laboratory and the laboratory develop the film and print the images from the developed film on photographic paper to produce photographs. The user takes the developed film and printed photographs home from the laboratory.

Depending upon user preference, the film and photographs are kept as by being pasted in an album or placed in bags or envelopes in a specific order or without being put in order.

If extra prints are required, the user takes the film to the laboratory and informs the operator of the laboratory of the frame numbers of the extra prints desired, the number of prints of each frame and various other conditions.

Thus, management of film and photographs generally is a manual operation performed by both the user and laboratory and is a very troublesome task. Since frames to be printed for extra copies must be selected while looking at the film, the ordering of extra prints also is a troublesome task.

It is contemplated to use a film scanner to read the image of each frame recorded on developed photographic film (negative film or positive film), convert the image of each frame to digital image data and record the digital image data on a disk-like recording medium (such as an optical disk or magnetic disk). The disk-like recording medium can be played back by a player in the possession of (or capable of being utilized by) the user. Configurations presently being contemplated include one (automatic playback) in which images represented by image data that has been recorded on a disk-like recording medium are simply displayed on a display device in the order in which the images were recorded, and one (manual playback) in which the images of frames designated by the user are displayed on a display device.

New photographic film having elongated band-shaped information recording zones each comprising a transparent magnetic material has been studied. Information (IX1) pertaining to each roll of film and information (IX2) pertaining to each frame on the film can be recorded on the photographic film. Sufficient consideration has not yet been given to how such information may be fully exploited.

Conventional photographic film is available in a 12-, 24- and 36-exposure format, by way of example. Photographs often are preserved in units of the number of frames on the film (or in units of the number of rolls of film). For instance, photographs of field days, summer festivals and family excursions are taken on one or several rolls of film. Accordingly, photographs often are managed film by film.

Similarly, with regard to a memory card loaded in a digital still-video camera in order to record digital image data representing images captured by the camera, the image data often is managed in memory-card units, namely card by card.

The management of image data that has been recorded on other portable recording media (floppy disks, etc.) also often is performed in units of the recording media. In a case where images of a plurality of image files have been saved on one recording medium, the recording medium would be managed as a large classification unit and the image files would be managed as small classification units.

An image is based upon the sense of sight and is recorded in the human brain as one type of pattern. The pattern is remembered by a human being with the event (the aforesaid field day, summer festival, etc.) that gave rise to the image serving as a key. The reason for this is that one or a plurality of portable image recording media (films, memory cards and other media) are created for each event. Accordingly, by adopting a medium on which an image has been recorded first as the unit of image management, retrieval at a later date is facilitated.

It is required that an image or image data that has been stored on such a portable recording medium be preserved by being copied to a recording medium having a larger capacity. The purpose of this is to keep the image data from a plurality of recording media at a single location.

SUMMARY OF THE INVENTION

An object of the present invention is to provide a system, apparatus and method for facilitating the arrangement of film images and the retrieval of films or frames for the purpose of making extra prints of the images, and for simplifying the ordering of extra copies.

Another object of the present invention is to provide a laboratory system in which information that has been recorded on the information recording zones of a new photographic film can be recorded on a recording medium together with the images from the new photographic film, as well as to a method of controlling the operation of this system.

A further object of the present invention is to provide an apparatus and method for producing an impressive slide-show program using a recording medium on which information in information recording zones and image data have been recorded.

Still another object of the present invention is to provide an apparatus and method for playing back a slide-show program that has been produced.

Yet another object of the present invention is to provide a system and method for copying the image data of an initial recording medium to another recording medium while maintaining intact the unity of the image data on the initial recording medium and in a form in which subsequent retrieval may be performed with ease.

A method of managing film images according to the present invention comprises the steps of capturing an image from a film that has been developed to thereby convert the image to original digital image data representing the image, converting the original digital image data to reduced digital image data representing a reduced image, storing the reduced digital image data on a user's recording medium, storing the original digital image data on a laboratory's recording medium together. with an identification code of the film, and applying the identification code to the film and to the user's recording medium on which the reduced digital image data has been stored.

This management method preferably is implemented at a processing laboratory using a laboratory system described later. The term "laboratory" is meant to cover all types of processing establishments capable of implementing the management method set forth above. Establishments capable of implementing the management method, regardless of whether they are photography stores or shops for performing development, are considered as being laboratories.

The above-described management method would most likely be implemented at a laboratory after the undeveloped film is developed. However, it is possible to apply the management method even to film that has been developed in the past.

The film and the user's recording medium to which the identification code has been applied are delivered to the user (customer).

The application of the identification code to the film generally would be performed by affixing a label to the film (inclusive of the film sheath or case), which film would have a code (a code, not limited to a bar code, which includes numerals, symbols or characters, etc., readable by a human being) representing the identification code printed on it.

The application of the identification code to the user's recording medium would be performed by affixing a label, on which the code representing the identification code has been printed, to the user's recording medium (the case or cartridge), as in the manner of the film, or by writing the identification code to the user's recording medium.

Preferably, frame numbers (the identification numbers of the frames) are recorded on the user's recording medium and laboratory's recording medium in correspondence with the image data of the respective frames of the film.

In accordance with the present invention, identical identification codes are applied to the film and to the user's recording medium, which are in the possession of the user. This makes it possible to ascertain the corresponding relationship between them. Since a number of film rolls of image data generally can be stored on the user's recording medium, the user is capable of loading the user's recording medium in a playback apparatus so that images represented by image data stored on the user's recording medium can be viewed. Accordingly, it is unnecessary to look at the film directly.

If frames for which extra copies are desired are selected when extra prints of photographs are requested, this can also be performed by utilizing the images displayed on the display device of the playback apparatus.

An identification code identical with that of the film and user's recording medium in the possession of the user is stored also on the laboratory's recording medium, which is preserved at the laboratory, in correspondence with the original image data. When the user request extra prints, prints of photographs can be made using the original digital image data, which has been stored on the laboratory's recording medium, even if the user does not bring the film to the laboratory.

The user's recording medium includes such media as a magnetic disk, magneto-optical disk, magnetic disk and memory card (semiconductor memory) (also referred to as a memory cartridge). An arrangement may be adopted in which the original digital image data is recorded on the user's recording medium rather than the reduced digital image data.

Image data recorded on the user's recording medium and laboratory's recording medium may also be subjected to data compression processing or encoding processing.

The laboratory's recording medium includes media such as an optical disk, magneto-optical disk and magnetic disk.

The user is capable of ordering extra prints by storing order information for this purpose on the user's recording medium. In such case a playback apparatus having an ordering function described later would be utilized to store the order data on the user's recording medium. When the playback apparatus is used, the order data can be transmitted to the laboratory system via a communication line (a public telephone line, for example). Since only the order data (or the order data together with reduced image data) is transmitted, the time needed for transmission is much shorter than that which would be required to transmit the original digital image data. Further, the user need not make a call on the laboratory.

It is preferred that parameter data relating to the characteristics of the original digital image data be stored on at least one of the user's recording medium and laboratory's recording medium. The parameter data is used in processing for making extra prints. Since the characteristics of the image data are quantified, photographs always having the same properties can be printed.

The laboratory system according to the present invention is ideal for use in executing the management method described above.

A laboratory system according to the present invention comprises a film reader for converting an image from a film that has been developed to original digital image data representing the image, a recording unit for a user's recording medium for storing, on a user's recording medium, the original digital image data obtained by the film reader or reduced digital image data obtained by reducing the original digital image data, a laboratory recording unit for storing the original digital image data, which has been obtained by the film reader, on a laboratory's recording medium in correspondence with an identification code of the film, and a label issuing unit for issuing a label, which represents the identification code, affixed to at least the film.

In an embodiment of the invention, the recording unit for the user's recording medium records the identification code on the user's recording medium in correspondence with the image data.

In a preferred embodiment, the recording unit for the user's recording medium records the image data of each frame of the film on the user's recording medium in correspondence with an identification number of the frame.

In another preferred embodiment, the recording unit for the user's recording medium records parameter data relating to characteristics of the image data on the user's recording medium in correspondence with the image data.

In a preferred embodiment of the laboratory recording unit, the unit stores the image data of each frame of the film on the laboratory's recording medium in correspondence with an identification number of the frame.

In another preferred embodiment of the laboratory recording unit, the unit stores parameter data relating to characteristics of the image data on the laboratory's recording medium in correspondence with the image data.

According to another embodiment, the label issuing unit further issues a label, which represents the identification code, affixed to the user's recording medium.

When appropriate, the laboratory system is provided with a photograph printer for printing an image represented by the original digital image data obtained by the film reader or read out of the laboratory's recording medium.

In one embodiment, the laboratory system is further provided with an input unit for designating the identification code and the frame identification number of image data to be printed recorded on the laboratory's recording medium.

In a preferred embodiment, the laboratory system is provided with a receiving unit for receiving order data designating the identification code and a frame identification number of image data to be printed recorded on the laboratory's recording medium. The image represented by image data designated by the received order data is printed by the photograph printer.

In a further preferred embodiment, the laboratory system is provided with a reader for reading, from the user's recording medium, order data designating the identification code and a frame identification number of image data to be printed recorded on the laboratory's recording medium, and a photograph printer for printing an image represented by the image data designated by the read order data.

The management method described above is performed automatically, semiautomatically or manually using the laboratory system.

A playback apparatus having an ordering function according to the present invention comprises a reader for reading, from the user's recording medium, image data that has been recorded in correspondence with an identification code of film and an identification number of a frame, a display device for displaying an image represented by the image data read by the reader, and an input unit for entering order data with regard to an image displayed on the display device.

In an embodiment, the reader records the order data, which has been entered by the input unit, on the user's recording medium.

In another embodiment, the playback apparatus is further provided with a communication device for transmitting the order data entered by the input unit.

By using a playback apparatus of this kind, the user can order extra prints of a photograph via the user's recording medium or by communication.

In accordance with the film management method and laboratory system described above, a label representing an identification code is issued and the label is affixed to the film and, if necessary, to the user's recording medium.

If the user is merely to reproduce and enjoy image data that has been recorded on the user's recording medium or to order extra copies as needed upon referring to a reproduced image, with the printing of the extra copies being performed using the image data that has been stored on the laboratory's recording medium, then the identification codes need only be stored on the user's recording medium and laboratory's recording medium in association with the image data recorded on these media. The film may or may not be provided with an identification code.

A method of managing film images according to the invention applied to such a practical configuration comprises the steps of capturing an image from a film that has been developed to thereby convert the image to original digital image data representing the image, converting the original digital image data to reduced digital image data representing a reduced image, storing at least one of the original digital image data and reduced digital image data on a user's recording medium in association with an identification code of the film, and storing the original digital image data on a laboratory's recording medium in association with the identification code of the film.

A laboratory system according to the present invention applied to implement this film image management method comprises a film reader for converting an image from a film that has been developed to original digital image data representing the image, a recording unit for a user's recording medium for storing, on a user's recording medium in correspondence with an identification code of the film, at least one of the original digital image data obtained by the film reader and reduced digital image data obtained by reducing the original digital image data, and a laboratory recording unit for storing the original digital image data, which has been obtained by the film reader, on a laboratory's recording medium in correspondence with an identification code of the film.

Thus, image data representing film images can be kept by being stored on each of a user's recording medium and laboratory's recording medium in association with an identification code. The image data on the user's recording medium can be used in order that the user may play back the images and enjoy looking at them or for the purpose of ordering extra prints. In addition, the laboratory's recording medium is utilized to create prints in response to an order from a user.

To reproduce an image represented by image data stored on the user's recording medium or to order extra prints, it is desired that software for the purpose of controlling the playback apparatus or ordering apparatus be stored on the user's recording medium beforehand in association with the image data and identification code.

The present invention further provides a file-image management method and a laboratory system in which software for image playback is stored on the user's recording medium.

A method of managing film images according to the present invention comprises the steps of capturing an image from a film that has been developed to thereby convert the image to original digital image data representing the image, converting the original digital image data to reduced digital image data representing a reduced image, storing at least one of the original digital image data and reduced digital image data obtained by reducing the original digital image data, software including an instruction for reproducing the image data and an identification code of the film on a user's recording medium in associated form, and storing the original digital image data on a laboratory's recording medium in association with the identification code of the film.

A laboratory system according to this aspect of the present invention comprises a film reader for converting an image from a film that has been developed to original digital image data representing the image, a recording unit for a user's recording medium for storing at least one of the original digital image data obtained by the film reader and reduced digital image data obtained by reducing the original digital image data, software including an instruction for reproducing the image data and an identification code of the film on a user's recording medium in associated form, and a laboratory recording unit for storing the original digital image data, which has been obtained by the film reader, on a laboratory's recording medium in correspondence with an identification code of the film.

Since software for reproducing an image represented by the image data recorded on the user's recording medium is recorded on the user's recording medium, it is possible to reproduce the image in accordance with the software by loading the user's recording medium in the playback machine.

In a case where the items of original digital image data and reduced digital image data have been stored on the user's recording medium in correlated form, it is preferred that the software include an instruction for displaying an original image which corresponds to a designated reduced image after the reduced image represented by the reduced digital image data is displayed.

This makes possible a method of use in which a large number of reduced images may first be displayed on one screen, desired images are designated among these reduced images and the original images designated are selectively displayed.

By including in the software an instruction for processing relating to an order for the printing of images, an order for extra prints of desired images can be made in the playback apparatus.

One example of the above-mentioned software is hypertext. It will suffice to store a hypertext interpreting program in the playback apparatus (inclusive of a personal computer).

As mentioned above, a new type of photographic film having elongated band-shaped information recording zones each comprising a transparent magnetic material has recently been proposed. Information (film information) pertaining to each film and information (frame information) pertaining to each frame can be recorded on the photographic film. The present invention is applicable to such photographic film as well.

In a case where the present invention is applied to the above-mentioned new photographic film, the method of managing the film images comprises the steps of reading, from a developed film having a film-information recording zone and a frame-information recording zone that is provided for each frame, an image of each frame recorded on the film, producing digital image data representing the image, reading at least one of film information and frame information recorded in the film-information recording zone and frame-information recording zone, respectively, and recording at least one of the read film information and frame information and the image data on the user's recording medium in associated form.

In a laboratory system according to this aspect of the present invention, the film reader reads, from a developed film having a film-information recording zone and a frame-information recording zone that is provided for each frame, an image of each frame recorded on the film, produces digital image data representing the image, and reads at least one of film information and frame information recorded in the film-information recording zone and frame-information recording zone, respectively. At least one of the film information and frame information read by the film reader is recorded on the user's recording medium in association with the image data of the film by the recording unit for the user's recording medium.

At least one of the film information and frame information recorded on the user's recording medium is utilized effectively in image playback in the playback apparatus.

A laboratory system well suited for a new photographic film having information recording zones according to the present invention comprises a film reader for reading, from a developed film having a film-information recording zone and a frame-information recording zone that is provided for each frame, an image of each frame recorded on the film, producing digital image data representing the image and reading film information and frame information recorded in the film-information recording zone and frame-information recording zone, respectively, and a recording unit for a user's recording medium for recording the digital image data obtained by the frame reader, the film information and the frame information on a user's recording medium each in association with the digital image data of each frame with regard to the frame information of each frame.

The laboratory system referred to here is meant to cover not only a system installed in a processing laboratory for film development but also a system installed in the home of the user. In other words, the laboratory system should not necessarily be thought of in connection with a developing apparatus for photographic film. The term "laboratory system" is used merely to facilitate an understanding of the system by assuming that it will be utilized mainly in a processing laboratory.

A method of controlling operation of a laboratory system according to the present invention comprises the steps of reading, from a developed film having a film-information recording zone and a frame-information recording zone that is provided for each frame, an image of each frame recorded on the film, producing digital image data representing the image, reading film information and frame information recorded in the film-information recording zone and frame-information recording zone, respectively, and recording the digital image data obtained, the film information and the frame information on a user's recording medium each in association with the digital image data of each frame with regard to the frame information of each frame.

In accordance with the present invention, not only the images from the photographic film but also the film information (the information pertaining to each film) and the frame information (the information pertaining to each frame) recorded in the information recording zones of the film are read and recorded on the user's recording medium. The items of film information and frame information on the recording medium are put to effective use in image playback in a playback apparatus, described later.

The user's recording media are of two types. One type has resources recorded on it in advance. The resources include at least one of a video component and an audio component used when an image represented by digital image data is reproduced. The other type has no such resources recorded on it. In the latter case, a resource which includes at least one of a video component and an audio component, and which corresponds to the above-mentioned film information, is recorded on the user's recording medium by the laboratory system.

The video component mentioned here is image data which, alone or in combination with an image obtained from the film, is used to provide a more desirable, clearer, more impressive and more attractive picture. The audio component is data representing sound (music, narration, sound effects, etc.) played when images are displayed.

In the presentation of a program (slide show), in principle the video components are associated with film images in one-to-one correspondence. However, audio components need not necessarily have one-to-one correspondence with film images.

Since resources which include at least the video component or the audio component are recorded on the user's recording medium, a program (slide show) can be created using these resources when film images are played back.

Though the details of program (slide show) creation will be given later in the section on the playback apparatus, the program may be produced by the laboratory system.

In a preferred embodiment of the invention, the digital image data is meant to cover data obtained by reducing this image data. Reduced image data is useful when grasping all of the images that have been recorded on the user's recording medium or retrieving an image.

A playback apparatus according to the present invention comprises means for verifying at least the presence of a group of image data and the presence of resources, associated with the group of image data by first information, on a recording medium on which have been recorded the group of image information (which corresponds to image data on one roll of film) comprising a plurality of frames of image data, the first information (which corresponds to the above-mentioned film information) relating to the group of image data, second information (which corresponds to the above-mentioned frame information) relating to the image of each frame, and resources which include at least one of a video component and an audio component used when the group of image data is reproduced, and slide-show program creating means for creating slide-show information relating to playback sequence and to a combination of images and resources when presence of the group of image data and of the resources has been verified, and storing the slide-show information on the recording medium.

A playback method according to the present invention comprises the steps of verifying at least the presence of a group of image data and the presence of resources, associated with the group of image data by first information, on a recording medium (which corresponds to the user's recording medium) on which have been recorded the group of image information comprising a plurality of frames of image data, the first information relating to the group of image data, second information relating to the image of each frame, and resources which include at least one of a video component and an audio component used when the group of image data is played back, and creating slide-show information relating to playback sequence and to a combination of images and the resources when presence of the group of image data and of the resources has been verified, and storing the slide-show information on the recording medium.

The playback apparatus and playback method can also be referred to as a program (e.g., slide show) creating apparatus and program creating method.

When a plurality of groups of image data are present on the recording medium, a group for the purpose of creating a slide show would be selected from these groups.

In the simplest case, the creation of the slide show show is implemented by a predetermined combination in a predetermined sequence. However, it can be so arranged that the sequence or combination is be designated or altered in conformity with user preference.

Preferably, data to be reproduced at the start of a slide show is included in the video resource and in the audio resource.

Playback of images is carried out in accordance with the slide-show program thus created.

More specifically, the playback apparatus according to the present invention further comprises reading means for reading the image data and at least the video component, which has been combined with this image data by combination information included in the slide-show information, out of the recording medium in accordance with the sequence included in the slide-show information, means for mixing the image data and video component that have been read out, and means for displaying the image represented by the image data mixed.

The playback apparatus preferably is further provided with means for reading out the audio component in accordance with the slide-show information and reproducing the audio represented by the audio component.

The playback apparatus preferably is further provided with means for generating a character image represented by the second information, and means for mixing and displaying the character image generated and the image corresponding thereto.

Thus, effective utilization is made of the film information (first information) and the frame information (second information) recorded on the photographic film so that film images can be played back as a slide show in line with user preference in a form that can be enjoyed by the user.

If necessary, or in conformity with user preference, at least one of an additional video component and an additional audio component is entered, and the entered additional video component or audio component is recorded on the recording medium upon attaching an identification code thereto. The user is capable of utilizing the additional video component or additional audio component in creation of the slide show.

In a preferred embodiment, a printer is connected to the playback apparatus. By employing the printer, the user is capable of creating photographs of desired images that are being displayed. Preferably, the displayed images are displayed continuously for as long as possible. To this end, it is preferred that the user be capable of setting the changeover time (display time) of the displayed images at will, or that the changeover time be set automatically, without relation to the slide-show information when the printing mode has been set.

A system for copying image data according to the present invention comprises an image data reader for reading image data from a copy-source recording medium image by image, an image data writing unit for writing data, which includes the image data read out of the copy-source recording medium, to a copy-destination recording medium, and a control unit for creating, image by image, reduced image data representing an image obtained by reducing an image represented by the image data read out of the copy-source recording medium, and for controlling the image data writing unit so as to write the data in the copy-destination recording medium in such a manner that an index file, which includes the reduced image data that has been created, is formed in units of the copy-source recording medium, and in such a manner that an image file, which includes the image data that has been read out of the copy-source recording medium, is formed in units of the copy-source recording medium in a manner associated with the index file.

A method of copying image data according to the present invention comprises the steps of reading image data from a copy-source recording medium image by image, creating, image by image, reduced image data representing a reduced image obtained by reducing an image represented by the image data read out of the copy-source recording medium, and recording an image file, which includes the image data that has been read out of the copy-destination recording medium, and an index file, which includes the reduced image data that has been created, on the copy-destination recording medium in a manner associated with each other and in units of the copy-source recording medium.

Preferably, image data (or reduced image data) of a representative image standing for the copy-source recording medium is recorded on the copy-destination recording medium in association with the image file or index file.

In a case where the copy-source recording medium includes a plurality of image files and the image files form one set, these image files may be written on the copy-destination recording medium as a single unit.

In order that a copy-source recording medium will serve as a unit, the image data that has been recorded on this recording medium is recorded on the copy-destination recording medium. Since the original medium constitutes a single set, classification can be performed in units of events and in units of time (duration or period). This facilitates the retrieval of images on the copy-destination recording medium.

On the basis of the image data read out of the copy-source recording medium, reduced image data is created and the reduced image data also is recorded on the copy-destination recording medium. Retrieval of the image data can be carried out using the reduced image data and a large number of reduced images can be displayed on the display device simultaneously. Retrieval is facilitated in this respect as well.

Storing the representative image data also facilitates searching of the copy-source recording medium.

It goes without saying that not only are the image file and index file that are formed on the copy-destination recording medium in units of the copy-source recording medium recorded at a recording location having unity but it is also permissible to associate the image data or reduced image data by the logical structure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 51 is a diagram showing an example of script file;

FIG. 52 is a diagram showing the details of an image cast;

FIG. 53 is a diagram showing the content of an audio cast;

DESCRIPTION OF THE PREFERRED EMBODIMENTS (1) Laboratory System (first aspect)

Figure 1:
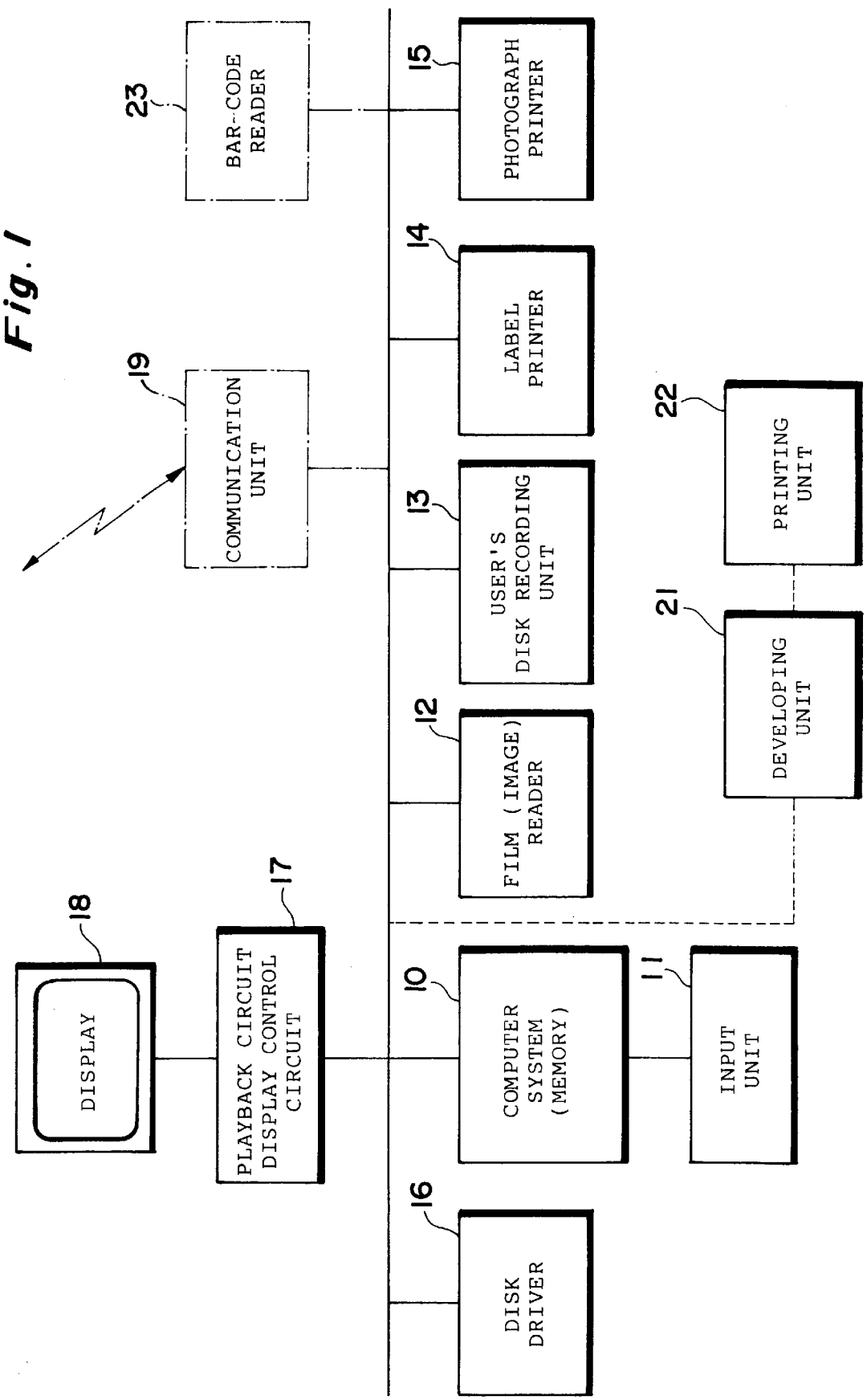
FIG. 1 is a block diagram showing a laboratory system (first aspect)

FIG. 1 illustrates a laboratory system installed at a processing laboratory (hereinafter referred to simply as a "laboratory"), such as a film developing establishment (store) or photography shop, which develops film and prints on photographic paper or makes extra prints.

The laboratory is provided with a developing unit 21 for developing undeveloped film (negative or positive) dropped off by a customer (user), and a printing unit 22 for printing the images, which appear on the developed film, on the printing paper, or for making extra copies of prints. The developing unit 21 and printing unit 22 may also be of the type integrated to construct a single device. In any case, the developing unit 21 and printing unit 22 are well known. The units 21, 22 are electrically connected to a computer system 10 of the laboratory system when required. The units 21, 22 may or may not be considered as being included in the laboratory system.

The laboratory system includes the computer system 10 to which an input unit 11, a film (image) reader 12, a recording unit 13 for a user's disk, a label printer 14, a photograph printer 15, a disk drive 16 and a playback and display control circuit 17 are connected by a bus, cable or serial communication line. A communication unit 19 is connected to the computer system 10 as necessary. A display unit 18 (e.g., a CRT display device, liquid-crystal display device, etc.) is connected to the playback and display control circuit 17.

The input unit 11 includes a keyboard and a mouse and is used to enter various data and commands applied to the computer system 10 or the various units 12~17 connected to the computer system. The input unit 11 is operated by an operator of the laboratory system (an employee at the developing establishment) in order to make a selection on a menu or designate an image displayed on the display screen on the display unit 18.

The computer system 10 controls the units 12~17 individually and supervises overall control of the laboratory system. The computer system 10 generates an identification code described later. The computer system 10 includes a memory (a semiconductor memory, floppy disc, hard disc, etc.) and other peripheral devices.

The film reader 12 reads images of frames appearing on the developed film and outputs digital image data representing the read images. The film reader 12 is constituted by an image sensing unit which includes a light source for illuminating the film, an image-sensing optical system (inclusive of a diaphragm, shutter and zoom lens as necessary) and a solid-state image sensing element such as a CCD (which may be a line sensor), a signal processing circuit (inclusive of circuits selected from among a white balance circuit, gamma correction circuit and negative/positive reversal circuit, etc., as required) for processing a video signal obtained from the image sensing unit (or digital image data that has been subjected to an A/D conversion), an A/D converter circuit, etc. The digital image data outputted by the film reader 12 shall be referred to as original digital image data. The original digital image data is stored temporarily in a memory within the computer system 10. The original digital image data is assigned an image identification number for each frame. The resolution (number of pixels and number of gray levels) of the original digital image data is decided in dependence upon the degree required for photographic printing. (Examples of the numbers of pixels are 3072×2048, 2048×1536, etc.).

The recording unit 13 for the user's disk records the original digital image data or reduced digital image data (index image data) on the user's disk (a portable recording medium). The reduced digital image data is image data obtained from the original digital image data by processing for thinning out pixels or processing for taking an average in units of a plurality of adjacent pixels. (Such processing is referred to as "reduction processing".) The reduced digital image data represents an image obtained by reducing an original image in size. The original digital image data or reduced digital image data is recorded on the user's disk after being subjected to data compression as needed.

Accordingly, the recording unit 13 includes a pixel thinning-out circuit (averaging circuit) and a data compression (decompression) circuit as necessary. The pixel thinning-out processing (averaging processing) and data compression (decompression) processing can be implemented by software in the recording unit 13 or computer system 10.

Typical examples of the user's disk are an optical disk (a so-called compact disk), a magneto-optical disk and a magnetic disk (floppy disk).

When the recording unit 13 for the user's disk records the original digital image data obtained from one film or the reduced digital image data produced from the original image data on the user's disk, an identification code specific to the film is recorded on the user's disk. The identification code basically is for identifying the film but preferably should be capable of clearly indicating which laboratory (or dealer) and which laboratory system processed the film. The identification code preferably includes one or a plurality of the following items:

Country Number (a number which indicates the country where the film was developed);

District Number (when a country is divided into a plurality of districts, this number indicates the district where the film was developed);

Store Number (the serial number of the laboratory where the film was developed; inclusive of a shop or simple dealer at which the laboratory system is not installed; numbers may be serial numbers within the aforesaid districts);

Date and Time (includes the day, time, month and year of development);

Processing Machine Number (serial number of the laboratory system or apparatus constructing the system; when a plurality of units are concerned, such as the developing unit, printing unit, recording unit for the user's disk and photograph printer the numbers of all of these units may be included);

Processing Serial Number (a serial number which indicates the sequence of processing in the laboratory system; the number may start from the beginning every day or may be assigned on a per-month basis);

Film Number (a number for identifying the film; when several rolls of film have been processed for a single person, the number can be substituted by the processing serial number); and Miscellaneous (a number, symbol, code or figure for other identification purposes).

In a configuration in which a label showing the identification code is affixed to the film (inclusive of the sheath and case), as will be illustrated later, the identification code need not be recorded on the user's disk.

When image data of one film is recorded, parameter data relating to this image data preferably is recorded on the user's disk. The parameter data preferably is set for each frame but may be set for each film. The parameter data, which is a constant or the like used when the images on the film are sensed and to obtain the corresponding digital image data, includes a gamma value, brightness (offset), resolution, RGB correction coefficient and trimming information, etc. The presence of the parameters makes it possible maintain a uniform quality at all times when photographs are printed based upon the digital image data at a later date.

It is preferred that at least one program from among a playback program, order program and communication program also be recorded on the user's disk. These programs are loaded in a playback machine (an order machine or a playback machine having an order function; see FIG. 2), described later, in the possession of the user. The playback program causes the playback machine to reproduce the image data that has been recorded on the user's disk. The order program causes the playback machine to accept entered order data and to record the order data on the user's disk. The communication program is for controlling a communication operation in the playback machine when the order data is transmitted from the playback machine to the laboratory system. A user's disk on which these programs have been recorded in advance can also be used.

The label printer 14 is for printing labels on which the above-mentioned identification codes are indicated. An identification code is printed on a label upon being converted to, say, a bar code.

Two labels are created, one for the film and one for user's disk. These labels may be of different sizes but the identification codes shown on the labels are identical. The label for the film is affixed to the film (inclusive of the film sheath, film case and magazine), and the label for the user's disk is affixed to the user's disk (inclusive of a disk cassette and disk cartridge).

Figure 3:
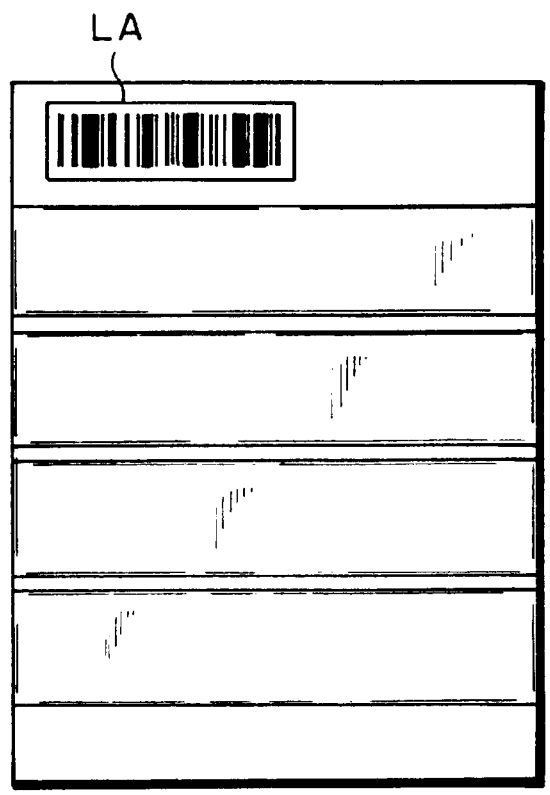
FIG. 3 is a diagram showing the manner in which an identification code label is affixed to a film.
Figure 4:
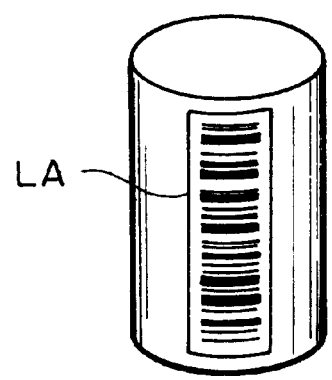
FIG. 4 is a diagram showing the manner in which an identification code label is affixed to a film case.

FIG. 3 illustrates the manner in which a film label LA is affixed to a film sheath (or negative sleeve). FIG. 4 illustrates the manner in which the film label is affixed to a cylindrical film case.

Figure 5:
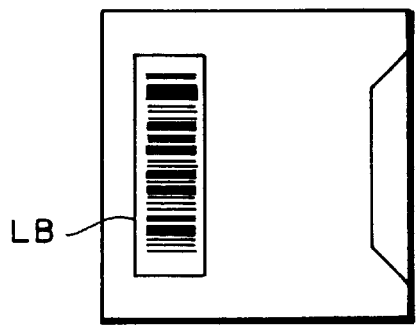
FIGS. 5 and 6 are diagrams showing the manner in which identification code labels are affixed to disk cases.

FIG. 5 illustrates the manner in which a label LB for a user's disk is affixed to a disk case.

Figure 6:
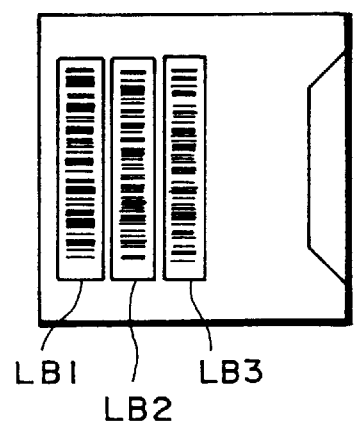

When digital images from several rolls of film have been recorded on the user's disk (simultaneously or on different dates), labels LB1, LB2, LB3 (in case of three rolls of film) created for respective ones of the film rolls are affixed to the disk case of the user's disk, as shown in FIG. 6.

Figure 7:
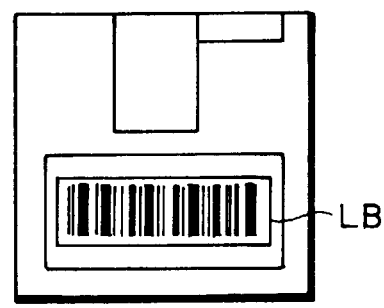
FIG. 7 is a diagram showing the manner in which an identification code label is affixed to a disk cartridge.

FIG. 7 illustrates the manner in which the label LB for the user's disk is affixed to disk cartridge.

Figure 8:
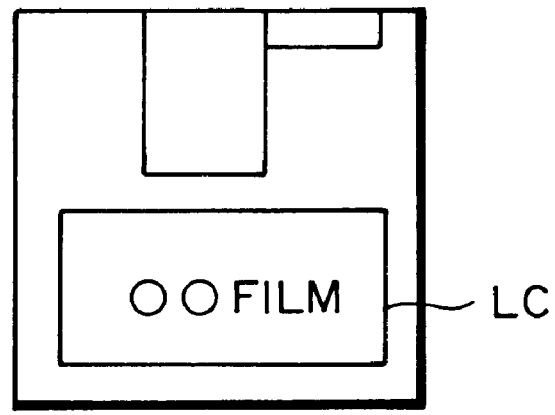
FIG. 8 is a diagram showing the manner in which an identification code label of a different form is affixed to a disk cartridge.
Figure 9:
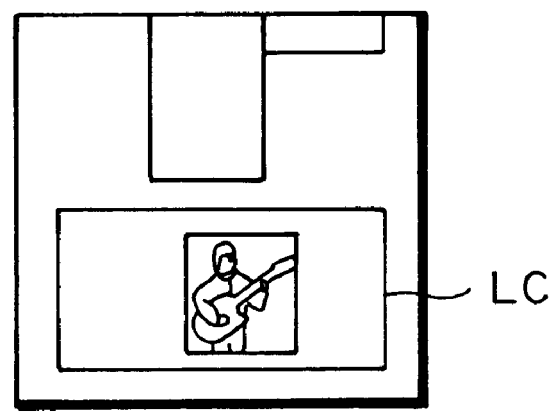
FIG. 9 is a diagram showing the manner in which an identification code label of a different form is affixed to a disk cartridge.

In a case where a bar code is difficult to understand for human beings, it will suffice to create a label on which characters, symbols and figures that are easy for human beings to comprehend are printed. FIG. 8 illustrates such a label LC on which on which the name (or logo) of the film manufacturing company or the name (or logo) of the laboratory has been printed. FIG. 9 shows the label LC which, in this case, has an illustration printed on it. It is preferred that a representative picture of the film be reduced in size and printed as the illustration. It is desirable that the label LC be used in conjunction with the label LB mentioned above. It goes without saying that the identification code can be expressed using a code other than a bar code or using numerals, character and symbols capable of being read by human beings In a case where the label LB showing the identification code has thus been affixed to the user's disk, the identification code need not be recorded on the user's disk.

In such case the laboratory system is preferably provided with a bar-code reader 23 to read the bar code on the label that has been affixed to the user's disk (and film). The bar code read by the bar-code reader 23 is applied to the computer system 10, where the identification code is decoded.

Of the original digital image data that has been recorded on the disk for the laboratory (hereinafter referred to as the "lab's disk"), the photograph printer (hard copy unit) 15 uses image data that has been designated (image data for which extra prints have been ordered) to print the images represented by this original digital image data on paper. The prints produced are extra copies of photographs.

After film has been developed, the images represented on this developed film may be printed on paper by the photograph printer 15 to create a printed photograph. In this case it is possible to dispense with the printing unit 22. In other words, the original digital image data obtained by reading film using the film reader 12 is applied to the photograph printer 15 (after being stored temporarily in the memory of the computer system 10 if necessary).

The disk drive 16 records the original digital image data, which has been outputted by the film reader 12, on the lab's disk (after being stored temporarily in the memory of the computer system 10 if necessary) and reads designated original digital image data from the lab's disk. The original digital image data that has been read out is applied to the photograph printer 15 in order to be printed, as described above. Examples of the lab's disk are a hard disk, an optical disk and a magneto-optical disk, etc. A magnetic tape may be used instead of the laboratory disk.

The original digital image data outputted by the film reader 12 preferably is recorded on the lab's disk in single film units. At such time the above-mentioned identification code produced in association with the film also is recorded on the lab's disk in correspondence with the original digital image data. Thus, the same identification code is assigned to the film, to the image data produced by reading the film and then recorded on the user's disk, and to the image data obtained by reading the film and then recorded on the lab's disk. This makes clear the fact that identical images are represented.

If required, the aforementioned parameter data associated with each film or with each frame is recorded on the lab's disk in correspondence with the original digital image data.

An arrangement may be adopted in which the original digital image data is subjected to data compression and the compressed image data is stored on the lab's disk. In such case the data compression (decompression) processing would be executed in the computer system 10 or a data compression/decompression circuit (which may be used in combination with the user's disk recording unit 13) would be provided.

If the film is full color film, it goes without saying that the original digital image data and reduced digital image data is color image data. The color image data may be R, G, B data, a combination of luminance data and color-difference data or NTSC data.

The playback and display control circuit 17 and the display unit 18 are used in displaying a menu screen and in displaying images when the laboratory system is operated by an operator. With regard to the display of images, an image represented by the image data outputted by the film reader 12, an image represented by the reduced image data that is to be written to the user's disk or that has been read from the user's disk, and an image represented by the original image data read out of the lab's disk are displayed on the display screen of the display unit 18 as necessary.

The communication unit 19 is provided when necessary. The communication unit 19 communicates with a playback machine, described later, used by the user, via a public telephone line (inclusive of an ISDN). The communication unit 19 is used mainly to receive order data (described later in detail) transmitted from the playback machine.

Telephone numbers are assigned to the playback machine and laboratory system, just as telephone numbers are assigned to a telephone or facsimile machine, etc. These are connected selectively by a call using the telephone number. A management center which acts as a relay station is provided as necessary. A plurality of laboratory systems are connected to the management center via a leased line or public telephone line, and playback machines are connected to the laboratory systems via the management center.

(2) Playback Machine (first aspect)

Figure 2:
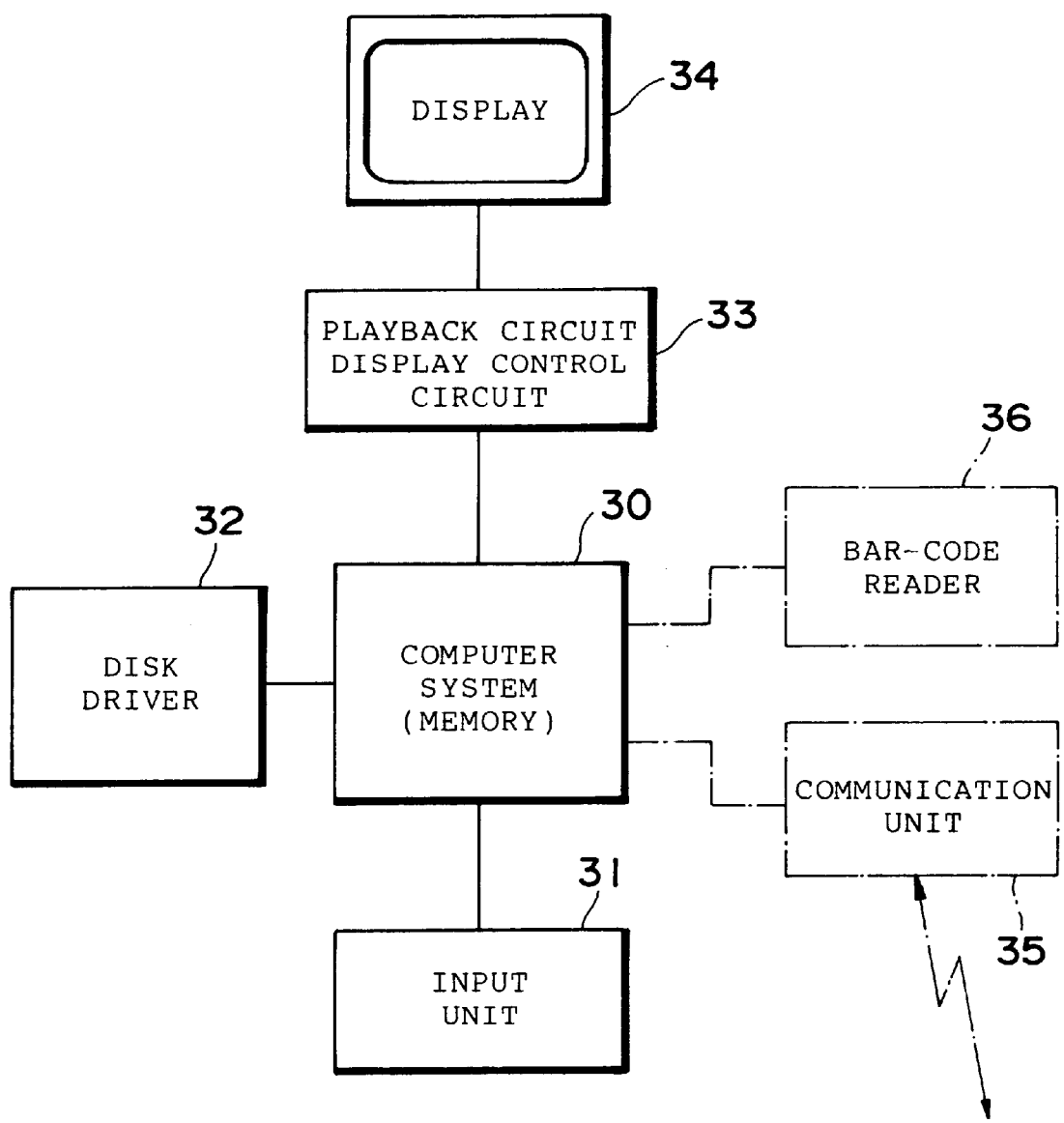
FIG. 2 is a block diagram showing a playback machine (first aspect)

FIG. 2 illustrates the electrical configuration of the playback machine (apparatus) utilized by the user. Most commonly the playback machine is provided in the user's home. The playback machine would also be installed at the user's company, at a company in a line of business which deals with large numbers of photographs, at a dealer which develops and prints photographs, at a photography store and at a laboratory.

In one embodiment, the playback machine (apparatus) is a simple playback machine which displays reduced images, represented by the reduced digital image data recorded on the user's disk, on the display screen of the display unit. In another embodiment, the playback machine has a function for entering order data, which is for ordering extra prints, in addition to the function for displaying the reduced images. In such case the playback machine is referred to as a playback machine having an order function or simply as an order machine (apparatus). In the description that follows, "playback machine" is used as the generic term.

The order data includes a number (the processing serial number or film number in the above-mentioned identification code) specifying the film bearing the images for which extra copies are desired among the image data that has been recorded on the user's disk, the identification numbers of the frames on the film, the number of extra copies desired, the size (or magnification) of the extra copies and information relating to trimming. The order data is recorded on the user's disk in one mode. In another mode, the order data is transmitted to the laboratory system via the communication unit.

In case of the simple playback machine, the order data (information) for extra prints would be expressed clearly by being written directly on memo paper, a sales slip or on the film sheath.

The playback machine also includes a computer system 30 having peripheral equipment such as a memory. An input unit 31, a disk drive 32 and a playback and display control circuit 33 are connected to the computer system 30. A communication unit 35 and a bar-code reader 36 are connected to the computer system 30 when necessary. A display unit 34 (a CRT display device, liquid-crystal display device, etc.) is connected to the playback and display control circuit 33.

The input unit 31 is used to make selections on a menu displayed on the display unit 34, enter commands, select images displayed on the display unit 34 and enter data which includes order data. The input unit 31 typically includes a keyboard and a mouse.

The disk driver 32 reads out the image data that has been recorded on the user's disk. The disk driver 32 is used in a case where the order data is recorded on the user's disk.

In a case where a playback program, order program or communication program has been recorded on the user's disk, the programs are read out of the user's disk by the disk driver 32, and the programs are loaded in the computer system 30, in response to a command from the computer system 30 when the latter is started. In accordance with the programs, the computer system 30 executes processing for image playback, acceptance of entered order data, recording of order data on the user's disk on transmission of the order data.

These programs may of course be incorporated in the computer system 30 in advance. In such case it is unnecessary to record the programs on the user's disk.

The playback and display control circuit 33 executes processing to display the reduced image data, which has been read out of the user's disk, on the display screen of the display unit 34.

The communication unit 35 transmits the order data, which has been entered by the playback machine, to the communication unit 19 of the laboratory system via a public telephone line.

The bar-code reader 36 is particularly useful in a case where an identification code has not been recorded on the user's disk. In such case a label on which a bar code representing the identification code has been printed is affixed to the case or cartridge of the user's disk in the manner described earlier. By using the bar-code reader 36 to read the bar code on the label, the computer system 30 is capable of recognizing the identification code of the user's disk to undergo playback processing (namely the disk that has been loaded in the disk driver 32) or of the image data that has been recorded on the user's disk.

(3) Practical operation (first aspect) of laboratory system and playback machine A method of using (utilizing) the laboratory system and playback machine in the manner set forth above will now be described.

Figure 10:
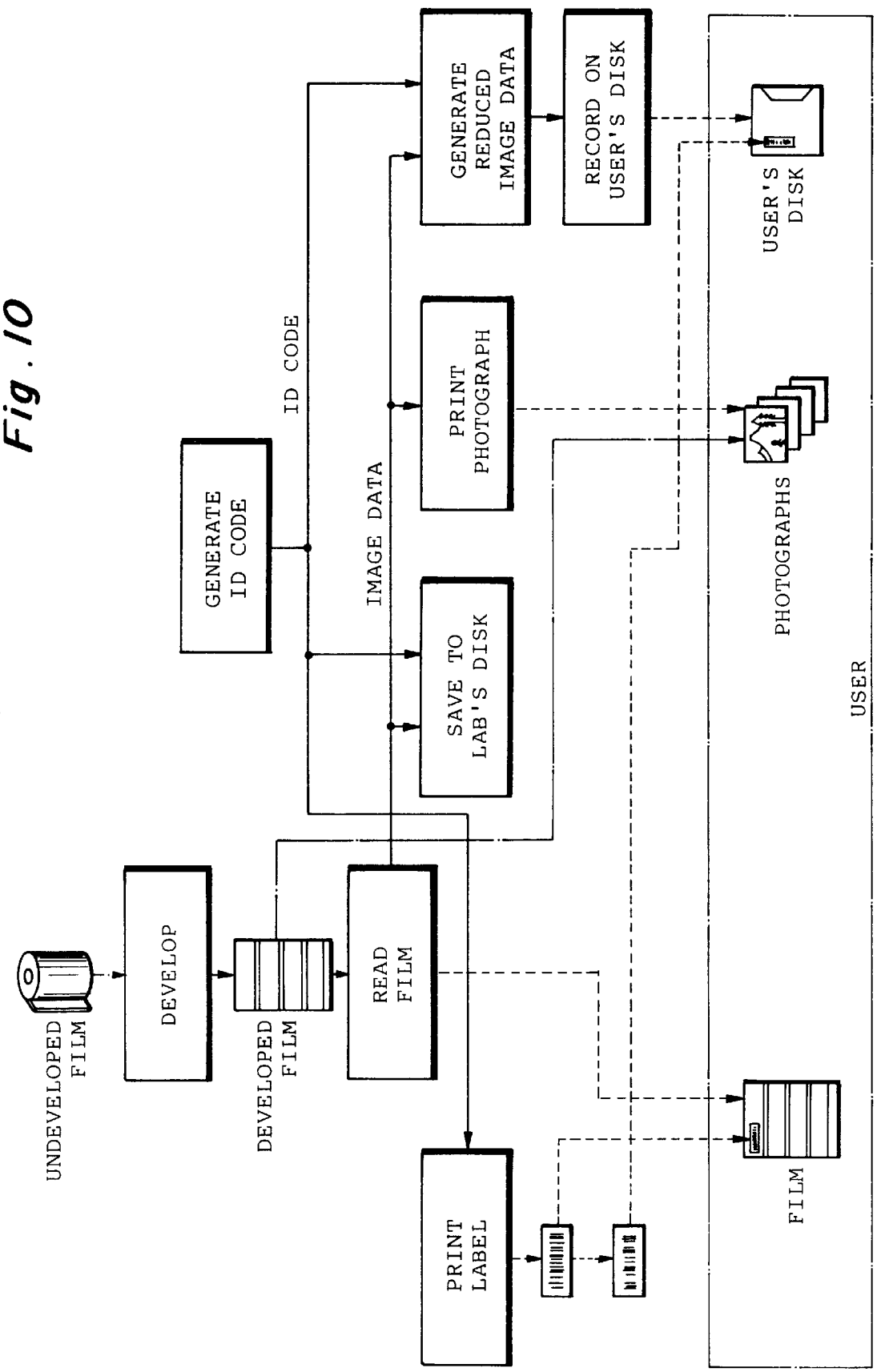
FIG. 10 is diagram for describing one form of the practical operation of a laboratory system.

FIG. 10 illustrates a mode of use (operation) of the laboratory system when an undeveloped film in the possession of the user is developed and the photographs are printed by the laboratory.

After taking photographs using a camera, the user generally has the laboratory develop the film and print the photographs. The undeveloped film in the possession of the user is taken to the laboratory directly or via a dealer or photography shop. In general an order form (sales slip) is created at such time.

The exposed and undeveloped film is subjected to a developing treatment at the laboratory through use of the developing unit 21. The images on the developed film are then printed on photographic paper by the printing unit 22, whereby photographs of the images appearing on the film are created. The creation of the photographs may be performed using the photograph printer 15, described later, without relying upon the printing unit 22.

Next, the developed film is read by the film reader 12. The original digital image data outputted by the film reader 12 (when necessary, this data is subjected to processing to obtain the appropriate image data or is stored temporarily in the memory of the computer system 10) is, on the one hand, stored on the lab's disk together with the generated identification code (with the addition of parameter data if required) by means of the disk driver 16.

The original digital image data is also applied to the photograph printer 15 as necessary to be used in the creation of photographs.

Further, reduced digital image data is created by subjecting the original digital image data to reduction processing. The reduced digital image data is recorded on the user's disk, together with an identification code as necessary (with the addition of parameter data if required), by the user's disk recording unit 13.

The label printer 14 issues a label on which a bar code representing the generated identification code has been printed. The label is affixed to at least the developed film. It is preferred that the label be affixed to the user's disk as well.

The developed film having the label affixed thereto, the printed photographs and the user's disk on which the reduced digital image data has been recorded (and to which the label has been affixed) are delivered to the user. Naturally the service fee is paid.

Figure 11:
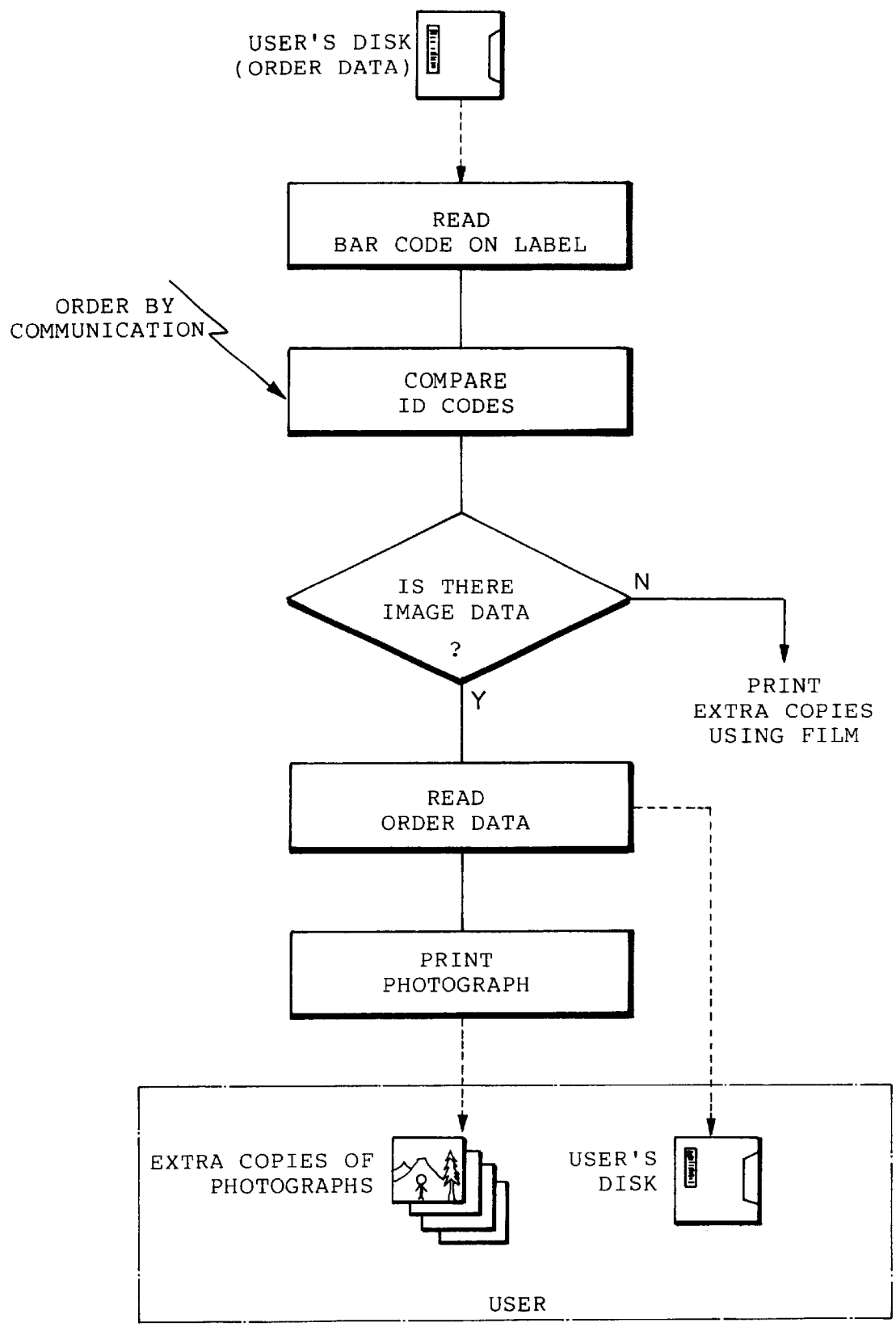
FIG. 11 is diagram for describing another form of the practical operation of a laboratory system.

FIG. 11 illustrates the mode of operation of the laboratory system when the user orders extra copies of photographs.

As described above, an order for extra prints is placed by recording the order data on the user's disk, sending the order data to the laboratory system from the playback machine or by writing the particulars of the order on a sales slip.

The recording of the order data on the user's disk is carried out using the playback machine (which has the order function). The user delivers the user's disk, on which the order data has been recorded, to the laboratory directly or via a dealer.

In a case where the order data is transmitted from the playback machine (which has the order function) to the laboratory system via a communication line, the user need not deliver the user's disk to the laboratory system. The user's disk is merely employed when the user creates the order data using the playback machine (as for the purpose of verifying the images to be ordered). Extra prints created by the laboratory system would be sent to the user by mail or through use of a delivery service. The fee would be paid by credit card.

The identification code on the label affixed to the user's disk delivered to the laboratory is read by the bar-code reader 23. Alternatively, the identification code included in the order data recorded on the user's disk is read by a magnetic disk reader (the recording unit 13 for the user's disk would be used).

The identification code read from the user's disk or included in the order data transmitted via the communication line is compared with the identification code attached to the image data preserved on the lab's disk in the laboratory system.

Image data is saved on the lab's disk for a fixed period of time (two or three months, six months, one year, etc.). When the fixed period of time elapses, the image data is erased. Whether the image data for which extra prints have been ordered has been saved on the lab's disk is checked by the above-mentioned comparison processing.

If the image data of interest has been saved on the lab's disk, the order data that has been recorded on the user's disk is read. In accordance with the order data read from the user's disk or the order data that has been received, the ordered frames of image data on the film are read out of the lab's disk and the photograph printer 15 is used to print photographs of ordered size and conditions in the number of copies ordered.

In a case where the parameter data has been recorded on the lab's disk or user's disk in the manner set forth above, photographs are printed utilizing this parameter data and, hence, photographs of uniform quality can be obtained.

An arrangement may be adopted in which the laboratory system is made to automatically execute almost all of the operations of reading the bar code on the user's disk, reading the order data from the user's disk, receiving the order data, comparing identification codes and printing photographs in accordance with the order data (with such operations as the loading of the disk being performed by the operator), or in which these operations are performed semiautomatically, with the operator entering commands and data at the time of each operation. In another printing mode, the operator may enter the printing conditions manually.

The printed photographs and the user's disk (in the case where an order has been placed using the disk) are delivered (sent) to the user.

In a case where the ordered image data has not been saved on the lab's disk, an operation shown in FIG. 12, described next, is performed.

The operation for checking whether ordered image data has been saved on the lab's disk (namely the processing for comparing identification codes) can be carried out not only by the laboratory system but also by transmitting the necessary data from a terminal, which is connected to the laboratory system by a communication line or the like, to the laboratory system. The terminal would be installed at a dealer or photography shop.

Figure 12:
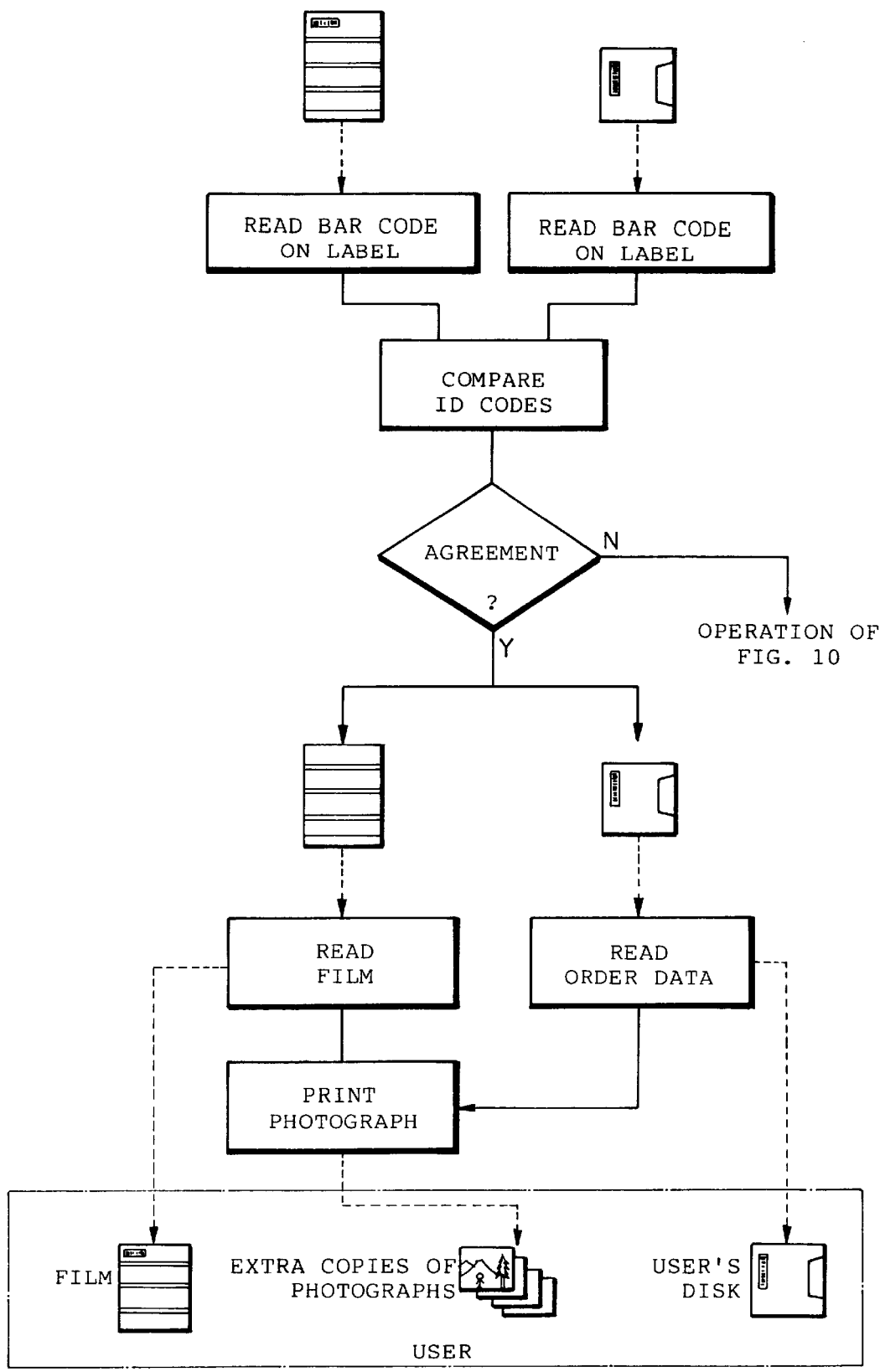
FIG. 12 is diagram for describing yet another form of the practical operation of a laboratory system.

FIG. 12 illustrates operation in a case where ordered image data has been erased from the lab's disk.

In this case, the user delivers the film and the user's disk to the laboratory. The identification code on the label affixed to the film is read by the bar-code reader 23. Similarly, the bar code on the user's disk is read or the identification code in order data recorded on the disk is read. If the identification code on the film and the identification code on the user's disk agree, extra copies in line with the order are printed.

The images on the films are read by the film reader 12. The order data is read from the user's disk (or the operator recognizes the order data by looking at a sales slip) and the photographs are printed by the photograph printer 15 in accordance with the order data using image data obtained from the film reader 12.

The film, the extra copies of photographs printed and the user's disk are handed over to the user. The user's disk may be handed over as is or reduced image data indicative of the image data read from the film may be re-recorded on the user's disks.

If the identification code on the film and the identification code on the user's disk do not coincide, extra copies are printed using only the film; the user's disk is not employed. This is the same as the operation performed with regard to the undeveloped film shown in FIG. 10 (the only difference is that the film is already developed).

Figure 13:
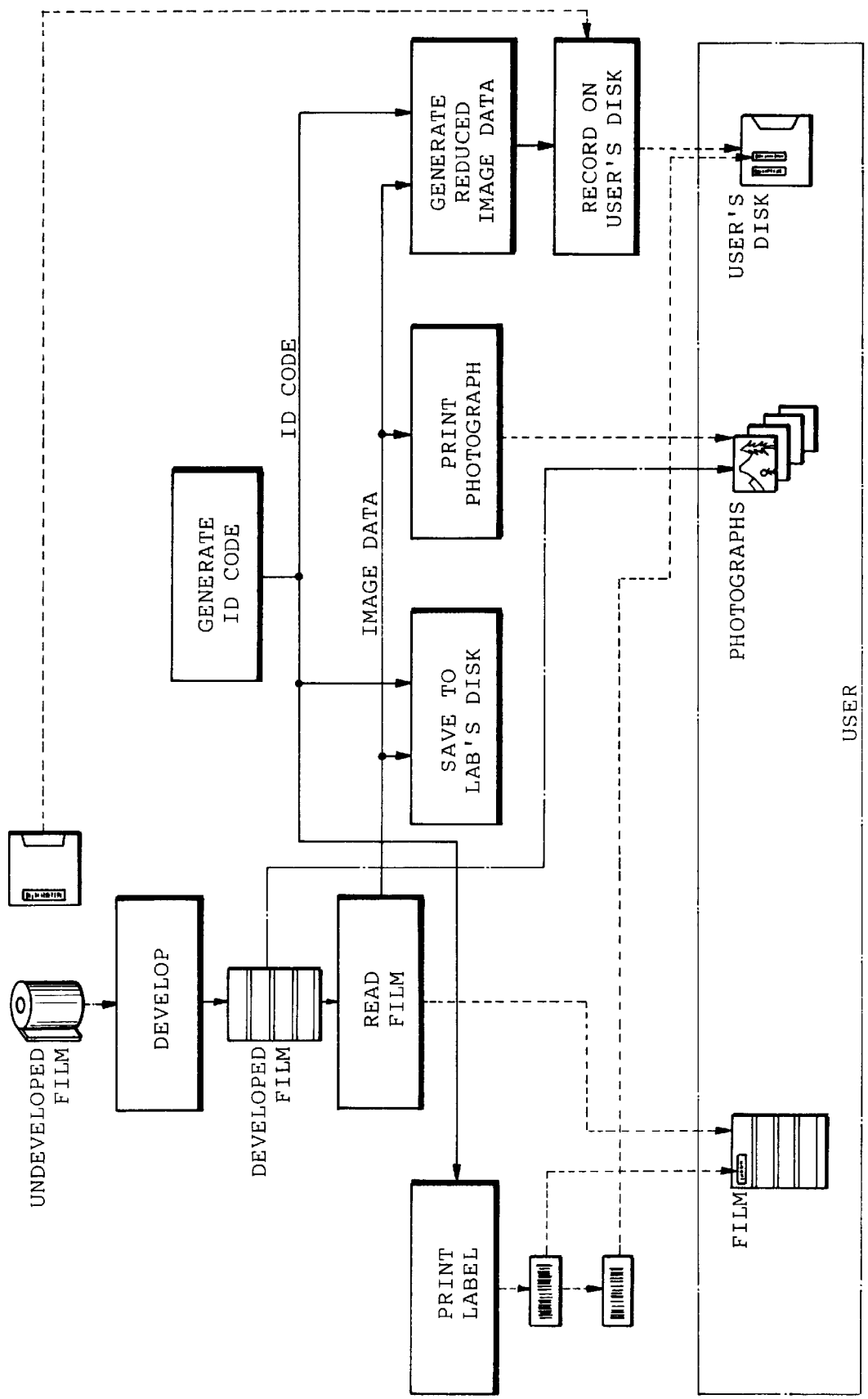
FIG. 13 is diagram for describing yet another form of the practical operation of a laboratory system.

FIG. 13 illustrates operation in a case where the user's disk, on which reduced images from already developed film have been stored, is brought to the laboratory together with undeveloped film.

In this case, an operation similar to that shown in FIG. 10 is carried out with regard to the undeveloped film. If the user's disk brought to the laboratory still has some unused capacity, reduced image data of the developed film is recorded on the user's disk so as to be added on. A label indicating the identification code of the film whose reduced image data has been added to the user's disk is added to the user's disk by being affixed thereto. Thus, reduced image data from two (or more than two) rolls of film is recorded on the user's disk.

FIGS. 14 through 18 show the file structure (data structure) of the user's disk.

Figure 14:
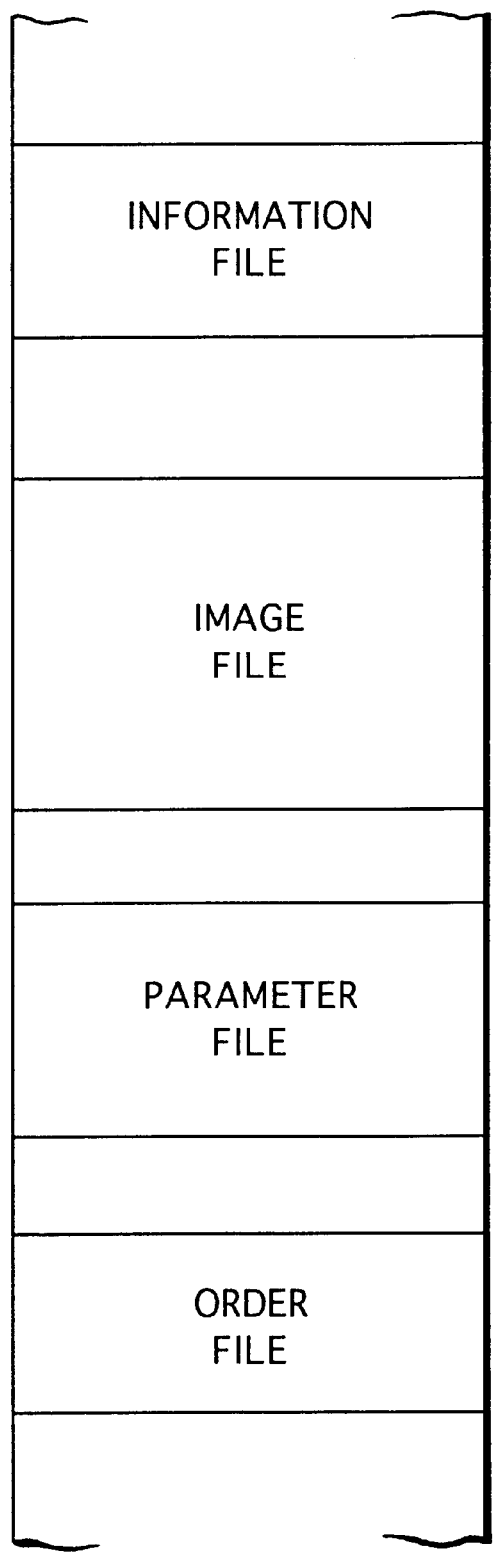
FIG. 14 is a diagram showing the file structure of a user's disk.

As shown in FIG. 14, the user's disk has an information file for managing all of the data recorded on the disk, an image file storing image data on a per-film basis, a parameter file storing parameter data on a per-film (or per-frame) basis, and an order file storing order data.

Figure 15:
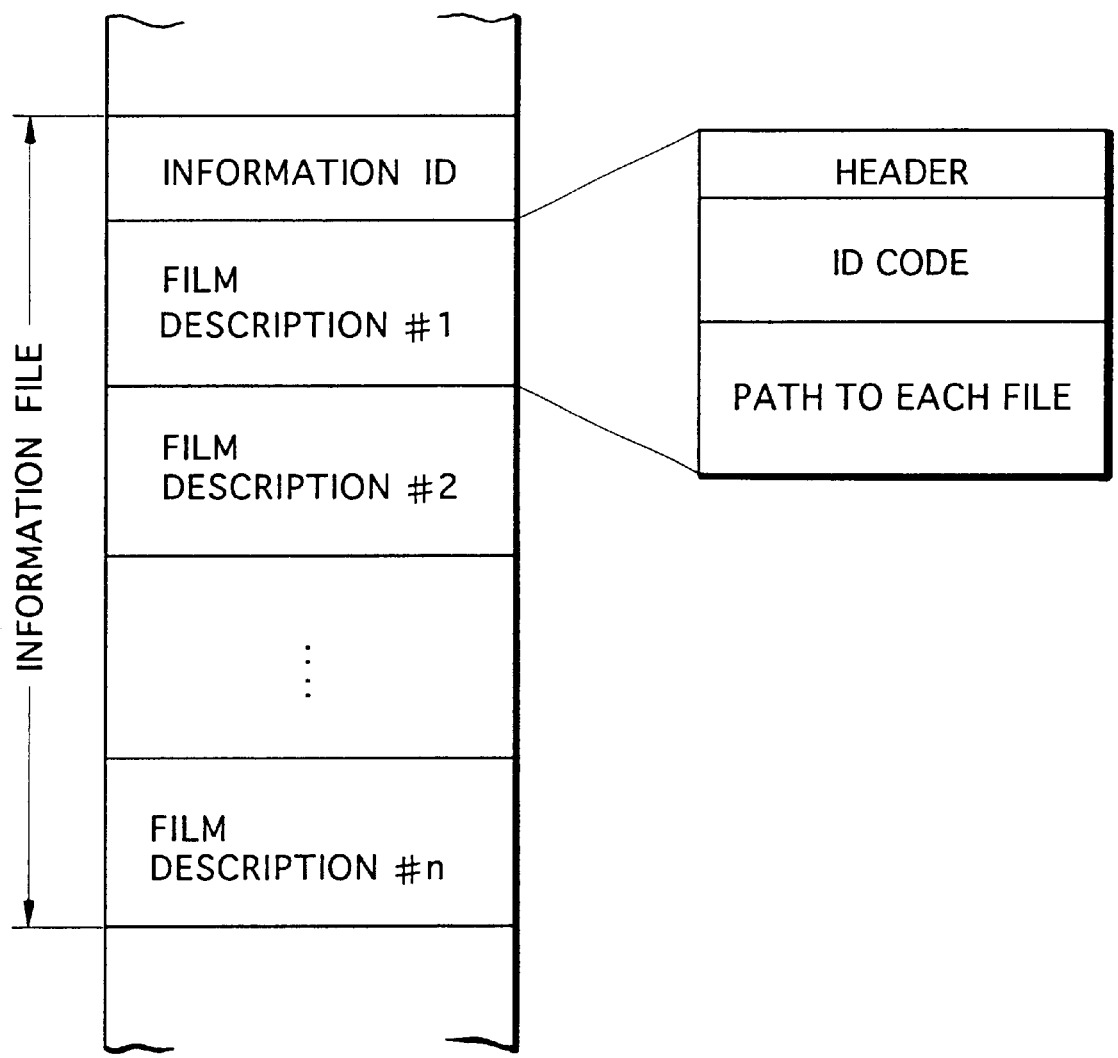
FIG. 15 is a diagram showing the details of an information file.

The parameter file is unnecessary if parameter data is not recorded on the user's disk. Similarly, the order file is unnecessary when the order data is not recorded on the user's disk. FIG. 15 shows the details of the information file. The information file includes an information ID, which is recorded at the beginning of the file, followed by film descriptions (desirably of fixed length), one for each roll of film. Data recording n-number of rolls of film is stored.

The information ID includes the header thereof, a path to each film description (namely the offset from the header, i.e., the address length to the starting position of each film description), etc.

Each film description includes a header, a film identification code, and a path to a film image file, described later, a film parameter file, etc.

Figure 16:
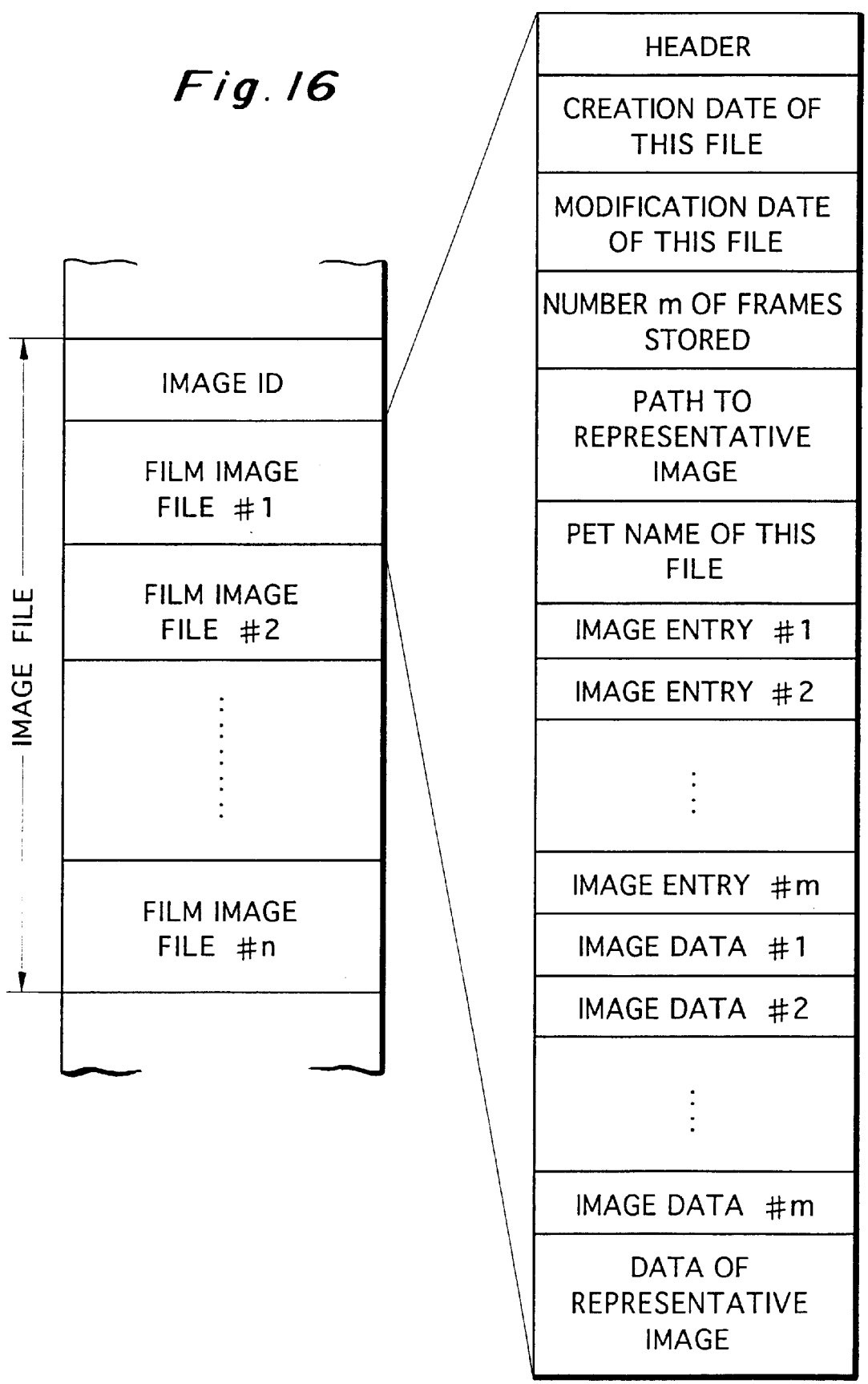
FIG. 16 is a diagram showing the details of an image file.

FIG. 16 illustrates the details of the image file. The image file includes an image ID (a header and a path to each film image file) and a film image file per roll of film.

The film image file includes a header, the creation date of the file, the modification date (if necessary) of the file, the number of frames (the number of images) stored in this file, a path to a representative image, a pet name of the film, an image entry per frame, image data per frame and image data representing the representative image.

The representative image of a film is an image that most straightforwardly expresses a plurality of images contained on one roll of film. The representative image is ideal for use in searching for a film of interest from among a large number of films.

Further, the pet name is a word or phrase that most straightforwardly expresses a plurality of images included on a roll of film. One example is "Summer Festival", described later. The pet name also is convenient in searching for a film of interest.

The representative image is designated and the pet name is entered when a reduced image of the film is stored on the user's disk at the laboratory.

The image entry is created for each frame contained on one roll of film and includes data relating to the image of the frame, e.g., the frame number (the identification number of the frame), orientation (whether the image has been stored in a vertical or horizontal attitude), the path to the image data of this frame, etc. Parameter data may be included in the image entry (in which case a parameter file would be unnecessary).

The image data comprises data for each pixel representing the reduced image. Attributes of the image data are size (e.g., 64×80), constitution (e.g., luminance data Y=4, color-difference data Cr=2, Cb=2, etc.), data size (e.g., fixed at 10 KB), data compression ON/OFF, and method of data compression. The attributes preferably are included in the image entry. The image data is arrayed in the $Y_{00}$, $Y_{01}$, $Cb_{00}$, $Cr_{00}$, $Y_{02}$, $Y_{03}$, $Cb_{01}$, $Cr_{01}$, $Y_{04}$, $Y_{05}$. In FIG. 16, m frames of image data have been stored.

Figure 17:
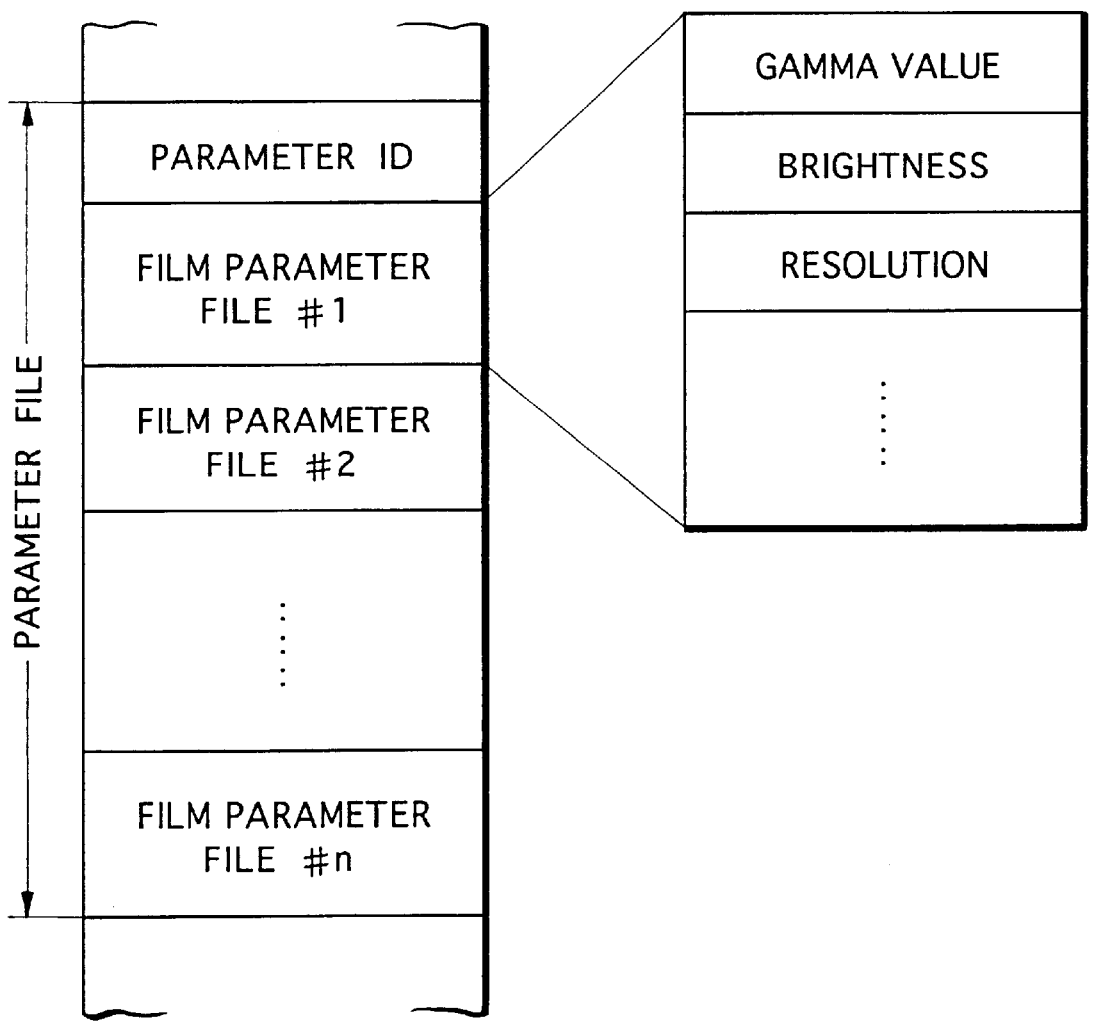
FIG. 17 is a diagram showing the details of an parameter file.

FIG. 17 illustrates the details of the parameter file. The parameter file is composed of a parameter ID, a parameter file per roll of film, etc. Parameter data of each roll of film (the above-mentioned gamma value, brightness, resolution, etc.) is stored in the parameter file. It goes without saying that a parameter file may be created for each frame.

Preferably, a code indicating whether a parameter file has been created for each film and whether it has been crated for each frame may be entered in the parameter file.

Figure 18:
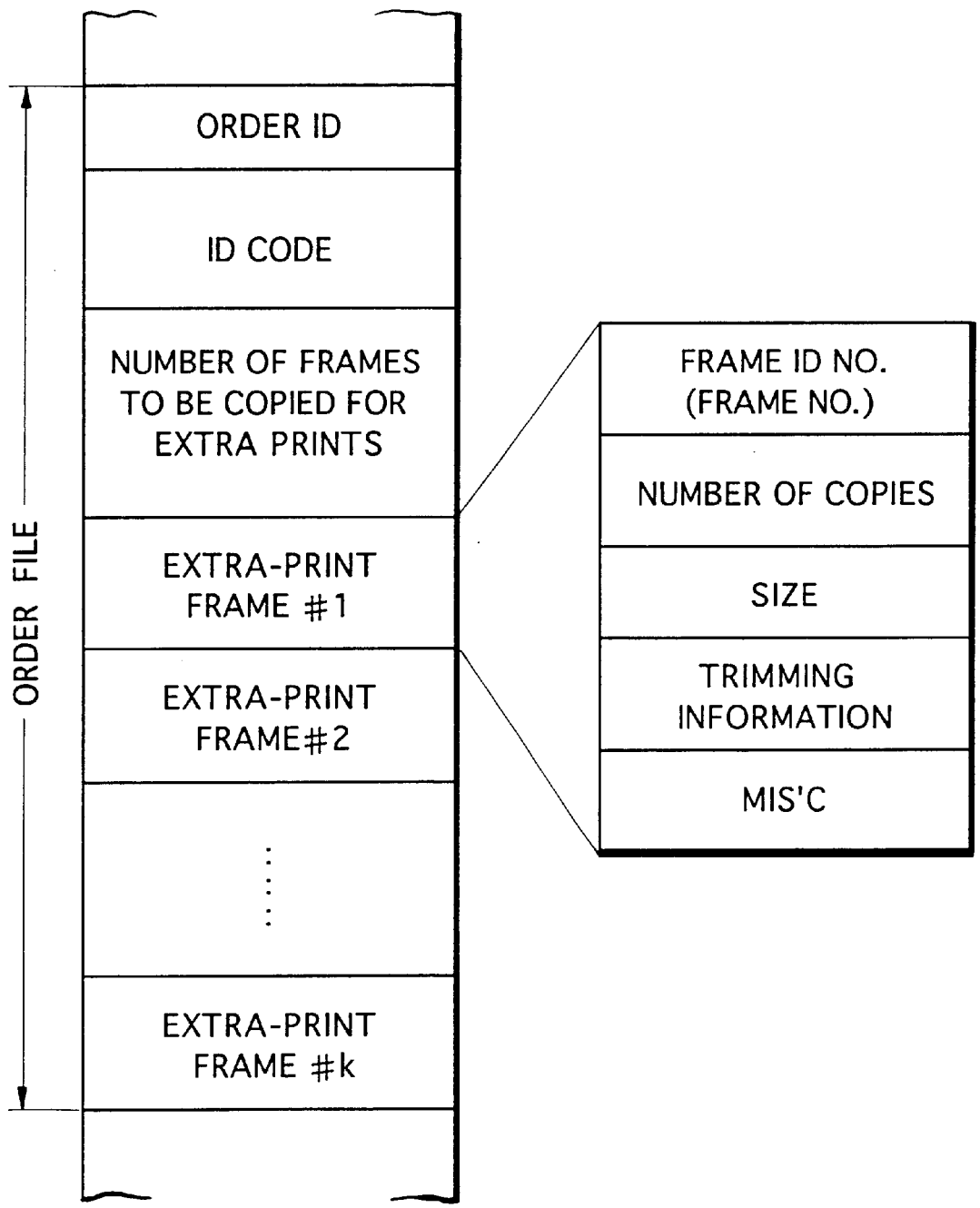
FIG. 18 is a diagram showing the details of an order file.

FIG. 18 illustrates the details of the order file. The order file includes the order ID (which includes a header), the identification code of the film to be ordered, the number of frames for which extra prints are requested, data for each frame, etc. As mentioned earlier, the data for each frame includes the identification number (frame number) of the frame, the number of copies desired for extra prints, the size, information relating to trimming, etc.

The file structure of the lab's disk basically is the same as that of the user's disk. However, since the lab's disk includes an enormous amount of file image data, the structure of this disk should be such as to allow easy retrieval of data. The lab's disk does not require an order file, as a matter of course.

FIGS. 19 through 23 illustrate examples of display screens displayed on the display unit when order data is created in the playback machine.

If image data from a large number of rolls of film have been stored on one user's disk, a hierarchical menu is displayed when a specific roll of film is selected from these rolls of film. In this example, the year is set to the highest level of the hierarchy, the month to the intermediate level and the pet name to the lowest level.

Figure 19:
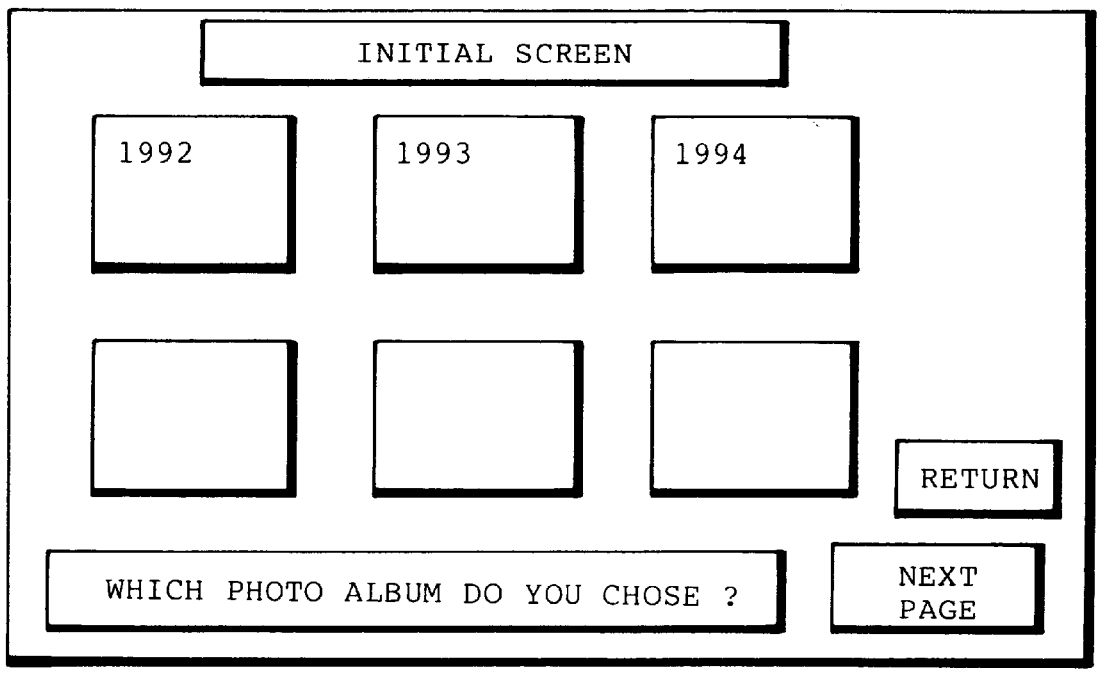
FIGS. 19 through 23 are diagrams showing a procedure for creating order data in a playback machine.

The years are displayed first, as shown in FIG. 19. The user selects the year that contains the film to be ordered.

Figure 20:
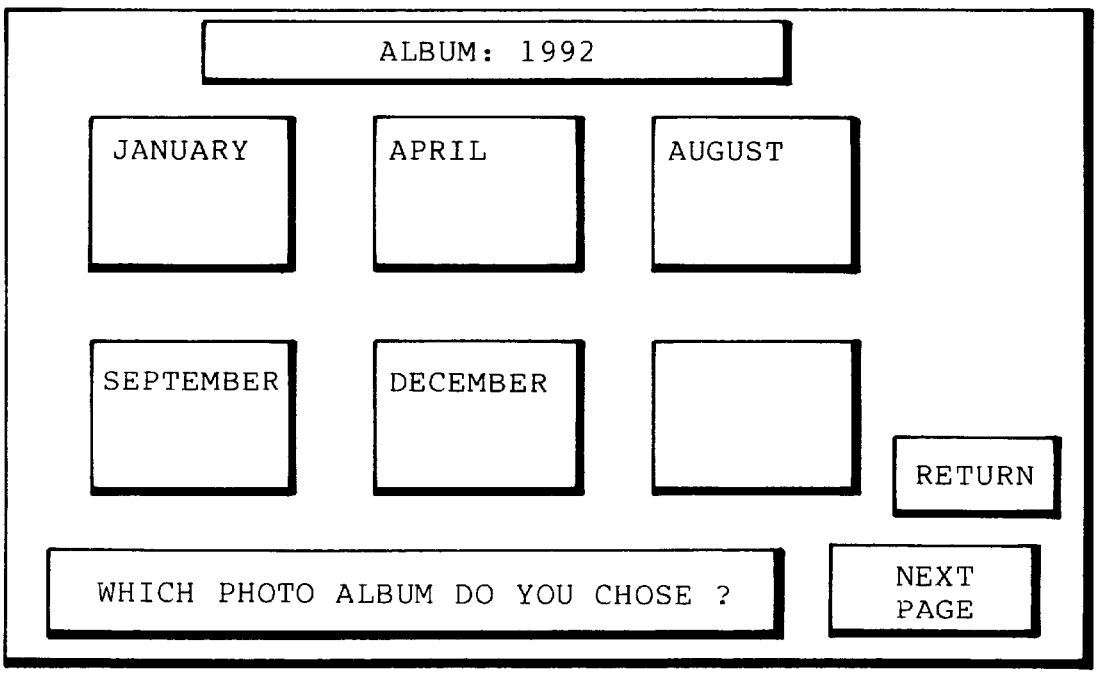

Next, as shown in FIG. 20, the months in which the films contained in the selected year reside are displayed. The user selects the desired month.

Figure 21:
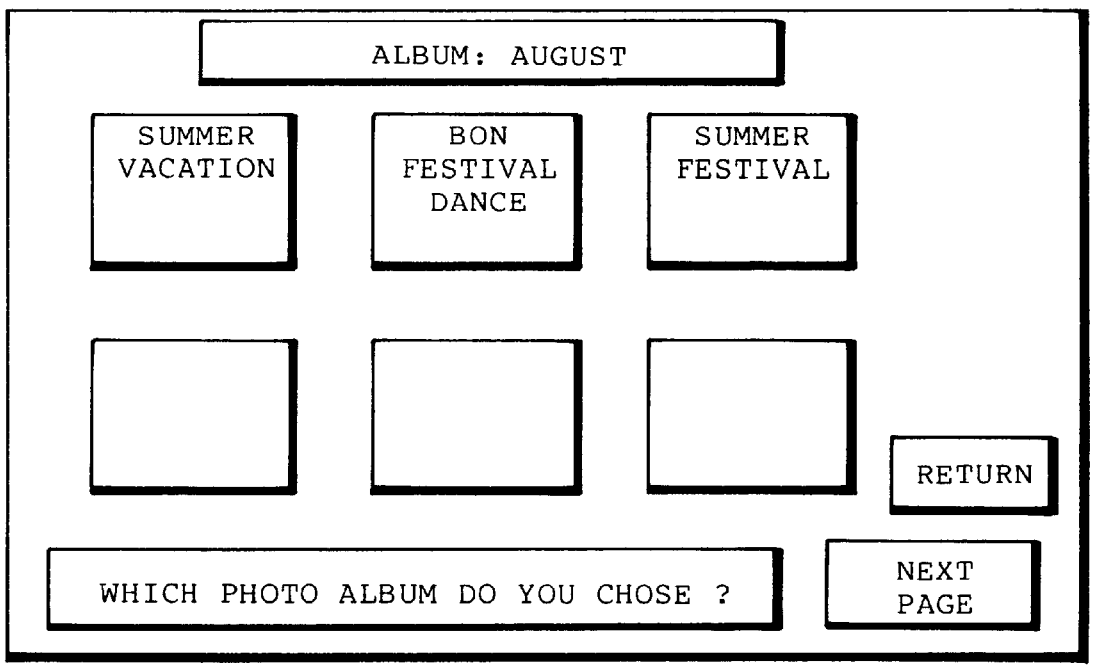

When this is done, the pet names of the rolls of film having date data belonging to the selected month are displayed as shown in FIG. 21. It is preferred that representative images be displayed in addition to the pet names.

Figure 22:
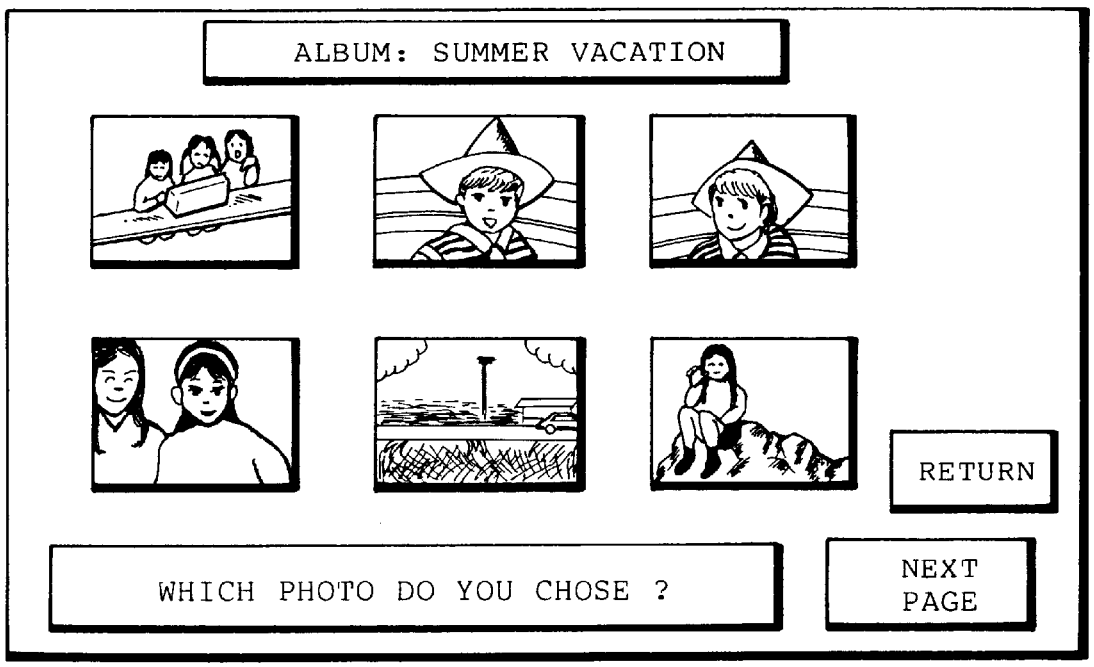

One roll of film is specified by selecting its pet name. Since the images of all frames contained in the roll of film are displayed one after another or in a lump as shown in FIG. 22, the user selects the frames that are desired to be printed for extra copies.

Figure 23:

As shown in FIG. 23, a screen for entering order data and confirmation is displayed for each frame selected. Accordingly, the user enters the number of copies, the size and trimming information, etc., and finally enters confirmation.

In a case where an order is placed with regard to a plurality of frames, the user repeats the operation described above.

The order data thus entered is stored in the order file of the user's disk or is transmitted to the laboratory system via the communication line.

(4) Photographic Film with Information Recording Zones, and Camera

Figure 24:
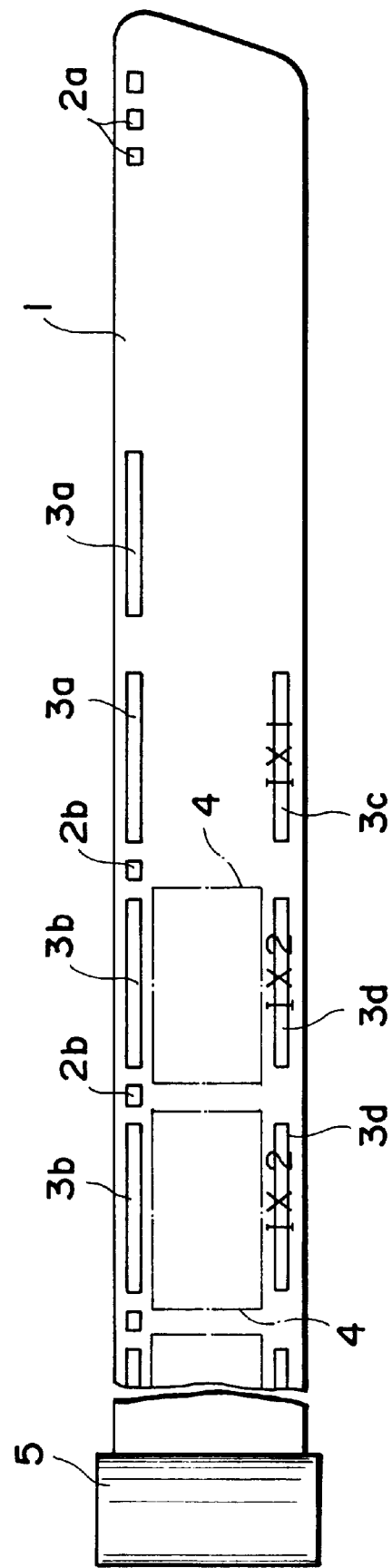
FIG. 24 is a diagram showing a photographic film having information recording zones.

FIG. 24 illustrates a new type of photographic film, namely photographic film with information recording zones.

As shown in FIG. 24, a new photographic film 1 has one end thereof secured to a spool (not shown) rotatably provided inside a magazine 5. FIG. 24 shows the photographic film 1 after it has been extracted from the magazine 5.

The distal end of the photographic film 1 is formed to have several perforations 2a for mating with a portion of a film take-up shaft in a camera.

With the exception of a suitable length of the distal end portion of the film, the entirety of the photographic film 1 has areas 4 for recording images. (These areas are formed by taking photographs and are indicated by the phantom lines in FIG. 24 for the sake of description.)

Elongated, band-shaped information recording zones 3b, 3d are provided on both sides of the image recording areas 4. A perforation 2b is formed in the film between neighboring information recording zones 3b so as to correspond to each image information recording area 4. The perforations 2b are used mainly to position the image recording areas 4 at the imaging position of the camera.

The distal end of the photographic film 1 also is provided with information recording zones 3a, 3c one respective ones of both sides.

The information recording zones 3a, 3b, 3c, and 3d are magnetic recording layers generally formed by applying a transparent magnetic material to the film. The information recording zones 3a, 3b provided on one side of the photographic film 1 generally are used at the laboratory. The information recording zones 3c, 3d provided on the other side of the photographic film 1 generally are used by the user or camera to record information (data).

The information recording zones (leader information recording zones) 3a and 3c at the distal end of the film are used to record information (film information) relating to one roll of film. The information recording zones (frame information recording zones) 3b and 3d provided to correspond to each image recording area 4 are used to record information (frame information) relating to the images recorded in the respective areas 4.

To give one example, information representing events with which images captured using the photographic film are associated is recorded in the leader information recording zone 3c utilized by the user. Examples of events are a field day, a birthday, a party, a wedding ceremony, etc. This is referred to as information IX1.

The information recorded in the frame information recording zone 3d utilized by the user includes information which the user enters into the camera (e.g., a title which straightforwardly represents the image), and information which the camera records automatically (e.g., shutter speed used when picture of the frame was taken). These items of information are referred to as information IX2. An arrangement may be adopted in which only information entered by the user serves as information IX2.

Figure 25:
FIG. 25 is a diagram showing the format of data recorded on an information recording zone.

FIG. 25 illustrates the data disposition (format) of data in the information recording zones of the photographic film. This data format is applied to both information IX1 and IX2 and includes SS, VER, ID, LNG, DATA, LCR and ES.

The aforementioned SS is the abbreviation of "Start Sentinel" and is a code representing the start of a data string. VER indicates the version of the recording format (specifications). ID represents the type of information (IX1 or IX2) recorded. LNG indicates the length of the data following the LNG. DATA is the data representing information desired to be recorded or information to be recorded. LCR is a CRC check code. ES is the abbreviation of "End Sentinel" and is a code representing the end of the data string.

One or a plurality of data strings having such a format are provided for one information recording zone. For example, a data string representing data entered by the user and a data string representing data to be written in by the camera are recorded in the frame information recording zone 3d. If necessary, the same data string is written in the information recording zone a plurality of times in parallel in order to enhance reliability.

Figure 26:
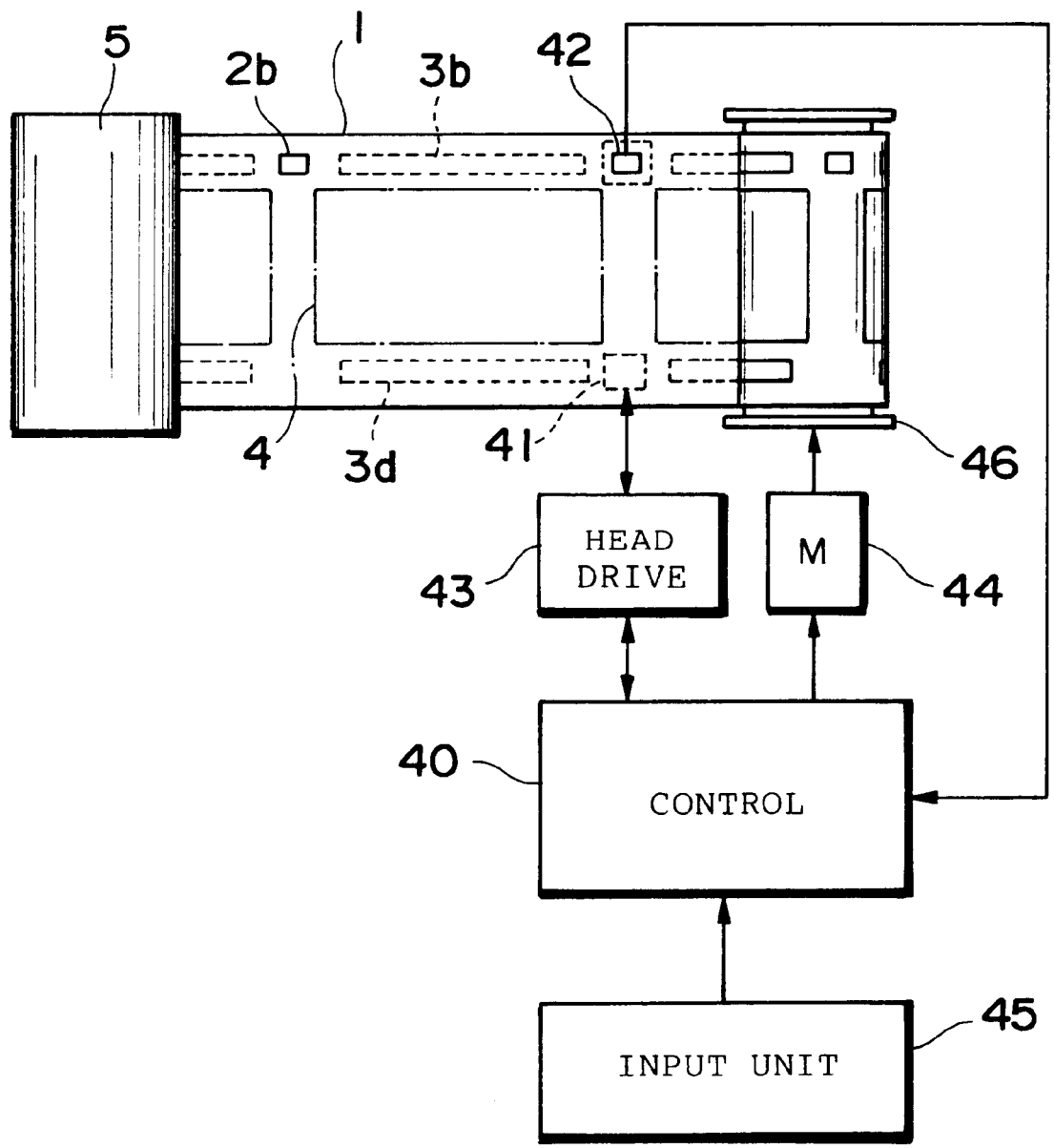
FIG. 26 is a diagram showing part of a camera capable of handling a photographic film having information recording zones.

FIG. 26 illustrates part of the construction of a camera capable of handling such new photographic film having information recording zones. FIG. 26 mainly shows the components relating to the recording of information in the information recording zones of the photographic film; components constructing the imaging optical system and the like are not shown.

The magazine 5 is supported on a fork within the camera so as to be free to turn. The leading edge of the photographic film 1 pulled out of the magazine 5 is wound up on a take-up shaft 46 for the photographic film. The camera is provided with a photoelectric sensor 42 for sensing the perforations 2b and produces a detection signal that is applied to a control unit 40. The control unit 40 drives a motor 44 to rotate the take-up shaft 46 and successively take up the photographic film 1 and, on the basis of the detection signal from the photoelectric sensor 42, positions the photographic film 1 each time a picture is taken so as to bring the image recording area 4 to the imaging position.

A magnetic head 41 is provided on the traveling path of the user's information recording zones 3c, 3d in order to record information on these information recording zones 3c, 3d. Information entered from the input unit 45 or information generated by the control unit 40 is recorded on the information recording zones 3c, 3d via a head drive circuit 43 under the control of the control unit 40 in the course of take-up of the photographic film 1 (i.e., during the travel of the film).

The input unit 45 enters numerals or characters. For example, the input unit 45 includes numeric keys, alphabetic keys, etc. If necessary, the input unit 45 includes a display device on which information entered by key input is displayed. In order to reduce the number of keys, an arrangement can be adopted in which the character displayed is changed whenever a single key is pressed and the user selects the character displayed and to be entered.

In this embodiment, the event information, namely the types of information IX1, is predetermined. The user selects the desired type of information from among these types of information. There are 99 types of information IX1, and codes 01~99 are allocated thereto. For example, code 01 is a field day, and code 02 is a birthday, etc. Accordingly, the code selected by the user need only be recorded in the leader information recording zone 3c.

The information IX2 generally is entered from the input unit 45 as a character code or numeral code. Codes representing characters such as "BEFORE STARTING", "START" and "DANCE" are recorded in the frame information recording zone 3d.

This photographic film having the information recording zones can be used in the above-described laboratory system (first aspect) instead of the ordinary (conventional) photographic film. A laboratory system (second aspect) illustrated next is particularly suited to a photographic film having information recording zones.

(5) Laboratory System (second aspect)

Figure 27:
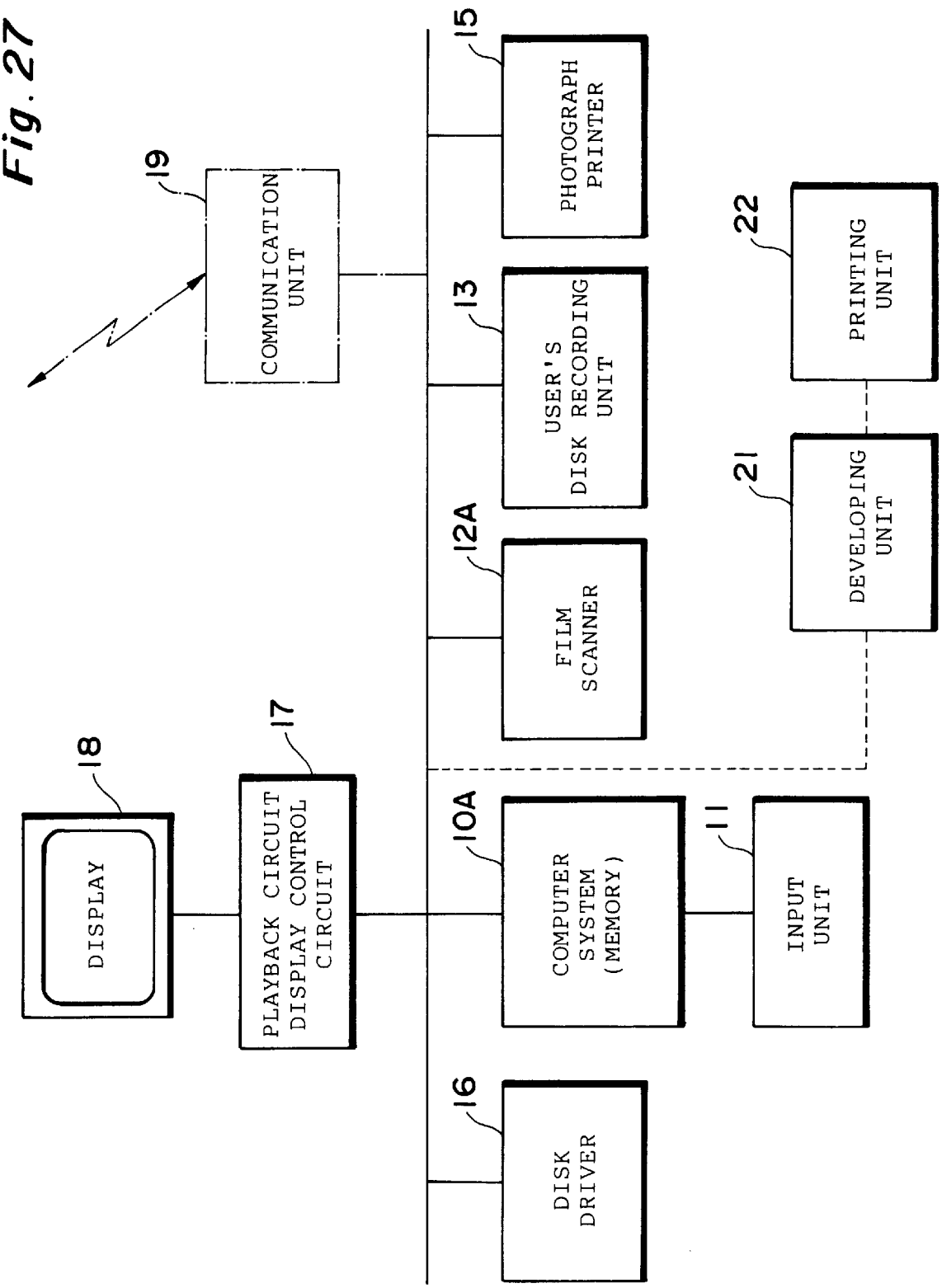
FIG. 27 is a block diagram showing a laboratory system (second aspect)

FIG. 27 illustrates another example of a laboratory system. Components identical with those constructing the laboratory system (first aspect) shown in FIG. 1 are designated by like reference characters and need not be described again. only the features that are different will be described. The arrangement shown in FIG. 27 is not provided with the bar-code reader 23 and label printer 14, though these can be provided as a matter of course.

Though the laboratory system depicted in FIG. 27 is particularly well-suited to a new photographic film having information recording zones, it can also be applied to the conventional photographic film not having these zones.

A computer system 10A controls the units 11, 12A, 13, 15~19 individually and supervises the overall operation of the laboratory system as a whole. Further, the computer system 10A generates identification codes. The computer system 10A includes a CPU, memories (a semiconductor memory, floppy disk, hard disk, etc.) and other peripheral devices (see FIG. 28).

A film scanner 12A generates digital image data by reading images that appear on developed photographic film having information recording zones and reads the information IX1, IX2 recorded in the information recording zones (at least 3c and 3c) of the photographic film. In case of a photographic film not having the information recording zones, the scanner 12A generates digital image data by reading the image that appear on the film.

Under the control of the computer system 10A, the recording unit 13 for the user's disk records the original digital image data and the information IX1, IX2 read from the photographic film by the film scanner 12A, the reduced digital image data (inclusive of index image data) and playback software (inclusive of identification codes), described later, on the user's disk (portable recording medium).

Typical examples of the user's disk are an optical disk (a rewritable optical disk such as a magneto-optical disk and phase-change optical disk), a writable optical disk and a magnetic disk (floppy disk). A semiconductor memory card, a magnetic card or an optical tape can also be used as the user's recording medium in place of a disc-type recording medium.

The disk driver 16 records, on the lab's disk, the original digital image data and information (inclusive of IX1, IX2) from the information recording zones outputted by the film scanner 12A (after temporarily storing image data and information in the memory of the computer system if necessary) and reads specified original digital image data out of the lab's disk. The original digital image data that has been read is applied to the photograph printer 15 in order to be printed, as described earlier. A hard disk, optical disk or magneto-optical disk, etc., would be used as the lab's disk. A magnetic tape may used instead of the lab's disk.

It is preferred that the original digital image data outputted by the film scanner 12A be recorded on the lab's disk on a per-film basis. At such time an identification code generated in association with the roll of film also is stored on the lab's disk in correspondence with the original digital image data. Thus, the same identification code is attached to the image data generated by the reading of the photographic film and recorded on the user's disk and to the image data obtained by the reading of the photographic film and recorded on the lab's disk, thereby clearly showing that the images are identical.

An arrangement may be adopted in which the original digital image data is compressed and the compressed image data also recorded on the lab's disk. In such case the data compression (decompression) processing would be executed in the computer system 10A or a data compression/decompression circuit (which may be used in combination with the user's disk recording unit) would be provided.

If the film is full color film, it goes without saying that the original digital image data and reduced digital image data is color image data. The color image data may be R, G, B data, a combination of luminance data and color-difference data or NTSC data.

Figure 28:
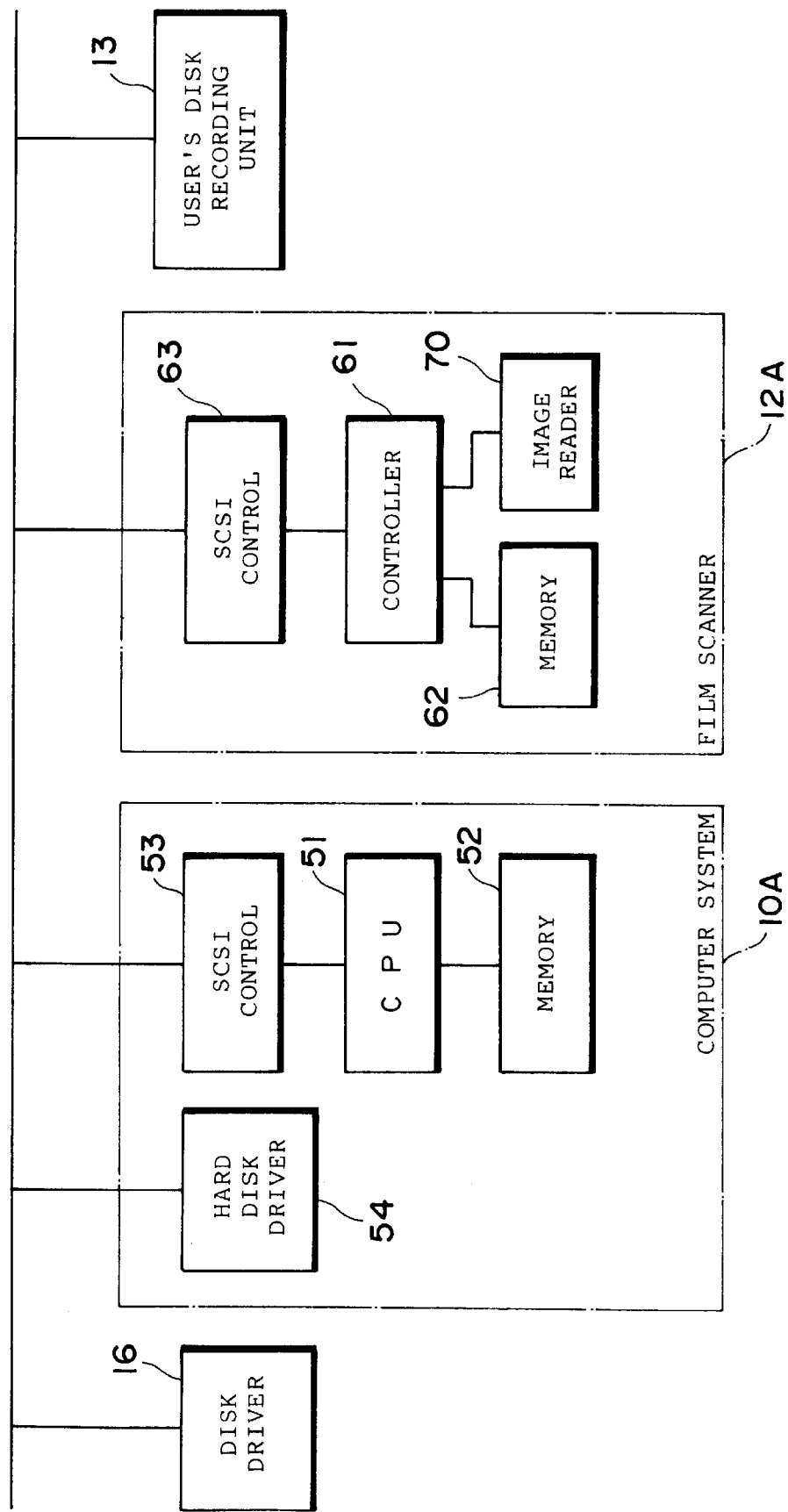
FIG. 28 is a block diagram showing the construction of a film scanner and computer system in FIG. 27.

FIG. 28 illustrates the arrangement of the computer system 10A, the film scanner 12A and the peripheral equipment.

Connected to the computer system 10A via an SCSI (small computer system interface) bus are the disk driver 16, the recording unit 13 for the user's disk, the film scanner 12A and a hard disk driver 54 within the computer system 10A.

The computer system 10A includes a CPU 51 and its periphery circuitry, a memory device (ROM, RAM, floppy disk, etc.) 52, the hard disk driver 54 and an SCSI control unit 54 for sending and receiving commands and data in accordance with the SCSI method.

The film scanner 12A includes a reader 70 for sensing images appearing on photographic film having information recording zones and outputting image data (e.g., 2048×3072 pixels) representing the images, and for reading and outputting information (IX1, IX2, etc.) that has been magnetically recorded on the information recording zones 3c, 3d (and 3a, 3b) of the photographic film, a memory (RAM, ROM, etc.) 62 for storing the image data and information, an SCSI control unit 63 for sending and receiving commands and data to and from the computer system 10A, and a controller 61 for controlling the reading of film images, the storing of the image data and the transfer of the image data, etc.

Figure 29:
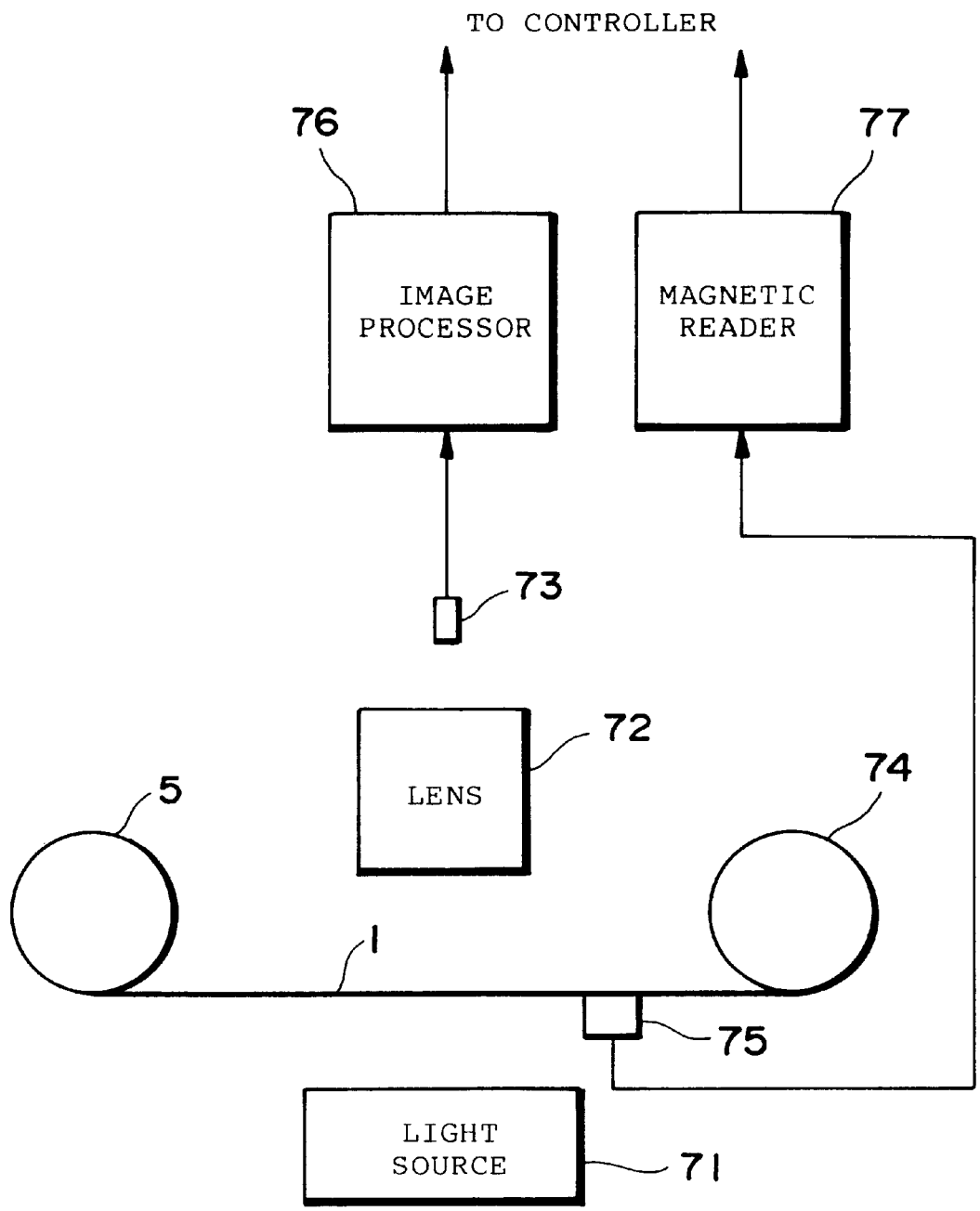
FIG. 29 is a diagram showing the construction of a film scanner.

FIG. 29 illustrates, in simplified form, the construction of the reader 70 in the film scanner 12A.

The photographic film 1 is pulled from the magazine 5 and is would up on a take-up shaft 74 of the photographic film. The photographic film 1 is conveyed at a prescribed speed by a film feeding mechanism (not shown).

Light from a light source 71 irradiates the conveyed film 1. Light representing an image appearing in an image recording area of the film 1 forms an image on a CCD line sensor 73 via a lens system 72. The CCD line sensor 73 includes a number (e.g., 2048) of photoelectric transducers arrayed in a direction which perpendicularly intersects the longitudinal direction of the photographic film 1. Video signals are sent from the CCD line sensor 73 to an image processor 76 line by line as the film 1 is fed. When the film is fed by a length equal to one image recording area, one frame of image data is obtained. (For example, image data having a resolution of 2048×3072 pixels is obtained when the film is fed at the smallest pitch.)

The image processor 76 is constituted by a signal processing circuit (inclusive of circuits selected from among a white balance circuit, gamma correction circuit and negative/positive reversal circuit, etc., as required) for processing a video signal obtained from the CCD line sensor 73, an A/D converter circuit, etc. Digital image data obtained when the photographic film 1 has been fed by the smallest pitch is referred to as the original digital image data. This data is applied to the controller 61.

The original image data is for high-definition image data. Standard image data is obtained by reducing the original digital image data to 1/2 in the vertical direction and 1/2 in the horizontal direction. Reduced image data is obtained by further reducing the standard image data to 1/8 in the longitudinal direction and 1/8 in the horizontal direction. The reduction of the image is carried out by processing for eliminating (thinning out) pixels or by executing averaging processing in units of a plurality of adjacent pixels. The reduction processing is executed by the recording unit 13 for the user's disk. These items of original (high-definition) digital image data, standard image data and reduced digital image data are recorded on the user's disk after being compressed as necessary. Accordingly, if required the recording unit 13 includes a pixel-eliminating (thinning-out) circuit (averaging circuit) and a data compression (decompression) circuit. The pixel-eliminating (averaging) processing and the data compression (decompression) processing can be implemented by software in the recording unit 13 or by processing in the computer system 10A. Image data having a different resolution can also be obtained by changing the pitch at which the film 1 is fed in the reader 70.

The reader 70 shown in FIG. 29 has a magnetic head 75 provided in the conveyance path of the photographic film 1 at a position traversed by the information recording zones 3c, 3d of the film. The magnetic head 75 reads the information magnetically recorded on the information recording zones 3c, 3d and sends the resulting read signals to a magnetic reading circuit 77 as the film 1 is being fed. The magnetic reading circuit 77 applies the required processing (demodulation, encoding, etc.) to the read signals and then applies the processed results to the controller 61.

The practical operation of this laboratory system (second aspect) is substantially the same as that of the laboratory system (first aspect) illustrated earlier. Since labels bearing identification codes are not issued in the laboratory system (second aspect), labels are not affixed to the photographic film and user's disk.

(6) Structure of User's Disk and Hypertext

The original digital image data, the standard image data, the reduced image data, the information (IX1, IX2) read from the photographic film and software for image playback (and for ordering extra prints and for other processing) in the playback machine are stored on the user's disk, as mentioned above. For the sake of simplicity, it will be assumed here that only the original image data and reduced image data have been stored on the user's disk and not the standard image data. In this embodiment, the software for image playback is hypertext described by HTML language.

Figure 30:
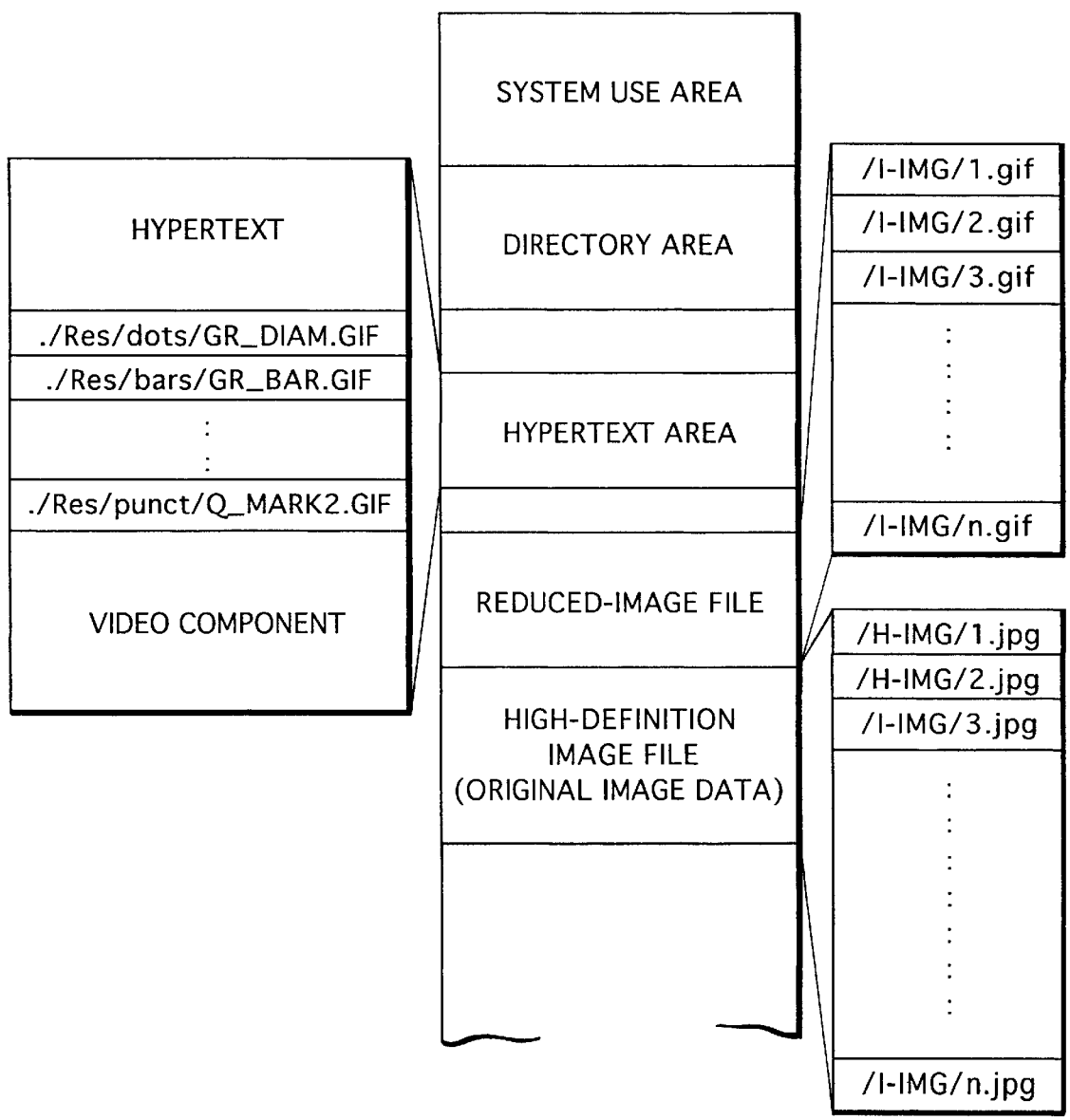
FIG. 30 is a diagram showing the data structure of a user's disk.

FIG. 30 illustrates the structure of the user's disk. The user's disk is provided with a system-use area, a directory area, a hypertext area, a reduced-image file and a high-definition image file (the high-definition image means the original image).

Hypertext and data (video components) representing various images displayed on the display unit of the playback machine in image playback processing are stored in the hypertext area.

Reduced image data per each frame on the film created based upon the original image data read from the photographic film is stored in the reduced-image file with a series of identification numbers (frame numbers) attached thereto.

The original image data (with the attached series of identification numbers) per each frame and the information (IX1, IX2) read from the photographic film are stored in the high-definition image file.

The hypertext includes an instruction for playback, an instruction for ordering extra prints and other instructions. More specifically, these instructions include: the information (IX1, IX2) read from the photographic film and an instruction for displaying this information; a path to reduced image data, of a specific frame to be displayed, in the reduced-image file and an instruction for displaying the reduced image; a path to original image data, of a frame to be displayed, in the high-resolution image file and an instruction for displaying the high-resolution image; an identification code and an instruction for displaying the code; an address of a server for processing orders for extra prints and for executing other processing; and an instruction for accessing the server.

A hypertext template is prepared in advance and stored in the memory 52 of the computer system 10A. Identification codes, file names (the file names of various images), etc., are generated by the computer system 10A in accordance with predetermined rules. Various image data is stored in an image file in accordance with a predetermined path. The identification codes, file names and paths thus decided and the information (IX1, IX2) read from the photographic film are filled in blank fields of the hypertext template, thereby completing the hypertext.

An example of hypertext is as follows (line numbers 1~26 are attached to the beginning of each line to facilitate the description):

1  <HTML>
2  <TITLE>Picture Disk</TITLE>
3  <center>
4  (IMG SRC="./Res/dots/GR_DIAM.GIF">
5  <FONT SIZE="7"><STRONG><I>Welcome to Picture Disk</I></STRONG><FONT>
6  <IMG SRC="./Res/dots/GR_DIAM.GIF">
7  </center>
8  <IMG SRC="./Res/bars/GR_BAR.GIF">
9  <FONT SIZE="5">FIELD DAY</FONT
10 THE ORDER NUMBER OF THIS IMAGE IS"<Blink>081-100-1A67-19940315101523-F5-1FF</Blink>"<p>
11 <A HREF="./H-IMG/1.jpg><IMG SRC="./I-IMG/1.gif">01</A>
12 <A HREF="./H-IMG/2.jpg><IMG SRC="./I-IMG/2.gif">02</A>
13 <A HREF="./H-IMG/3.jpg><IMG SRC="./I-IMG/3.gif">03</A>

14 <A HREF="./H-IMG/4.jpg><IMG SRC="./I-IMG/4.gif">04</A>
15 <A HREF="./H-IMG/5.jpg><IMG SRC="./I-IMG/5.gif">05</A>
16 <A HREF="./H-IMG/6.jpg><IMG SRC="./I-IMG/6.gif">06</A>
17 <A HREF="./H-IMG/7.jpg><IMG SRC="./I-IMG/7.gif">07</A>
18 <A HREF="./H-IMG/8.jpg><IMG SRC="./I-IMG/8.gif">08</A>
19 <A HREF="./H-IMG/9.jpg><IMG SRC="./I-IMG/9.gif">09</A>
20 <HR>
21 <Blink>THANK YOU FOR USING THE ABC FILM PICTURE DISK SERVICE.<Blink>
22 <HR>
23 <IMG SRC="./Res/punct/Q_MARK2.GIF"><A HREF="http://www.abcfilm.co.jp/info/help. html">WHEN HELP IS NEEDED TO USE DISK</A><p>
24 <IMG SRC="./Res/symbol/CONNEC.GIF"><A HREF="http://www.abcfilm.co.jp/info/ORDER.html">WHEN SERVICE FOR EXTRA COPIES IS USED</A><p>
25 <IMG SRC="./Res/symbol/IDEA.GIF"><A HREF="http://www.abcfilm.co.jp/info/info/.html">INFORMATION FROM ABC FILM<p>
26 </HTML>

Figure 31:
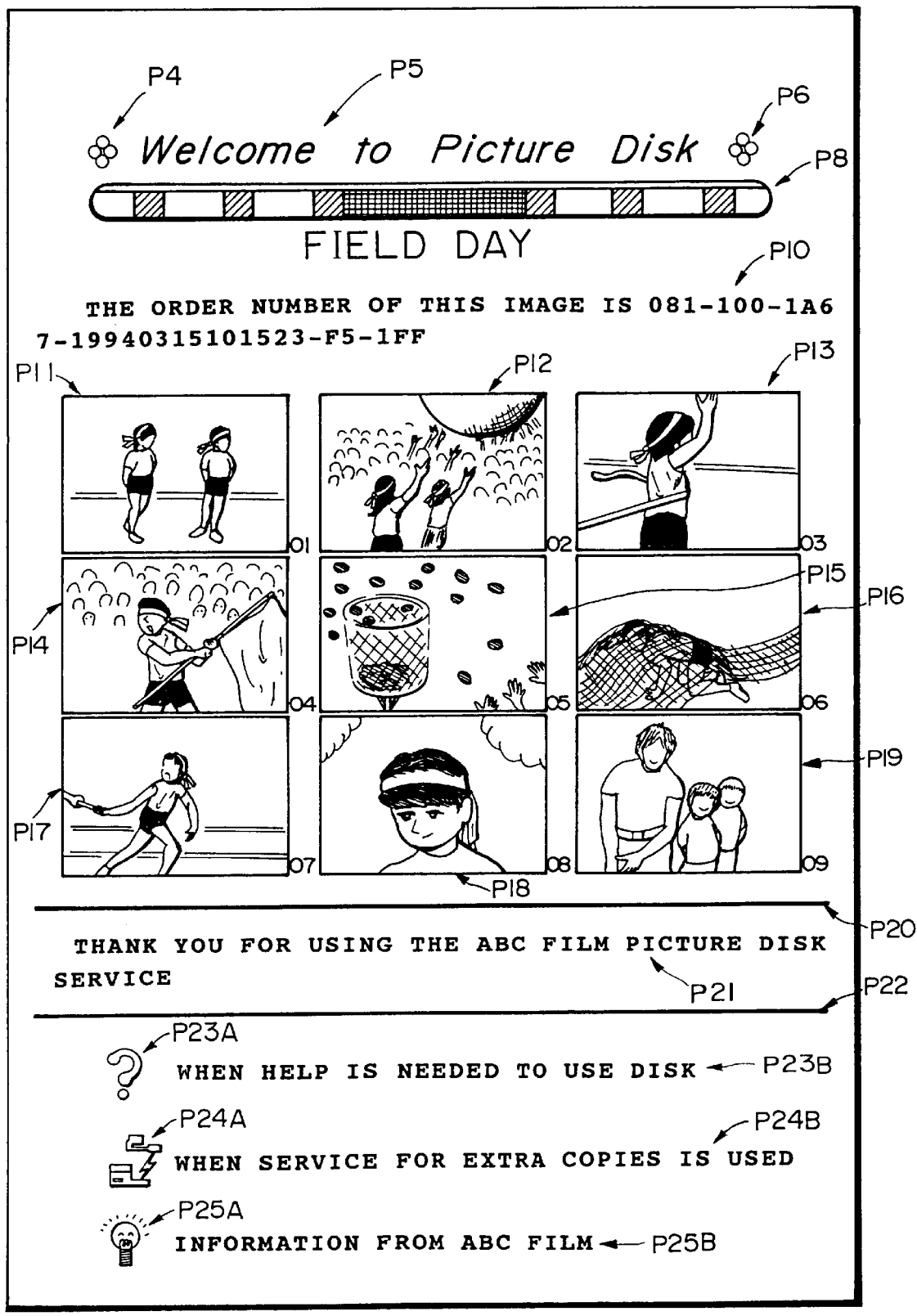
FIG. 31 is a diagram showing an example of a screen displayed in accordance with hypertext.

FIG. 31 illustrates an example of an image displayed on the display screen of the display unit of the playback machine in accordance with hypertext. The meaning of each line of hypertext is as follows:

First line: indicates the start of the description of hypertext by HTML language.

Second line: indicates that the title (the title assigned to the window) is "Picture Disk".

Third line: indicates the start of a centering display. Images displayed by commands on the lines between "<center>" on the third line and "</center" on the seventh line described later are displayed upon being centered.

Fourth line: "./Res/dots/GR_DIAM.GIF" indicates the path to a video component that has been stored in the hypertext area of the user's disk. (The path is information needed to access the storage area of the video component and often is represented by an offset to the storage location or by address length.) The instruction on the fourth line indicates that an image represented by a video component (image data) accessed by this path is to be displayed. The image displayed by the instruction on the fourth line is indicated at P4 in FIG. 31.

Fifth line: an instruction representing the fact that the characters "Welcome to Picture Disk" are displayed at font size 7 (FONT SIZE=7) and with emphasis (STRONG). The character codes expressing the characters "Welcome to Picture Disk" are contained in the instruction statement. Image data representing the corresponding characters is generated from a character generator within the playback machine in accordance with these character codes. The image displayed by the instruction on the fifth line is indicated at P5 in FIG. 31.

Sixth line: indicates that an image represented by a video component accessed by the path "./Res/dots/GR_DIAM.GIF" is to be displayed. This is the image indicated at P6. (This image is the same as the image indicated at P4.)

Seventh line: indicates end of the centering display.

Eighth line: indicates that a line feed "<p>" is performed and that an image (indicated at P8) represented by a video component that has been stored in the hypertext area accessed by the path "./Res/bars/GR_BAR.GIF" is to be displayed.

Ninth Line: indicates that the characters "FIELD DAY" (denoted by P9) are to be displayed at font size 5. The codes representing. the characters "FIELD DAY" are constituted by the information IX1 read from the photographic film. More specifically, the area in which these characters are to be inserted is a blank field in the hypertext template. When the computer system 10A edits the hypertext and stores it on the user's disk, the film information IX1 is inserted into the location of the blank field.

Tenth line: indicates that the characters "THE ORDER NUMBER OF THIS IMAGE IS 081-100-1A67-19940315101523-F5-1FF" are displayed after a line feed "<p>", and that the number (081- . . . -1FF) in the range bracketed by "<Blink>" is to be flashed. This display in indicated by P10.

The number (081- . . . -1FF) is the above-mentioned identification code for specifying the series of image data read from one roll of photographic film. This identification code has the following meaning (where numerals are expressed by hexadecimal numbers):

| | |
|---|---|
| Country No: Japan | 081 |
| District No: Tokyo | 100 |
| Store No: XX Camera Shop, Shinjuku, Tokyo | 1A67 |
| Date & Time: 1994/03/15 10:15:23 | 19940315101523 |
| Processing Machine No: | F5 |
| Processing Serial No: | 1FF |

As set forth above, the identification code is created by the computer system 10A and is described in the hypertext, whereby the identification code is recorded on the user's disk.

The identification code serves also as the order number for printing of extra copies.

11th line: indicates that an image (indicated at P11) represented by the reduced image data in the reduced-image file accessed by the path "./I-IMG/1.gif" is to be displayed, and that a number "01" for specifying this reduced image also is to be displayed.

"<A HREF="./H-IMG/1.jpg">" is an instruction indicating that when the displayed reduced image is clicked using a mouse or the like, the original image represented by the original image data in the high-definition image file accessed by the path "./H-IMG/1.jpg" is to be displayed.

12th~19th lines: The instructions on these lines also indicate that the reduced images of the respective frames stored in the reduced-image file are to be displayed, and that when a reduced image is clicked, the original image corresponding to the clicked imaged is to be displayed.

Accordingly, the reduced images represented by all of the reduced image data that has been stored in the reduced-image file of the user's disk are displayed in a form constructing multiple pictures, as shown at P11~P19 in FIG. 31, by the instructions from the 11th to the 19th lines. Though nine reduced images are displayed in this embodiment, the reduced images of all frames contained in one roll of film are displayed. Accordingly, such the reduced-image display instructions as represented by the 11th through 19th lines are created with regard to the reduced images of all frames contained in the photographic film. Of course, an arrangement may be adopted in which the frames are displayed not on one multiple-picture display but by being divided into two or more multiple-picture displays if the number of frames is very large.

When the user clicks a desired reduced image (a part of the images or a location displaying a number, such as 01, 02, etc.) upon observing the plurality of displayed reduced images, the original image corresponding to the clicked reduced image is displayed in enlarged form on the display screen. The user observes this and is capable of closely checking or. verifying the displayed original image.

In a case where there is frame information (IX2) read from the photographic film, this frame information is inserted into the statement (instruction statement) of each frame. As a result, the frame information also is displayed in correspondence with the reduced images.

20th and 22nd lines: Indicate that the images of the lines (shown at P20, P22) are to be displayed to partition off. "<HR>" signifies drawing of Horizontal Rule.

21st line: Presents a flashing display of a sentence reading "THANK YOU FOR USING THE ABC FILM PICTURE DISK SERVICE". "ABC FILM" is the name of the company providing the laboratory service.

23rd line: includes instructions for displaying an image (indicated at P23A) represented by a video component accessed by the path "./Res/punct/Q_MARK2.GIF" in the hypertext area, and for displaying characters reading "WHEN HELP IS NEEDED TO USE DISK" (indicated at P23B).

The playback machine is capable of being connected to a server, which is installed in the laboratory or in another service company, via the Internet (www). Here "www.abc-film.co.jp" represents the address of the server; "HREF" is an instruction calling for linking; and "http" is a header indicating a file on World Wide Web server. "<HREF="http://www.abcfilm. co.jp/info/help.html">" represents the fact that when image P23A has been clicked, the machine communicates with the server "www.abcfilm. co.jp", accepts the data of the page (stored on this page is data representing an explanation regarding the method of using the picture disk) addressed by the path "www.abcfilm.co.jp/info/help.html" of the server, and that the image (explanatory statement) represented by this data is to be displayed. As a result, the user is capable of ascertaining the way the picture disk is used.

24th line: indicates that an image (indicated at P24A) represented by a video component accessed by the path "./Res/sumbol/CONNEC.GIF" in the hypertext area is displayed, and that a statement (indicated at P24B) reading "WHEN SERVICE FOR EXTRA COPIES IS USED" is to be displayed. Further, an instruction is included which, if image P24 has been clicked, is for displaying an image represented by the data of the page accessed by the path "www.abcfilm.co.jp/info/ORDER.html" of the server having the address "www.abcfilm.co.jp". This page of the server stores data for displaying text and graphics which introduce the way an operation is performed at the playback machine to order extra prints.

Accordingly, if the user clicks the image P24A and enters data (the image number for which an extra print is desired, as well as the number of extra prints) for ordering reprints from the playback machine in accordance with the instructions subsequently displayed, the data for ordering the extra prints is transmitted to the server. The ordering of the extra prints can be performed on-line using the playback machine.

25th line: expresses the fact that an image (indicated at P25A) represented by the video component accessed by the path "./Res/symbol/IDEA.GIF" in the hypertext area is to be displayed, as well as characters (indicated at P25B) reading "INFORMATION FROM ABC FILM". Further, this line expresses the fact that when image P25A is clicked, a page indicated by the path "www.abcfilm.co.jp/info/info/.html" of the server "www.abcfilm.co.jp" is to be displayed. As a result, an add campaign being performed by ABC FILM, event information and advertisements are displayed on the display screen of the playback machine.

26th line: indicates end of the HTML description.

An example of hypertext for a case in which plural frames of image data on one roll of film have been stored on one user's disk has been described. Image data on a plurality of rolls of film also can be stored on a single user's disk. In such case the above-mentioned hypertext is created for the images of each roll of film. Hypertext of a hierarchy higher than hypertext for each roll of film, for displaying the representative image of each film before the display of the images of each film also is prepared in advance and stored on the user's disk. When the user selects one representative image upon observing the display of the representative images in accordance with the hypertext of the higher hierarchy, a display of the kind shown in FIG. 31 in accordance with the hypertext relating to the film represented by the selected image is presented. It is of course possible to create hypertext in which the content of the hypertext relating to each photographic film and the content of the higher order hypertext for selecting a photographic film are unified.

In the foregoing embodiment, there is no information (IX1, IX2) with regard to images read from conventional photographic film not possessing information recording zones. This means that the locations at which these items of information are to be inserted are left blank.

The playback machine is capable of being connected to a communication line with access to the Internet or the like and possesses a communication function. The construction of the playback machine is as shown in FIG. 2. The computer system of this playback machine is provided beforehand with a hypertext interpreting program.

(7) Laboratory System (third aspect)

A laboratory system suited to the handling of new photographic film having the information recording zones shown in FIG. 24 will now be described. The description rendered above with regard to the arrangement of data in the information recording zones (FIG. 25) and with regard to the construction of the camera (FIG. 26) applies also to this embodiment.

Figure 32:
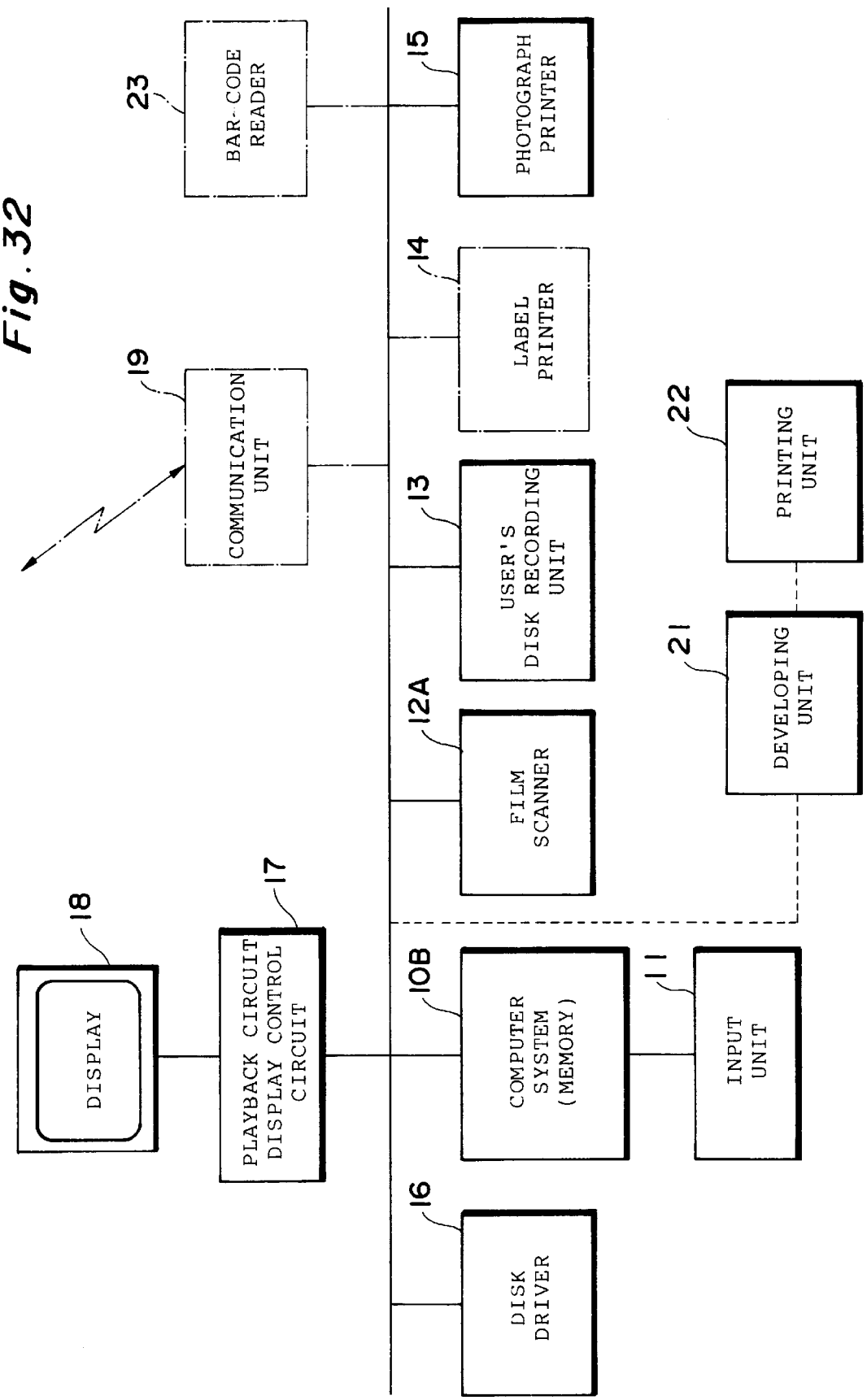
FIG. 32 is a block diagram showing the electrical configuration of a laboratory system (third aspect)

FIG. 32 illustrates the construction of the laboratory system. Components identical with those shown in FIGS. 1 and 27 are designated by like reference characters and need not be described again in order to avoid prolixity.

A computer system 10B and a film scanner 12A are configured as shown in FIGS. 28 and 29, respectively.

In a case where use is not made of labels on which identification codes have been printed, the label printer 14 and bar-code reader 23 may be dispensed with, just as in the second aspect of the laboratory system.

The recording unit 13 for the user's disk records the original digital image data which the film scanner 12A has read from the photographic film, the various reduced digital image data (inclusive of index image data) and the information IX1, IX2 on the user's disk (the portable recording medium) upon editing this data and information.

When the recording unit 13 for the user's disk records digital image data and information IX1, IX2, obtained from one role of photographic film, on the user's disk, the unit 13 records an identification code per roll of film on the user's disk as necessary. Though the identification code basically is for identifying film, it is preferred that it make clear which laboratory (or dealer) processed the film and which laboratory system was used to process the film.

The disk driver 16 records the original digital image data and the information (inclusive of IX1, IX2) of the information recording zones, which data and information are outputted by the film scanner 12A, on the lab's disk (after temporarily storing the data and information in the memory of the computer system if necessary), and reads designated original digital image data out of the lab's disk. The original digital image data read out is applied to the photograph printer 15 in order that photographs may be printed, as mentioned above. A hard disk, optical disk or magneto-optical disk would be used as the lab's disk. A magnetic tape may be used instead of the lab's disk.

The original digital image data outputted by the film scanner 12A preferably is recorded on the lab's disk on a per-film basis. At this time the above-mentioned identification code generated in association with the particular file also is stored on the lab's disk in correspondence with the original digital image data. Thus, the same identification code is attached to the photographic film (in a case where a label is affixed), to the image data generated by the reading of this film and recorded on the user's disk and to the image data obtained by the reading of the film and recorded on the lab's disk.

The playback and display control circuit 17 and the display unit 18 are used in displaying a menu screen and in displaying images when the laboratory system is operated by an operator. With regard to the display of images, an image represented by the image data outputted by the film scanner 12A, an image represented by the reduced image data that is to be written to the user's disk or that has been read from the user's disk, and an image represented by the original image data read out of the lab's disk are displayed on the display screen of the display unit 18 as necessary.

The communication unit 19 is provided when necessary. The communication unit 19 communicates with the playback machine used by the user, via a public telephone line (inclusive of an ISDN). The communication unit 19 is used mainly to receive order data (described later in detail) transmitted from the playback apparatus.

(8) Practical Operation (second aspect) of Laboratory System and Playback Machine The practical operation of the laboratory system (third aspect) and playback machine possessed by the user will now be described in general terms. This will make it possible to comprehend the overall flow of operation.

Figure 33:
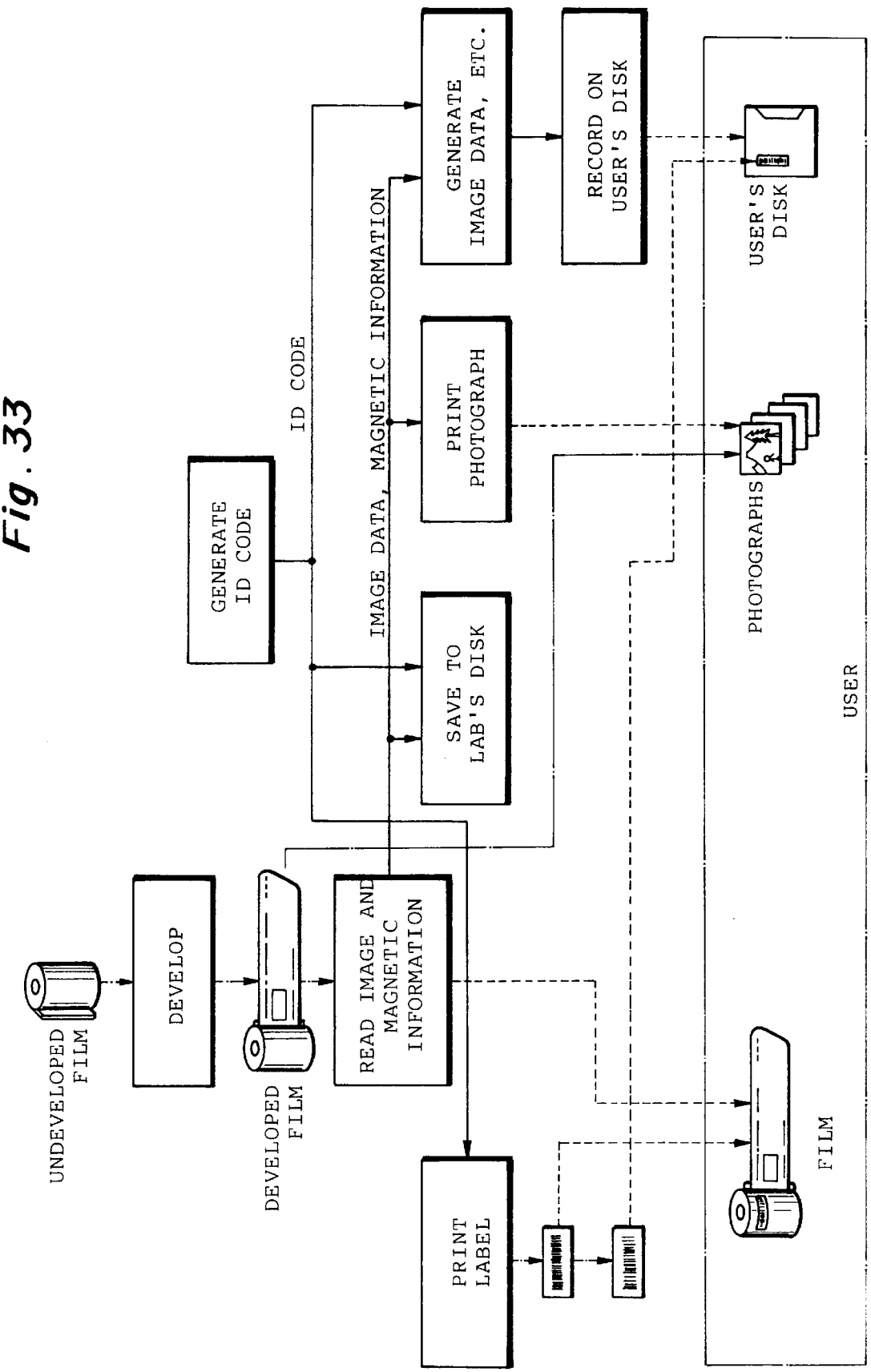
FIG. 33 is a block diagram showing an example of the practical operation of the laboratory system (third aspect)

FIG. 33 illustrates a mode of use (operation) of the laboratory system (third aspect) when a new type of undeveloped film (with the above-mentioned information recording zones) in the possession of the user is developed and the photographs printed by the laboratory.

After taking photographs using a camera, the user generally has the laboratory develop the film and printing the photographs. At the laboratory, the image data representing the images read from the developed film and the information IX1, IX2 read from the film are recorded on the user's disk, which is subsequently delivered to the user. The undeveloped film in the possession of the user is taken to the laboratory directly or via a dealer or photography shop. In general an order form (sales slip) is created at such time.

The exposed and undeveloped film is subjected to a developing treatment at the laboratory through use of the developing unit 21. The images on the developed film are then printed on photographic paper by the printing unit 22, whereby photographs of the images appearing on the film are created. The creation of the photographs may be performed using the photograph printer 15 without relying upon the printing unit 22. In the case of new photographic film having the information recording zones, the film is not cut into strips each of which has a length equivalent to a plurality of frames. Instead, the film is kept at its original length and is maintained in rolled-up form inside the magazine (or other container). Information such as the developing conditions and printing conditions is written in the information recording zones 3a, 3b for laboratory use on the photographic film.

Next, the images on the developed film and the information in the information recording zones 3c, 3d (and 3a, 3b if necessary) are read by the film scanner 12A. The read image data (when necessary, this data is subjected to processing to obtain the appropriate image data) and the information in the information recording zones 3c, 3d (and 3a, 3b) are, on the one hand, stored on the lab's disk of the laboratory system together with the generated identification code.

The image data read from the photographic film and the information in the information recording zones are also processed and edited appropriately and stored on the user's disk together with an identification code if necessary.

Further, video (image) components (parts or resources) and audio (sound) components used to automatically create a slide show are recorded, or have been recorded in advance, on the user's disk.

A label on which a bar code representing a generated identification code has been printed is issued by the label printer 14 as necessary. The label is affixed to the developed film as necessary. It is preferred that the label be affixed to the user's disk as well.

The developed film (having the label affixed thereto), the printed photographs and the user's disk (to which a label has been affixed) are delivered to the user. Naturally the service fee is paid.

By loading the user's disk thus delivered to the user in the playback machine, the user, in a manner described later in greater detail, is capable of playing back the images of photographs, which have been recorded on the user's disk, together with sound expressed by the audio components after the images have been combined with video components. The combination of combined images and sounds is referred to as a "slide show" program (only combined images or only a combination of photographic images and sounds may also be referred to as a slide show). Though the creation of a slide show program is performed automatically by the playback apparatus, the user is capable of changing or revising a slide show that has been created automatically. Of course, an arrangement may be adopted in which the user creates the slide show program from the start.

The printing of photographs would be unnecessary in a case where the user desires only the user's disk.

The user's disk and the lab's disk can be used for the printing of extra copies without relying upon film.

The ordering of extra prints is performed by recording order data on the user's disk, by transmitting order data to the laboratory system from the playback machine, or by writing the particulars of the order on a sales slip.

The recording of the order data on the user's disk is carried out using the playback machine (if the machine has the order function). The user delivers the user's disk, on which the order data has been recorded, to the laboratory directly or via a dealer.

In a case where the order data is transmitted from the playback machine (which has the order function) to the laboratory system via a communication line, the user need not deliver the user's disk to the laboratory system. The user's disk is merely employed when the user creates the order data using the playback machine (as for the purpose of verifying the images to be ordered). Extra prints created by the laboratory system would be sent to the user by mail or through use of a delivery service. The fee would be paid by credit card.

If a label has been affixed to the user's disk delivered to the laboratory, the identification code on the label is read by the bar-code reader. Alternatively, the identification code included in the order data recorded on the user's disk is read by a magnetic disk reader.

The identification code read from the user's disk or included in the order data transmitted via the communication line is compared with the identification code attached to the image data saved on the lab's disk in the laboratory system.

Image data is saved on the lab's disk for a fixed period of time (two or three months, six months, one year, etc.). When the fixed period of time elapses, the image data is erased. Whether the image data for which extra prints have been ordered has been saved on the lab's disk is checked by the above-mentioned comparison processing.

If the image data of interest has been saved on the lab's disk, the order data that has been recorded on the user's disk is read. In accordance with the order data read from the user's disk or the order data that has been received, the ordered frames of image data of the film are read out of the lab's disk and the photograph printer is used to print photographs of ordered size and conditions in the number of copies ordered.

The printed photographs and the user's disk (in the case where an order has been placed using the disk) are delivered (sent) to the user.

In a case where the ordered image data has not been saved on the lab's disk, the printing of extra copies of photographs would be carried out using the film in the possession of the user.

The identification code is used in order to identify the image data that has been saved on the user's disk, on the film and on the lab's disk and is utilized especially when extra prints are made. If this identification can be made in another form, or if extra prints can be made based upon the film, the identification code will be unnecessary. It will also be unnecessary to save image data on the lab's disk. In particular, in terms of the feature associated with this embodiment (creation of a slide-show program), identification codes need not be used at all; it will suffice merely to store the image data and information IX1, IX2 on the user's disk.

(9) Structure of User's Disk

The user's disk is realized by an optical disk or magneto-optical disk, as mentioned above. However, the user's disk can be classified into two types from the standpoint of the resources (video components and audio components) used to create a slide show in the playback machine.

One type of user's disk is referred to as a "hybrid" disk (optical disk), in which a ROM area in which data cannot be written and an area (RAM area) capable of being written and read freely are provided on one and the same disk. The other type of user's disk (referred to as an ordinary disk) is one in which all of the areas are capable of being written and read freely.

Figure 34:
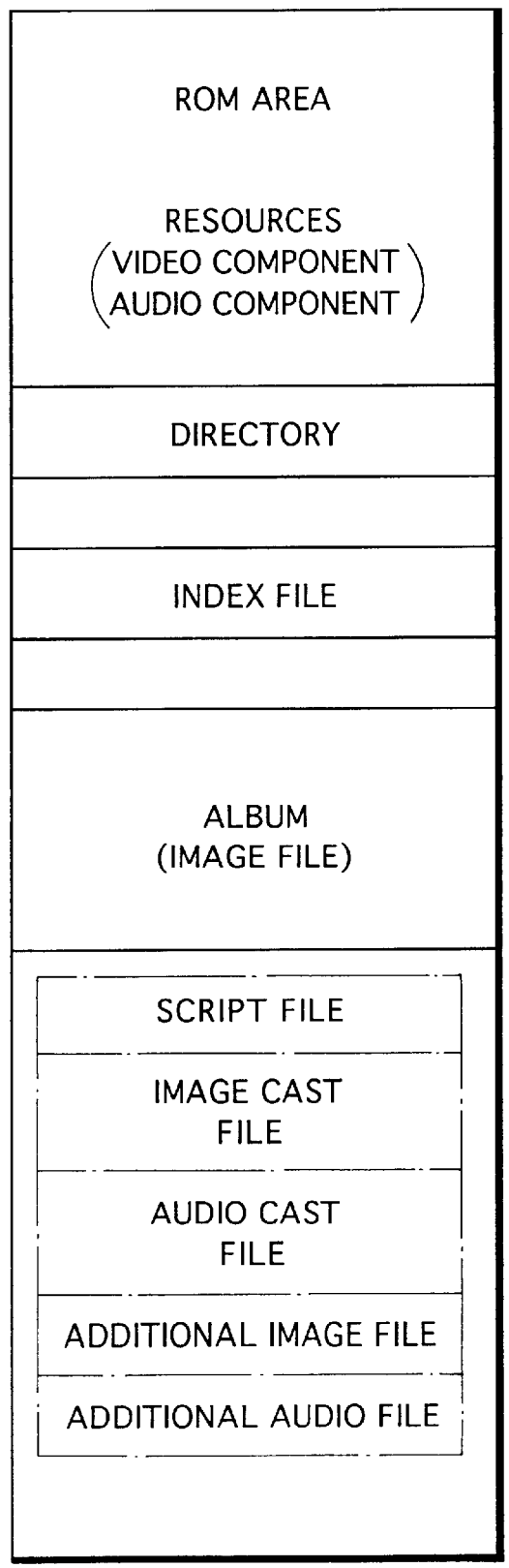
FIG. 34 is a diagram showing the data recording structure of a hybrid disk (user's disk)

FIG. 34 illustrates the overall recording structure of a hybrid disk. In a hybrid disk, resources (described later) for creating a slide show program are recorded in the ROM area beforehand with regard to each of the 99 events (information IX1) mentioned above. The ROM area includes a directory area and a resource storage area. In a case where a special-purpose hybrid disk is created in advance for each event, it will suffice to record resources regarding one type of event on the disk.

Figure 35:
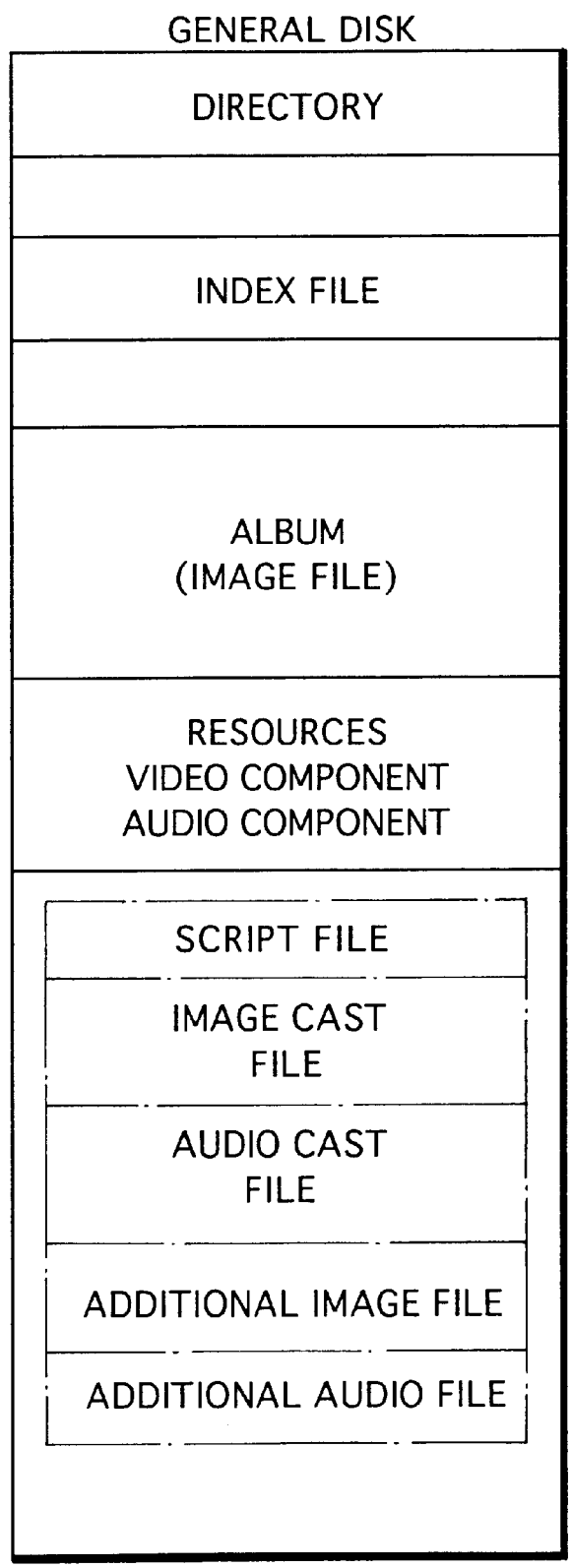
FIG. 35 is a diagram showing the data recording structure of an ordinary disk (user's disk)

FIG. 35 illustrates the overall recording structure of an ordinary disk. The ordinary disk also is provided with a recording area for creating a slide show program. Resources are created in advance, with regard to each of the 99 types of events, on the hard disk (or floppy disk) in the computer system 10B in the laboratory system. When image data and information (IX1, IX2) on photographic film are recorded on the ordinary disk, the resources relating to an event represented by the information IX1 are recorded in the resource storage area of the ordinary disk.

The structures of the hybrid disk and ordinary disk are identical in other aspects. More specifically, these user's disks (the RAM area in case of the hybrid disk) are provided with a directory area, an index area and an album area. Image data and information on photographic film are recorded in these areas by the recording unit 13 for the user's disk.

The user's disk is further provided with areas for a script file, image cast file and audio cast file and with an area for an additional image file and additional audio file. Various data (commands), described in detail later, are stored in these areas automatically by the playback machine or by the user using the playback machine.

Figure 36:
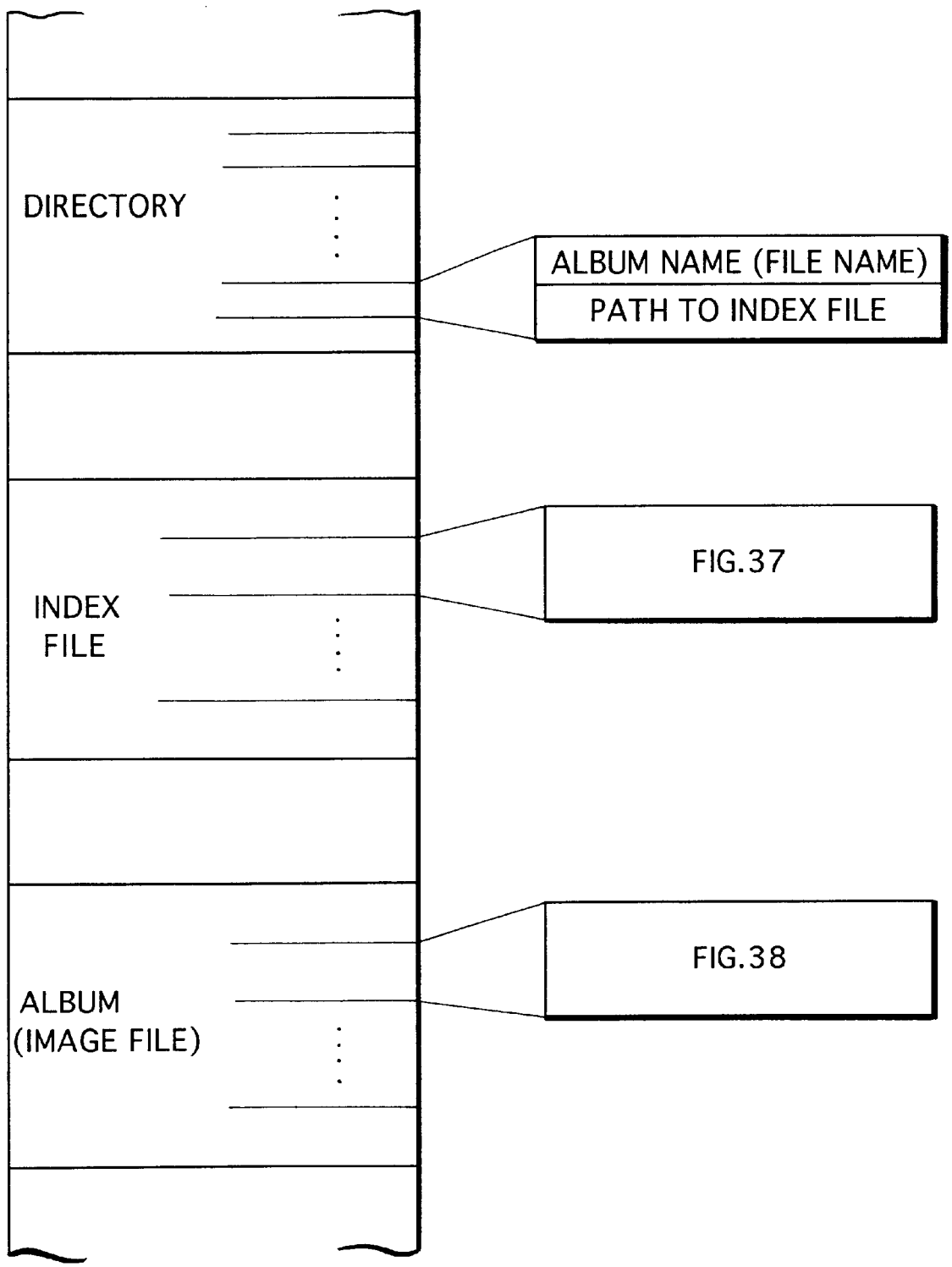
FIG. 36 is a diagram showing an example of the constitution of a directory, index file and album of a user's disk.
Figure 37:
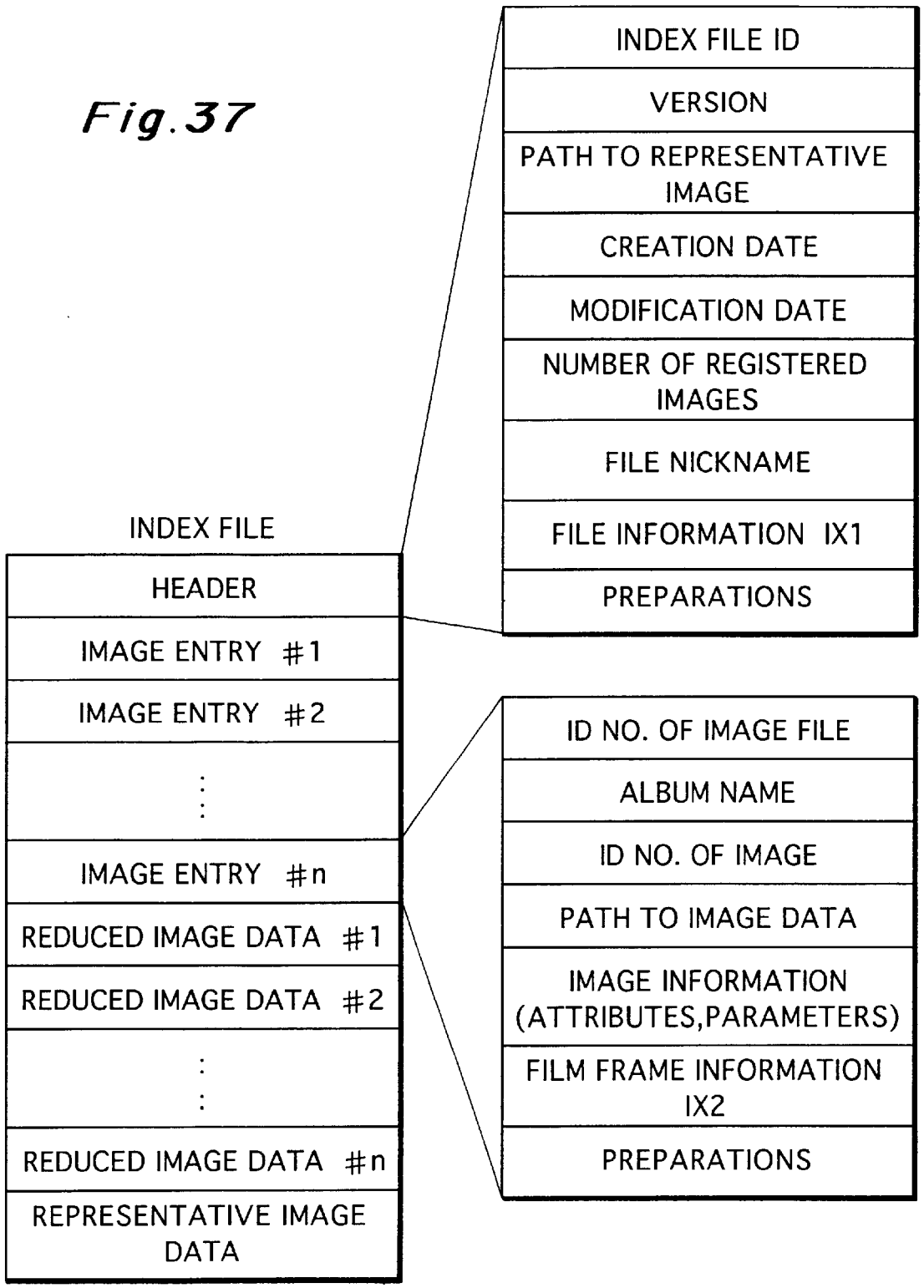
FIG. 37 is a diagram showing the details of an index file.
Figure 38:
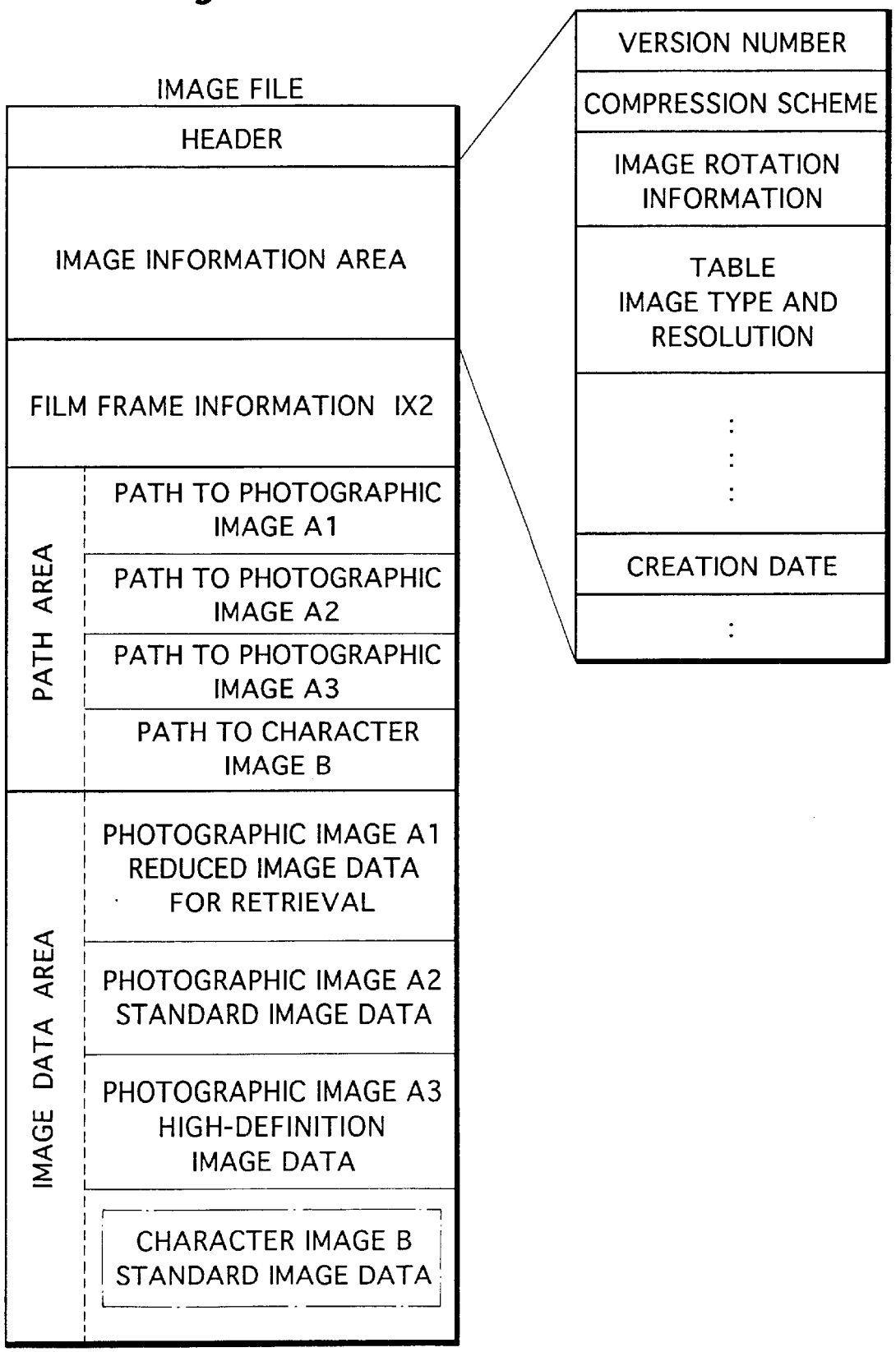
FIG. 38 is a diagram showing the details of an image file.

FIG. 36 illustrates the structure of a directory, index file and an album provided on the user's disk. The details of an index file regarding one album are shown in FIG. 37, and the details of an image file regarding one album are illustrated in FIG. 38. The album mentioned here refers to a collection of image data obtained from one roll of photographic film. For example, if 40 frames of images have been recorded on one roll of photographic film, one album will contain 40 frames of image data.

The album name and the path to the index file of this album (the path is the offset or address length up to each index file or other information necessary for accessing the index file) are described in the directory on a per-album basis. The album name is the event name (field day, birthday, etc.) represented by the information IX1. Accordingly, the album name is decided automatically by the computer system 10B of the laboratory system. It is of course permissible to adopt an arrangement in which the album name is decided in conformity with the wishes of the user or in which the user is capable of changing the album name using the playback machine. The album name may be the information IX1 per se. The above-described identification code can be recorded together with album name.

As shown in FIG. 37, an index file header, image entries the number of which is equivalent to the number of images (the number of frames, represented by n) contained in the album, reduced image data regarding each of the n-number of images and representative image data are recorded in the index file regarding one album (image file). Since the data lengths of all of these items are fixed, all of the items can be accessed from the position of the header.

Recorded in the header are an ID indicating that the file is an index file, the version of the index file specifications, the path to the representative image data, the date on which the index file was created, the date on which the index file was modified, the number (the above-mentioned n) of images (frames) stored in this album (index file), the nickname of the index file, the information IX1 read from the photographic film, etc. The nickname of the film is entered by the user using the playback machine.

Instead of the path to the representative image, the representative image data may be stored at this position. If it is decided in advance that the representative image data will be placed at the end of all of the reduced image data, then the path to the representative image will be unnecessary.

Described in the image entry regarding each image are the ID number (consecutive number or film number) of the image file, the above-mentioned album name (not always required), the ID number (frame number) of the image (frame), the path for accessing the image data of this frame stored in the album (image file), image information such as the attributes (e.g., the direction of rotation of the image, namely vertical or horizontal, or the angle thereof) and parameters (a keyword directly representing the image, the brightness of the image, the camera shutter speed prevailing when this image was obtained, etc.) of the image or image data, and frame information IX2 read from the film. The ID number of the image (frame) can be changed to the nickname of the image by the user.

The reduced image data is image data representing an image obtained by reducing the standard image to (⅛)× (⅛)=1/64, as mentioned earlier.

Thus, the entirety of the information regarding one roll of film is described in the index file, and all of the image information contained on the film can be ascertained by observing the index file (especially by reproducing and displaying the reduced image data).

FIG. 38 illustrates an image file regarding one image. This is referred to as a "merged-type image file", which includes image data representing a picture and image data representing characters. The items of picture and character image data can be read out of the image file, merged and displayed as a merged image of a picture and characters.

The image file is composed of a header, an image information area, an area for frame information IX2, a path area and an image data area.

Image data representing a captured (photographic) image (picture) is stored in the image data area as well as image data representing a character image.

The image data representing the captured image is of three types, namely reduced image data A1 for retrieval, standard image data A2 and image data A3 for high definition.

The reduced image data A1, which is created by reducing (to 1/64 of) the standard image data A2 using pixel elimination (thinning out) or averaging processing, is used mainly in retrieval processing. More specifically, at the time of retrieval processing, each item of the reduced image data is read out of a number of merged-type image files and the reduced images represented by these items of reduced image data are displayed on a display screen so as to construct a multiple-picture display. Since reduced image data has been stored in the index file as well, the reduced image data Al is not always necessary.

The standard image data A2 is image data having a resolution suitable for display on a television screen. The high-definition image data A3 has a high resolution (four times that of the standard image data) and is used to present a high-definition display or to produce a high-definition printout. Image data having an even higher resolution (e.g., four times that for high definition to obtain a larger printed image) can be included in the merged-type image file. The number of types of image data representing natural pictures is not limited.

The items of image data A1, A2, A3 are generated in the laboratory system in the manner set forth above.

Character image data B can be entered in the playback machine by the user. Accordingly, the data generally is not created in the laboratory system. Of course, it is also possible to create the data in the laboratory system based upon the information IX2. It will suffice if the character image data B is at least equivalent to the character area; one screen of this image data is not always necessary. Plural types of character image data having different resolutions may also be prepared.

It goes without saying that image data representing different pictures and characters may be provided in the merged-type image file. The reason for this is that the merged-type image file combines two or more types of images. Monochromatic image data may also be prepared in addition to color image data.

Items of data (a path or offset or other data related to addresses) for accessing the above-mentioned image data A1, A2, A3 and B are stored in the path area.

A code indicating that the file is a merged-type image file, the name of the album to which this merged-type image file belongs and the name of the merged-type image file are stored in the header.

A version number, compression scheme, image rotation information, a table and creation date, etc., are described in the image information area.

The version number is a number such as "Version 1.2" or "Version 3.5" for identifying the version.

The compression scheme indicates the type of compression (such as JPEG compression) in a case where the image data of the image data area has been compressed. Compression is applied mainly to natural pictures.

The image rotation information indicates how many degrees the image data (particularly of a natural picture) in the image data area should be rotated in the counter-clockwise direction in order for the image to be viewed by the observer correctly when the image data is displayed. For example, this information may be 0°, 90°, 180°, 270°, etc.

The table indicates the type and resolution of the image data stored in the image data area. For example, data indicative of color (24 bits), natural picture (reduced 1/64, standard 1/1, high definition 4/1), character (8 bits), image (standard 1/1) is described in a fixed array in the form of a table. The array coincides with the order of the path data described in the path area. Data indicated of a character (8 bits) is created when the character image data B has been entered.

The creation date is the date on which this merged-type image file was created.

The frame information IX2 is information read from the photographic film. It will suffice if the information IX2 is stored in at least the image file or index file.

An image file having the structure of the merged-type image file is illustrated in FIG. 38. However, it goes without saying that this may be an image file having another format, such as the JFIF (JPEG File Interchange Format), TIFF (Tagged Image File Format), etc.

(10) Reading of Images from Photographic Film and Storage on User's Disk

The images and the information IX1, IX2 recorded on photographic film are read by the film scanner 12A and recorded on the user's disk using the data structure shown in FIGS. 34 to 38 in the laboratory system (third aspect).

In order to obtain more appropriate data, prescanning of the images on the photographic film is performed in the film scanner 12A and parameters for brightness and color correction are set in the CPU 51 of the computer system 10B based upon the results of prescanning. In prescanning, the information IX1, IX2 is read from the information recording zones 3c, 3d of the film and the information is stored temporarily on the hard disk of the computer system 10B. Main scanning (fine scanning) is then carried out in the film scanner 12A and the image data obtained as a result is sent to the computer system 10B. The CPU 51 of the computer system 10B edits the accepted image data and writes the data in the user's disk.

Figure 39:
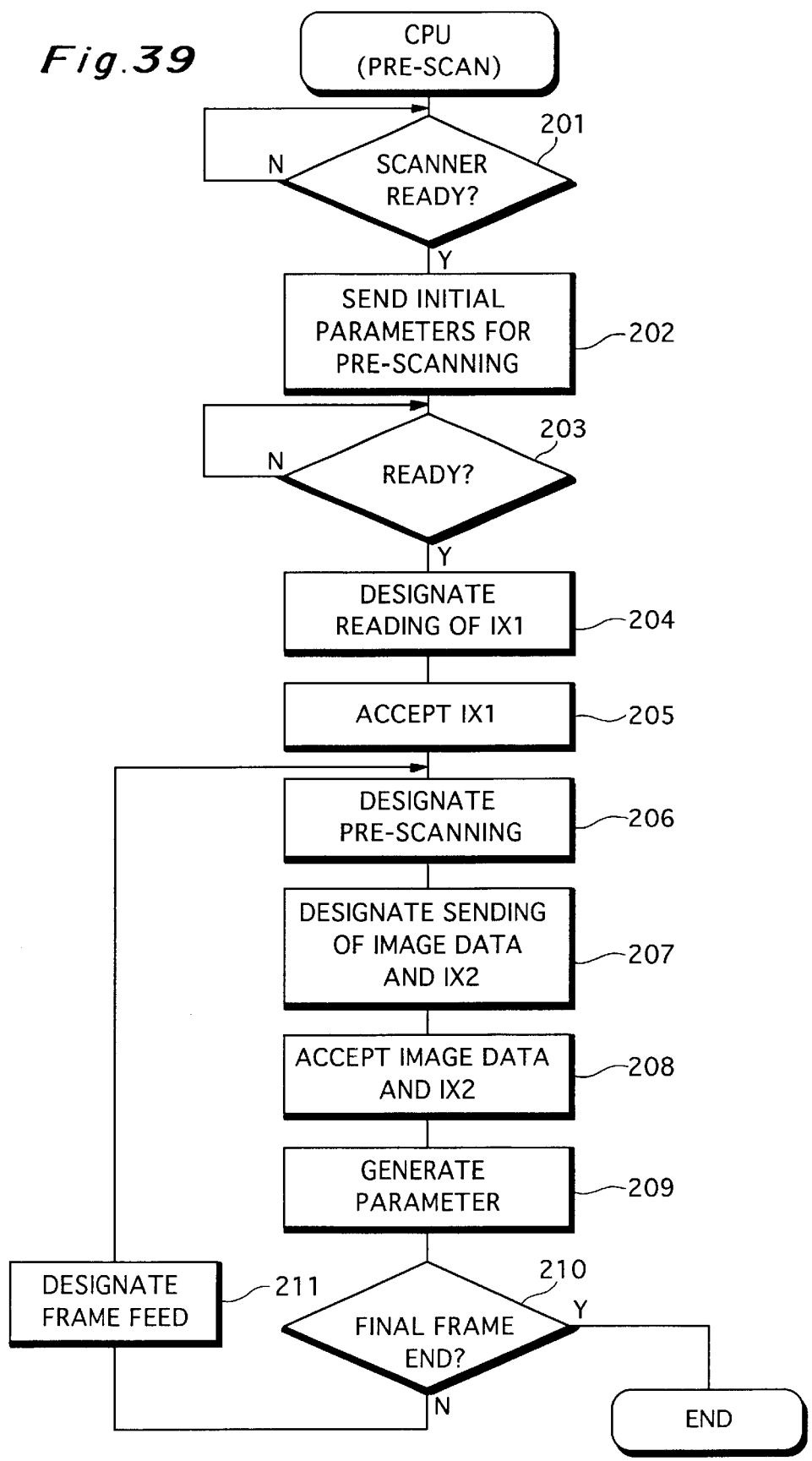
FIG. 39 is a flowchart showing a control procedure executed by a CPU for prescan processing.
Figure 40:
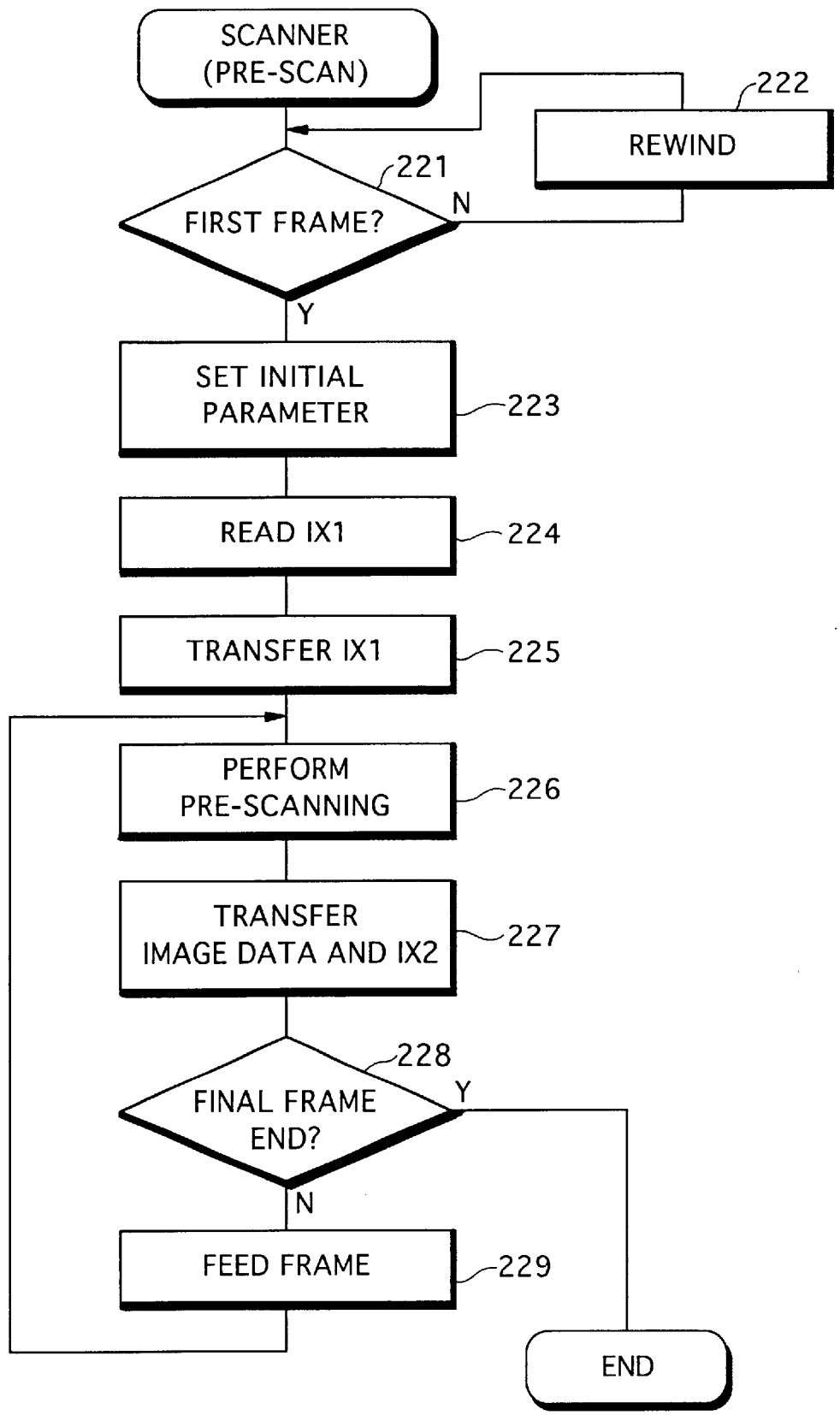
FIG. 40 is a flowchart showing a prescan operation in a film scanner.

FIG. 39 illustrates the operation of the CPU 51 in the computer system 10B which controls the prescanning operation of the film scanner 12A. FIG. 40 represents the prescanning operation in the film scanner 12A.

The power supply of the film scanner 12A is turned on and the film to be read is set in the film scanner 12A. Whether the first frame is at the scanning position is checked in the film scanner 12A (step 221). Since the perforation 2b is formed at the position between adjacent image recording zones 4, as mentioned earlier, whether or not this is the first frame may be recognized by means of the perforation. If the first frame of the film is not at the scanning position, the film is rewound and the first frame is positioned at the scanning position (step 222). As a result, the film scanner 12A is placed in the operative state.

The CPU 51 checks the status of the film scanner 12A and sends initial parameters for prescanning to the film scanner 12A (step 202) if the film scanner is in the operative state (YES at step 201). The initial parameters include the feed pitch of the film (resolution is diminished in comparison with that of main scanning), brightness and color correction values (these are all default values, namely predetermined values).

When the initial parameters are set in the film scanner (step 223), the CPU 51 verifies the fact (step 203) and instructs the film scanner 12A to read the film information IX1 (step 204).

In response, the film scanner 12A reads the information IX1 of the information recording zone 3c (step 224) by means of the magnetic head 75 and sends the read information IX1 to the CPU 51 (step 225). At this time the film is fed once in the reverse direction as necessary, after which the information IX1 is read by the magnetic head 75 in the course of film feed in the forward direction. The CPU 51 temporarily stores the information IX1 transferred from the film scanner 12A on the hard disk (by means of the hard disk driver 16) (step 205).

The CPU 51 thenceforth applies a prescanning command for the first frame to the film scanner 12A (step 206) and then applies a command in such a manner that the image data and frame information IX2 obtained by prescanning is transferred (step 207).

In response, the film scanner 12A scans the image of the first frame, obtains the image data representing this image and reads the frame information IX2 that has been magnetically stored in the information recording zone 3d at the position of the first frame (step 226). The digital image data and information IX2 obtained are sent to the CPU 51 (step 227).

The CPU 51 accepts the image data and the information IX2 (step 208). The accepted information IX2 is stored on the hard disk in correspondence with the frame number. Further, on the basis of the accepted image data, the CPU 51 generates parameters for main scanning and stores the parameters in the memory 52 in correspondence with the frame number (step 209). Further, the CPU instructs the film scanner 12A to advance the film by one frame (step 211).

In response to the instruction for frame feed, the film scanner 12A positions the next frame at the scanning position (step 229).

The issuance of the prescanning instruction and the issuance of the instruction for sending the image data and the information IX2 (steps 206, 207) executed by the CPU 51, the prescanning of an image of one frame and the reading of the information IX2, as well as the sending of the image data and information IX2 obtained (steps 226, 227), executed by the film scanner 12A in response, and the generation of parameters by the CPU 51 based upon the accepted image data as well as temporary storage of the information IX2 (steps 208, 209) by the CPU 51 are repeated until this processing has been applied to the final frame (steps 210, 228). The judgment as to whether or not a frame is the final frame is performed in the film scanner 12A based upon a perforation in the film indicating the final frame.

Figure 41:
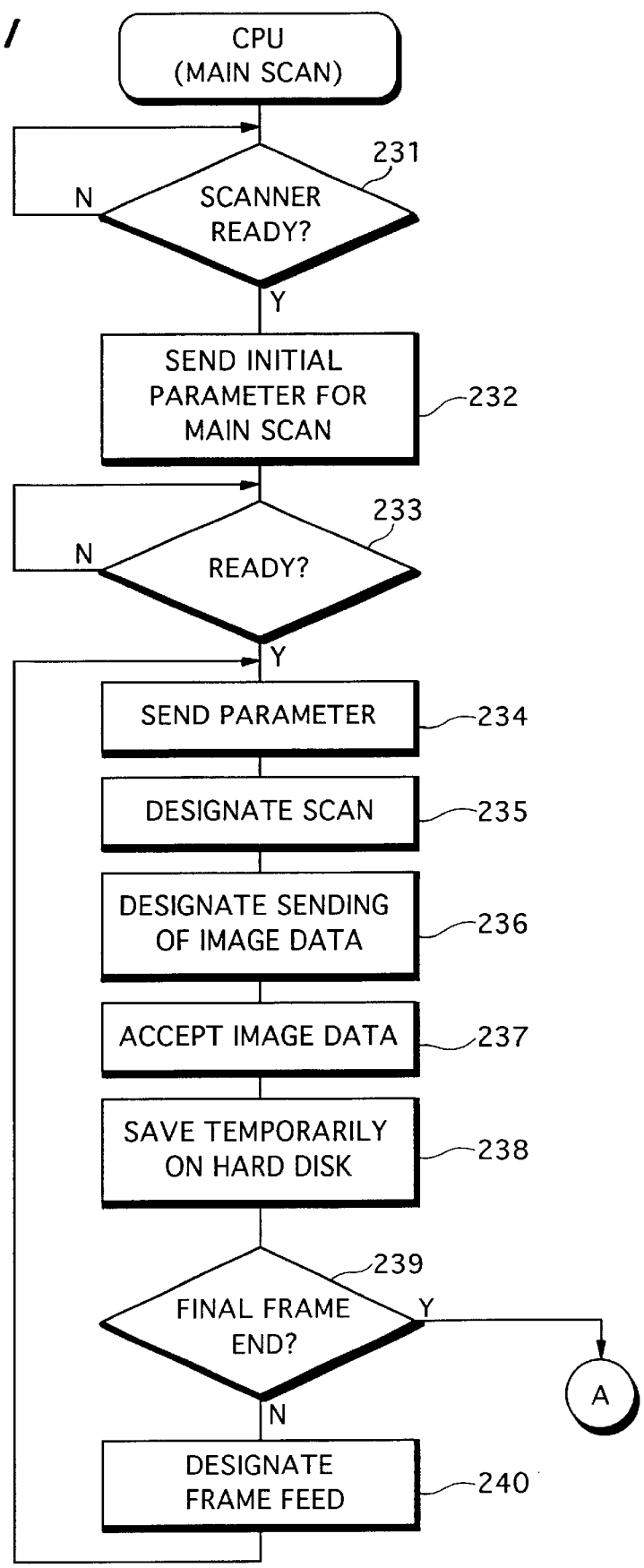
FIG. 41 is a flowchart showing a control procedure executed by a CPU for main scan processing.
Figure 42:
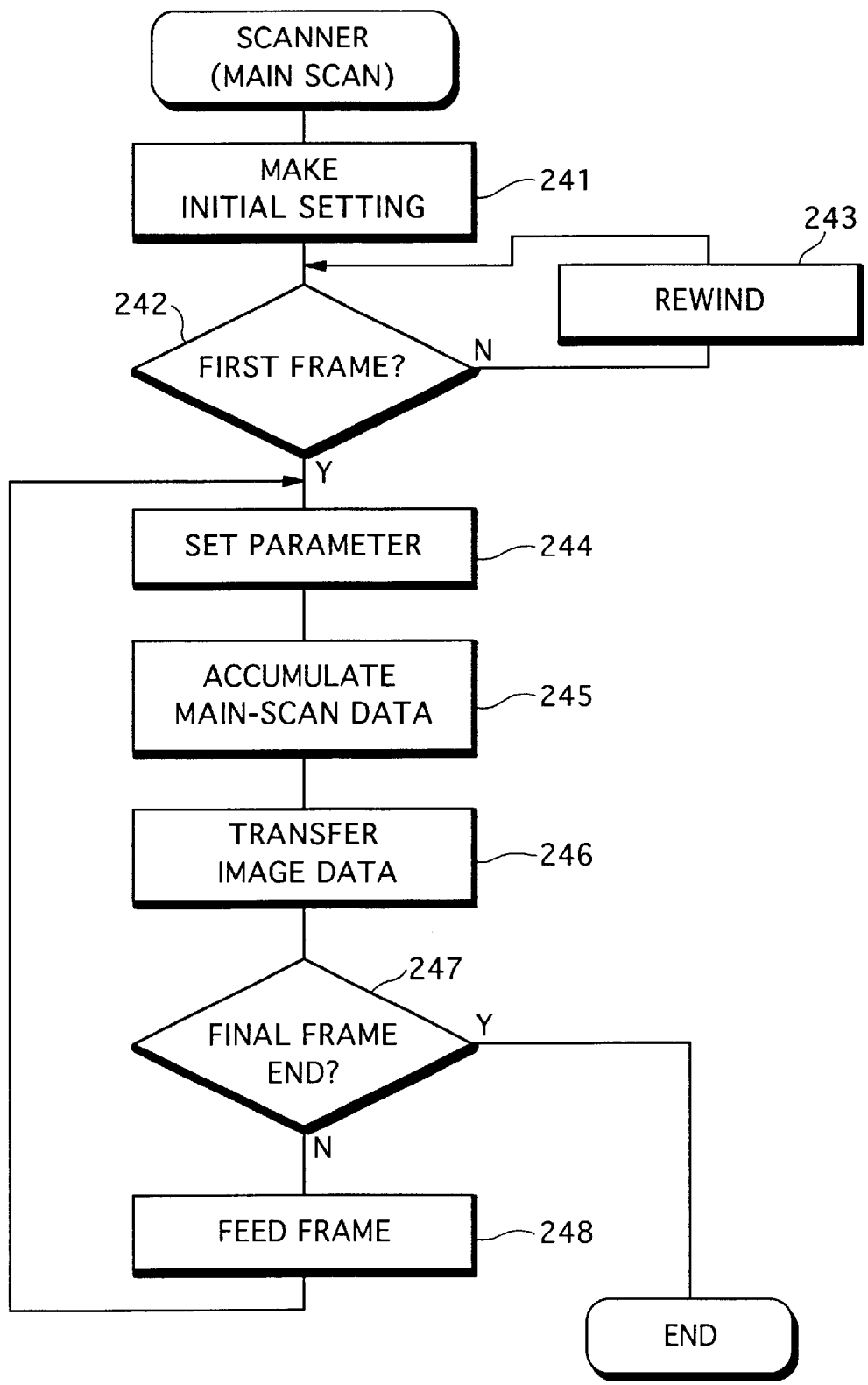
FIG. 42 is a flowchart showing the main scan operation in a film scanner.

FIG. 41 illustrates the operation of the CPU 51 which controls the main scanning operation of the film scanner 12A. FIG. 42 illustrates the main scanning operation in the film scanner 12A. Only the steps that differ from those of prescanning processing will be described.

The CPU 51 sends initial parameters for main scanning to the film scanner 12A (step 232). The initial parameters include the feed pitch of the film. This feed pitch is for obtaining a high resolution and is set in such a manner that a resolution of, say, 2048×3072 pixels is obtained.

Further, the parameters (brightness, color correction values, etc.) created for each frame in prescanning processing are applied to the film scanner 12A by the CPU 51 every main scan of each frame (step 234).

The film scanner 12A responds by setting the parameters, which have been furnished by the CPU 51, prior to the scanning of each frame (step 244).

The film scanner 12A accumulates the obtained high-resolution digital image data in the memory 62 while scanning the image of each frame (step 245). When the scanning of one frame of an image ends, the film scanner 12A sends the obtained image data to the CPU 51 (step 246). It goes without saying that trimming and enlargement processing and the like may be performed when the image data of each frame of the film is obtained.

The CPU 51 controls the hard disk driver 54 in such a manner that the image data transferred from the film scanner 12A is saved temporarily on the hard disk (steps 237, 238).

Figure 43:
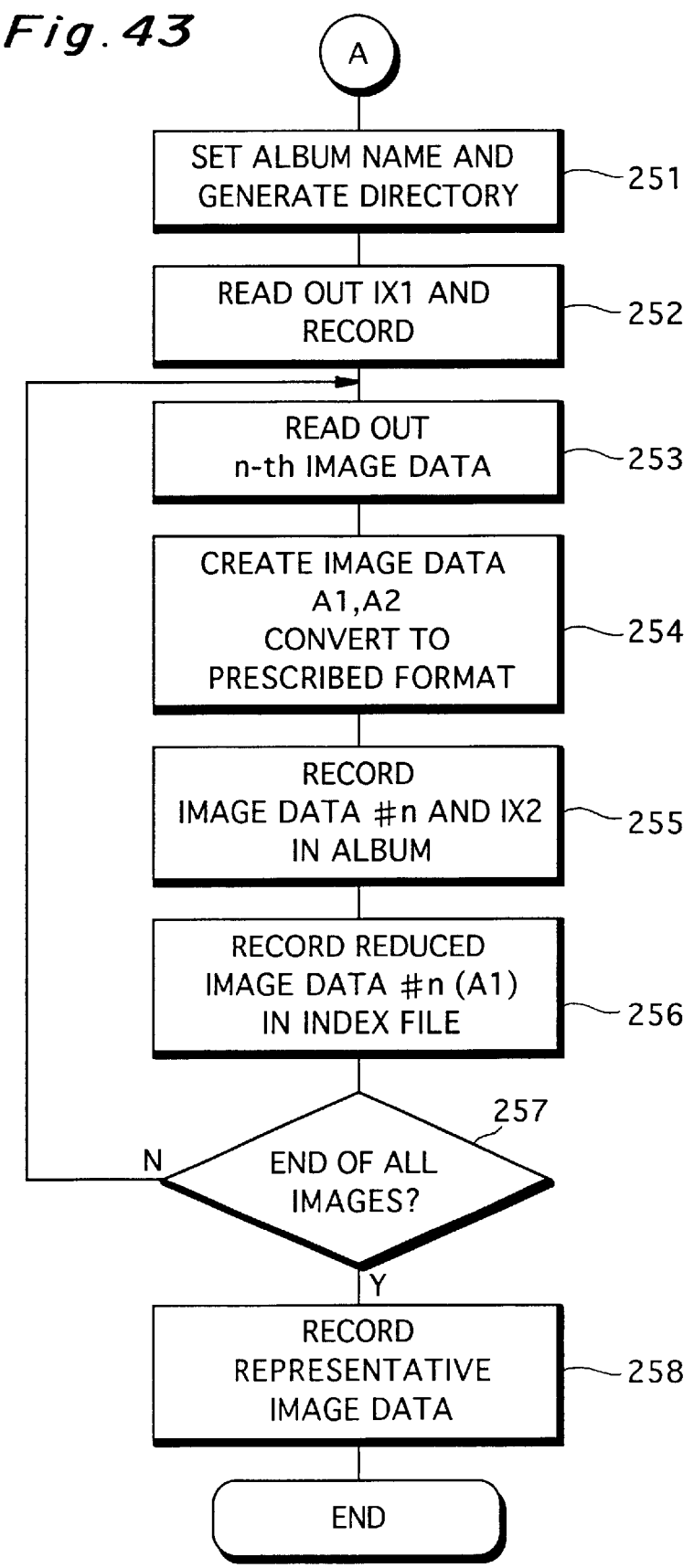
FIG. 43 is a flowchart showing a data recording procedure for recording data on a hybrid disk.
Figure 44:
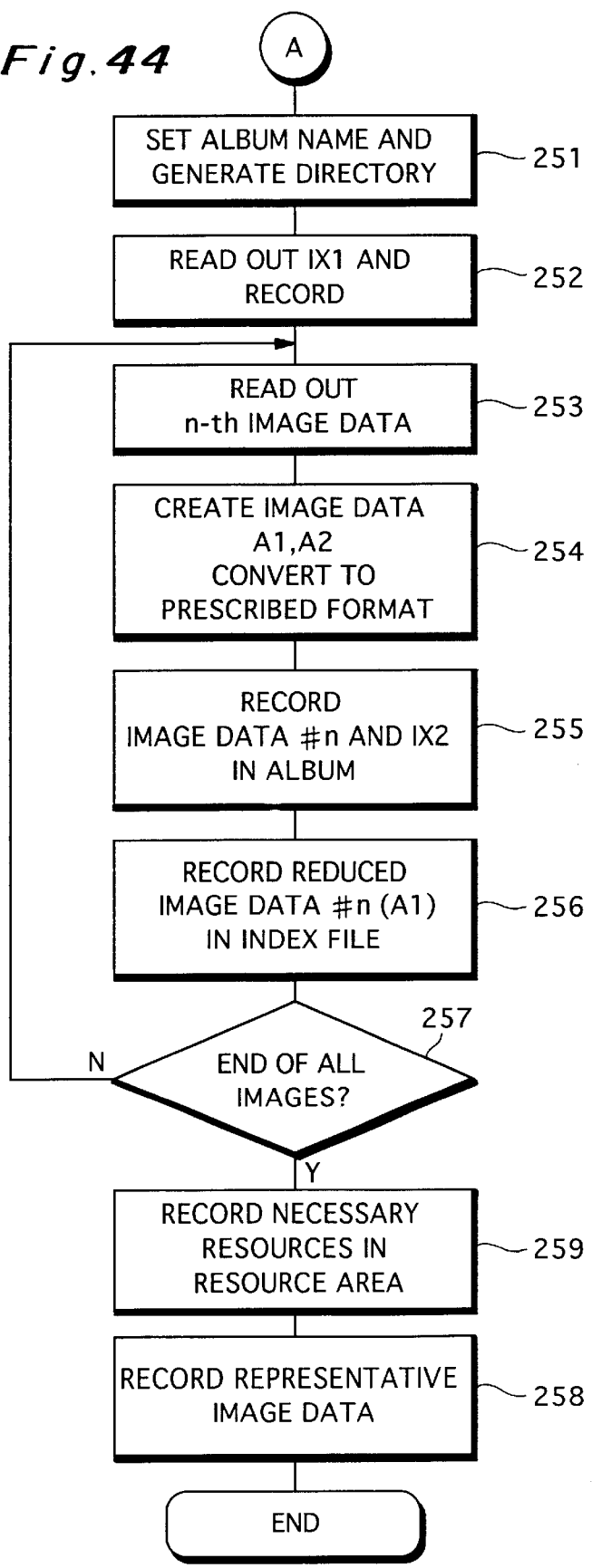
FIG. 44 is a flowchart showing a data recording procedure for recording data on an ordinary disk.

When the image data regarding all frames on one roll of film is accepted and saved on the hard disk, the CPU 51 shifts to processing for editing these items of image data and storing them on the user's disk together with the information IX1, IX2. This processing is illustrated in FIGS. 43 and 44. The CPU 51 executes this processing by controlling the recording unit 13 for the user's disk.

As mentioned above, user's disks are of two types, namely hybrid and ordinary. Resources for creating a slide show program are stored in the ROM area of the hybrid disk in advance. In the case of the ordinary disk, processing for writing these resources is required.

FIG. 43 illustrates processing for writing data to a hybrid disk, and FIG. 44 shows processing for writing data to an ordinary disk.

In FIG. 43, the setting of the album name is performed first. The album name is set automatically based upon the film information IX1 read from film. The film information IX1 represents an event, and the name of the event becomes the name of the album. Directory creation (the addition of directory data) in an optical disk is carried out using the album name that has been sent (step 251).

The film information IX1 read out of the hard disk is stored in the index file of the set album name (step 252).

The image data (captured image A3) of the n-th (n=1, 2, 3, . . . ) image (frame) stored temporarily on the hard disk is read out (step 253) and this image data is subjected to reduction processing, whereby the image data of captured images A1, A2 is created and converted to a predetermined format (this includes processing for compressing the image data) (step 254).

These items of image data are written in the album (image file) in the optical disk, along with the frame information IX2 (read out of the hard disk), in relation to the n-th frame (step 255). Furthermore, the reduced image data (captured image Al) is stored in the index file (step 256).

The processing of steps 253 to 256 is executed successively for every image (frame) with regard to all image data and information IX2 saved temporarily on the hard disk.

When storage on the optical disk is finished with regard to all image data (YES at step 257), a representative image is selected. The reduced images created previously are displayed on the display unit 18 and the operator selects a reduced image that directly expresses the images contained on the one roll of film (or that the operator believes will be useful for retrieval performed at a later date). The data of the reduced image that has been selected is registered in the index file as representative image data (step 258). It is preferred that the selection of the representative image be based upon the opinion of the user.

The recording processing regarding the ordinary disk shown in FIG. 44 basically is the same as that shown in FIG. 43. The only difference is processing for writing resources in the case of the ordinary disk (step 259).

The resources (video components and audio components) for creating a slide show program are recorded beforehand on a suitable recording medium (e.g., the hard disk or optical disk in the computer system 10B) of the laboratory system with regard to all events. After the writing of all image data in the user's disks is finished (YES at step 257), the resources regarding events represented by the film information IX1 read from the film are read out of the hard disk and written in the resource area of the user's disk (step 259).

(11) Resources (video components and audio components) for Slide Show Creation

A series of video components and a series of audio components are provided for each event.

Figure 45:
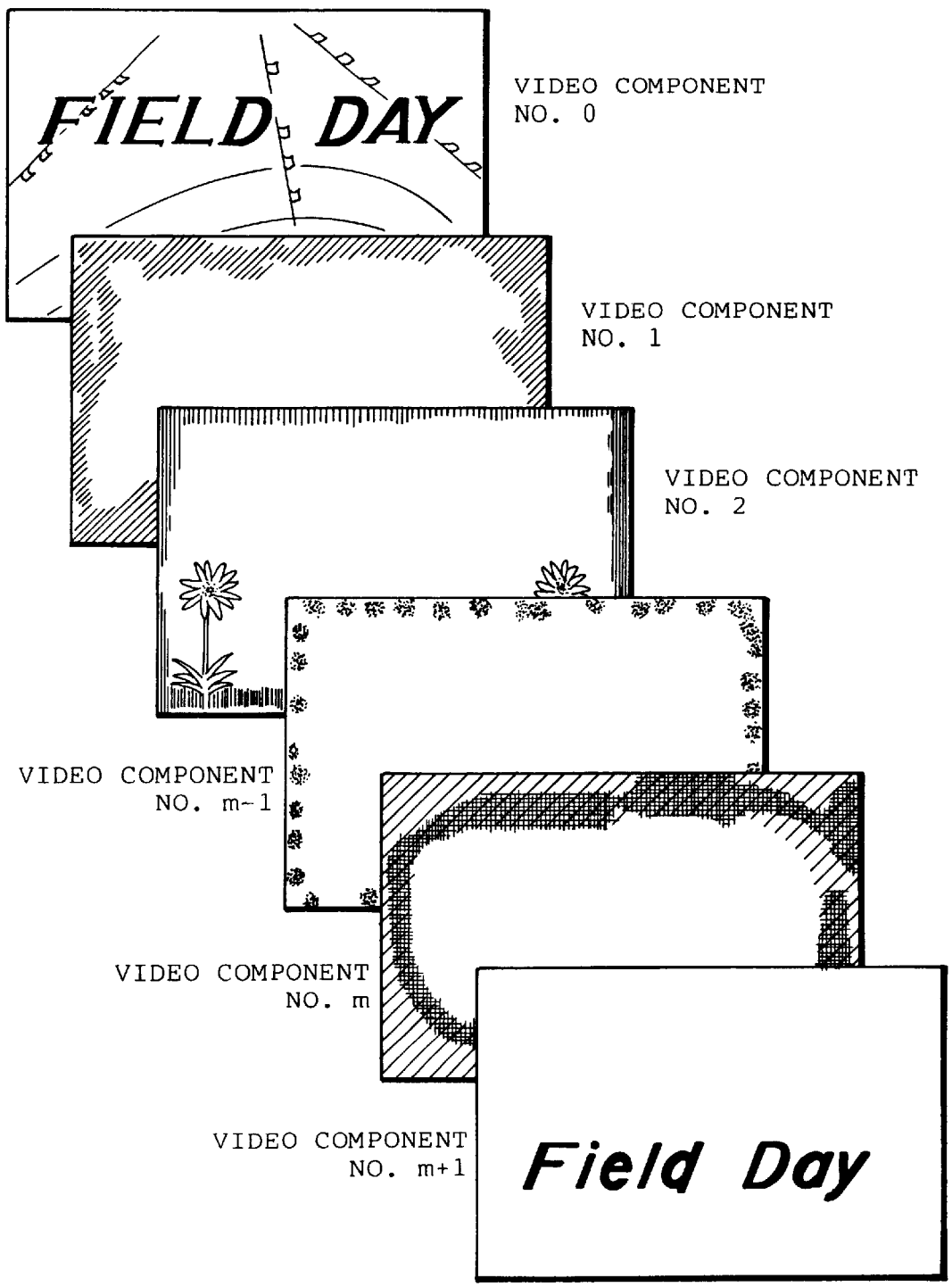
FIG. 45 is a diagram showing an example of video components relating to a single event.
Figure 46A:
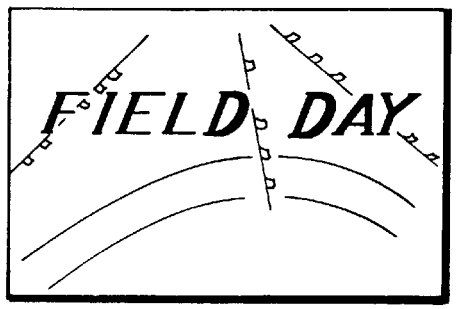
FIGS. 46a through 46d are diagrams showing examples of start-up images in video components.
Figure 46B:
Figure 46C:
Figure 46D:

FIG. 45 illustrates an example of a series of video components set with regard to a field day whose event code (number) is 01. This series of video components is assigned numbers of from 0 to m+1 (the video components provided are m+2 in number). A video component is image data representing a picture, a combination of a picture and characters, a frame, characters, etc.

The video component of No. 0 is referred to as a "start-up image" (title image) and generally is displayed at the start of the slide show. The start-up image directly expresses the subject matter of the event (and generally is a synthesized image that is a combination of a picture and characters). The start-up image generally is displayed (reproduced) separately without being combined with a captured image (photographic image).

The video component of No. m+1 is a character image which expresses an event by characters. It goes without saying that a number other than m+1 may be assigned to this character image.

The video components of Nos. 1~m+1 (character image) are used to create a synthesized image by being combined with a captured image. If the number of captured images (number of frames) recorded on one roll of film is n (for example, n=40), then m≧n generally holds. In other words, the number of video components provided is greater than the number of images contained on one roll of film.

Such video components are recorded on the user's recording medium, or have been recorded on this medium, with or without data compression as RGB image data or as a collection of luminance (Y) image data and color-difference (C) image data. It goes without saying that these video components can be reduced by pixel elimination or averaging at the time of playback.

FIGS. 46a~46d illustrate examples of start-up images regarding other events. FIGS. 46a, 46b, 46c and 46d represent the above-mentioned field day (event code=01), a wedding (event code=03), Christmas (event code=05) and a party (event code=99), respectively.

An audio component is composed of data representing sound (music, sound effects, narration, etc.). The number of audio components provided for one event also is greater than the number n of frames on the film. An audio component No. 0 is referred to as a "start-up sound" and represents a sound reproduced at the start of a program.

The video and audio components are both specified by an event code and a component number.

(12) Playback Machine (second aspect)

Figure 47:
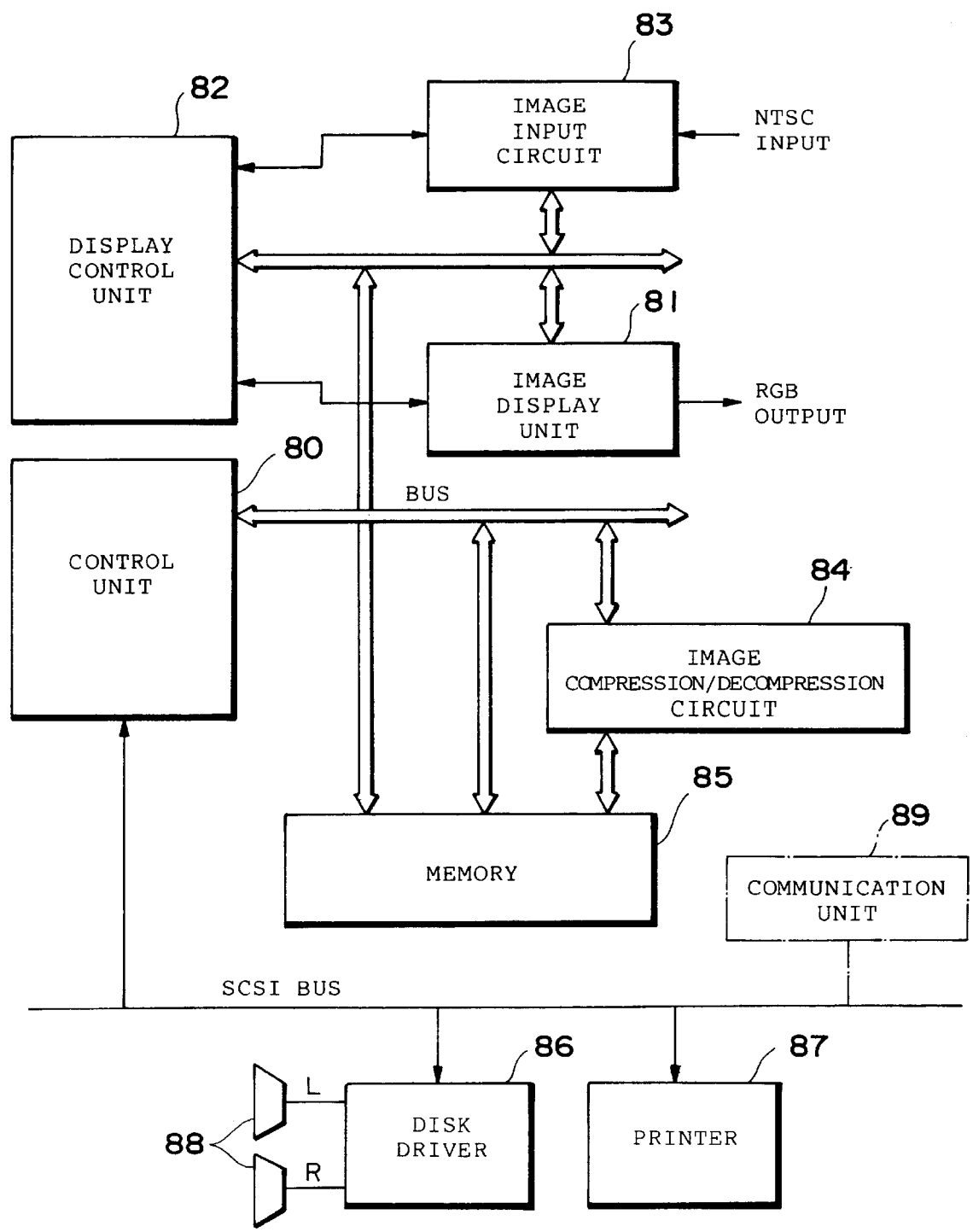
FIG. 47 is a block diagram showing the construction of a playback machine (second aspect)

FIG. 47 illustrates the electrical configuration of the playback machine (apparatus) utilized by the user. The playback machine most generally is provided in the user's home. It may also be installed at the company where the user is employed, at a company in a line of business that often handles photographs, in a store that develops and prints photographs, in a photography store or in a laboratory, etc.

The playback machine basically functions to create a slide show using image data stored in an album on the user's disk and to reproduce the created program (slide show), which comprises images and sounds, as will be described later in greater detail. The playback machine further has a function for displaying reduced images, which are represented by reduced digital image data recorded on the user's disk, on the display screen of the display unit, and a function for ordering extra prints of photographs.

The playback machine is constructed around a control unit 80 to which an image display unit 81, a display control unit 82, an image input circuit 83, an image compression/decompression circuit 84 and a memory 85 are connected via a bus. A disk driver 86, a printer 87 and a communication unit 89 are connected to the control unit 80 via an SCSI bus.

The image display unit 81 includes a CRT display device or the like and is capable of outputting an RGB video signal.

The display control unit 82 controls the display of an image on the display unit 81 and includes an image signal processor, a VRAM, etc. The control unit 82 functions to combine two types of given image data (e.g., image data of a captured image and image data representing a video component) in the VRAM. The control unit 82 further functions to generate the image data of a character represented by a character code when the character code is applied and to combine the character image with another image and display the result on the display unit 81.

The image input circuit 83 accepts an externally applied NTSC video signal or the like and converts the signal to RGB data, etc.

The image compression/decompression circuit 84 executes processing for decompressing (expanding) compressed image data read out of the user's disk and for compressing uncompressed image data.

The memory 85 is constituted by a DRAM, for example, and is used to temporarily store image data and as a work area.

The disk driver 86 reads data out of the user's optical disk and writes data to the same disk. The disk driver 86 includes also a circuit (a D/A converter or the like) which reproduces audio data read out of the user's optical disk. The output signal of this audio reproducing circuit is applied to stereo speakers 88.

The printer 87 prints the image represented by the image data, thereby creating a photograph.

The communication unit 89 is provided as necessary and, besides transmitting the above-mentioned data for ordering extra prints, functions to receive resources sent from the laboratory system or from some other computer system. In this case, it is no longer necessary to store the resources on the user's disk.

The control unit 80 includes a CPU, a ROM, a RAM, a timer, a calendar circuit, a remote control interface and an SCSI interface, etc., and implements a playback processing, described later. Though a remote controller (not shown) is used as the input unit, the input unit can also be constructed by a keyboard and mouse, etc., connected to the control unit 80.

Though the execution program of the CPU in the control unit 80 is stored in the ROM, part of the program (e.g., the playback program) may be stored in the user's disk. In this case, the CPU executes the program upon loading it from the user's disk.

The user is capable of entering desired images and sounds (these also are referred to as components), which are necessary for creating a slide show program, besides the resources that have been stored on the user's disk. The images would be entered from the image input circuit 83, by way of example. Alternatively, an arrangement may be adopted in which a medium (an optical disk) on which images or sounds have been recorded is loaded in the disk driver 86 or in another playback apparatus separately provided and connected to the control unit 80, with the image data or audio data being generated from the driver or playback apparatus. The image data and audio data would be stored in the additional image file or additional audio file of the user's disk.

(13) Playback of Slide Show

Figure 48:
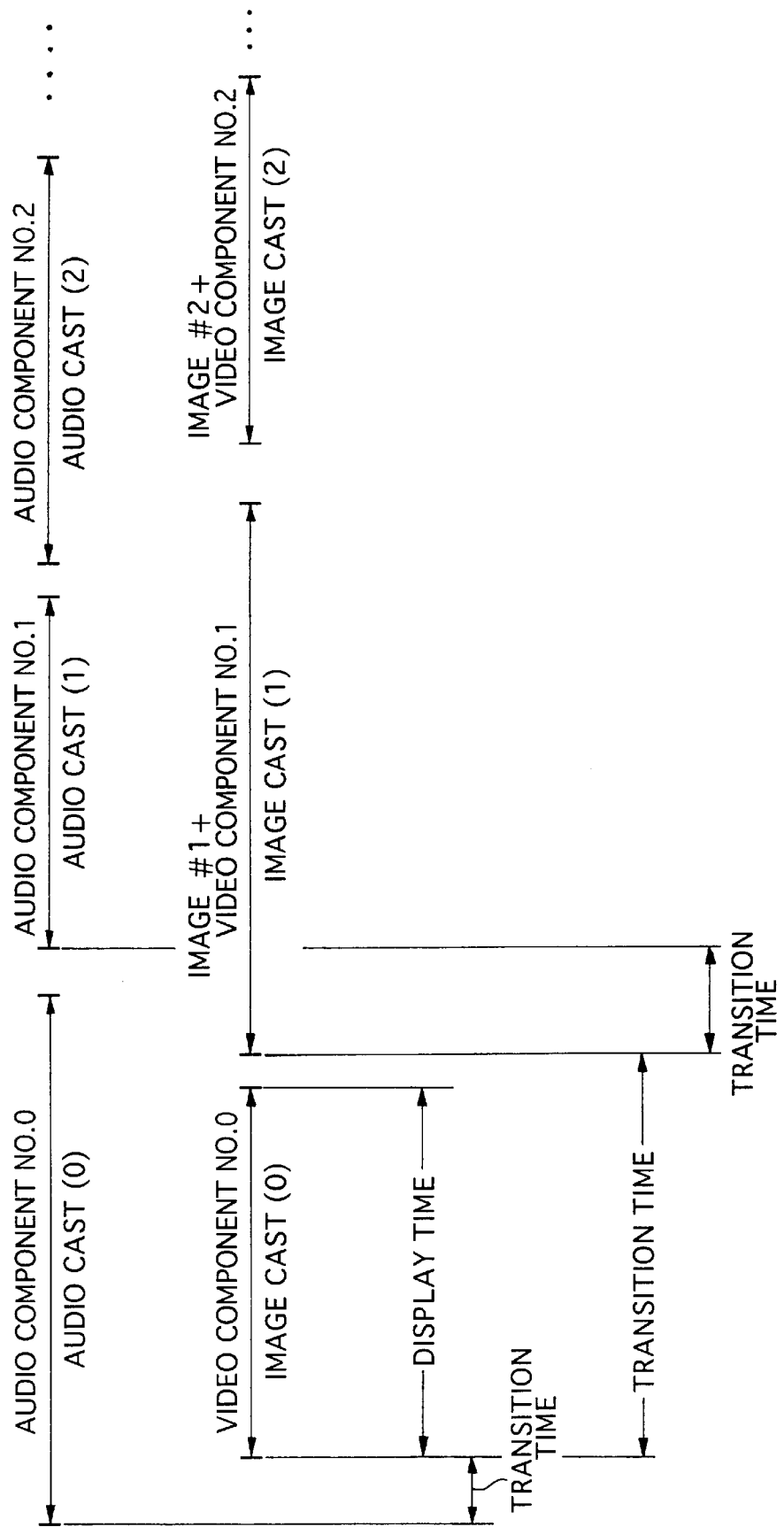
FIG. 48 is a time chart showing the manner in which a program (slide show) is played back.

As mentioned above, the playback of a program (slide show) involves combining captured images (photographic images) read from film with the corresponding video components, successively displaying the results and playing (producing) sounds, which are based upon the audio components, in association with the image display. FIG. 48 illustrates an example of a sequence of images (still pictures) and sounds produced at playback of a slide show.

First, the start-up image (video component No. 0) is displayed on the display unit 81 and the start-up sound (audio component No. 0) is produced from the speakers 88. Next, a synthesized image which is a combination of image #1 on the film and video component No. 1 is displayed and the sound of audio component No. 1 is played. Next, a synthesized image which is a combination of image #2 on the film and video component No. 2 is displayed and the sound of audio component No. 2 is played. Thus, synthesized images which are combinations of images represented by image data obtained from film and corresponding video components contained in the resources are successively displayed while sounds based upon the corresponding audio components in the resources are generated.

Though the sounds and images are in one-to-one correspondence, they need not necessarily be made to correspond in one-to-one fashion. A sound represented by one audio component may be played over the display interval of a plurality of images. In extreme cases, only one audio component (which may be solely the start-up sound) may be used over the display interval of all of the images on one roll of film. The images represented by the image data obtained from the film may include an image or images displayed without being combined with a video component.

Resources used for image synthesis and for generating sounds correspond to events expressed by the information IX1 read from the film. These resources are recorded on the user's disk, as mentioned above.

The time from the moment at which output of a certain sound or display of an image begins to the moment the next sound begins to be outputted or the next image begins to be displayed is referred as "transition time". The time during which one image is displayed is referred to as "display time". The display time may be fixed. The time from the moment the output of a certain sound stops or display of an image ends to the moment the output of the next sound starts or the next image starts to be displayed may be defined as the transition time. The start of the display of a synthesized image and the start of the issuance of the corresponding sound may be made the same point in time. The transition time or display time can also be determined arbitrarily or made fixed values that have been determined in advance.

FIGS. 49*a*~49*d* show examples of images synthesized and displayed using the video components shown in FIG. 45 with regard to the "Field Day" event whose event code is 01.

Figure 49A:
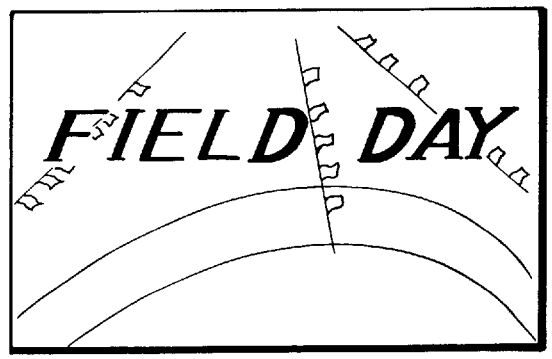
FIGS. 49a through 49d are diagrams showing examples of synthesized images reproduced.
Figure 49B:
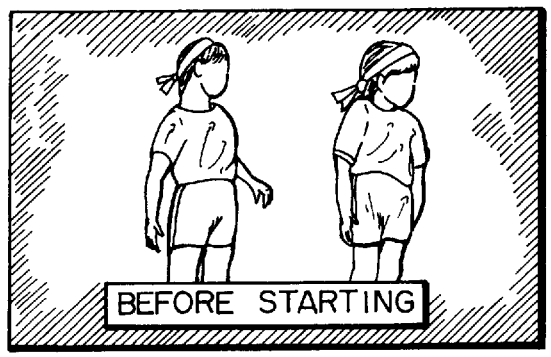
Figure 49C:
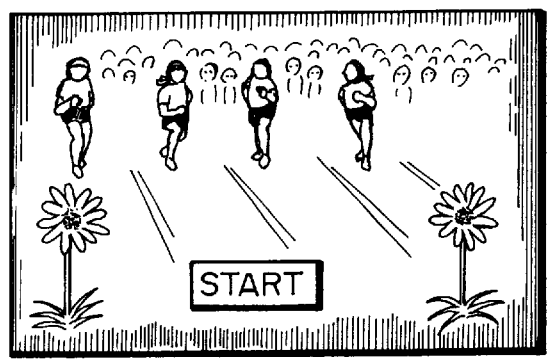
Figure 49D:

The characters "BEFORE STARTING", "START" and "DANCE" which appear in FIGS. 49*b*~49*d* are created based upon the frame information IX2 read from the film. Character image data represented by the character codes included in the frame information IX2 stored in correspondence with each image is generated by a graphic signal processor in the display control unit 82, and the character image data is combined with the data of the captured (photographic) image and with the image data of the video component in the VRAM. Whether the character representing the information IX2 are to be displayed can be commanded by the remote controller of the playback machine. In response to the command (ON/OFF signal) from the remote controller, the control unit 80 is so controlled as to generate the character images representing the information IX2, combine these characters images or halt this operation.

Figure 50:
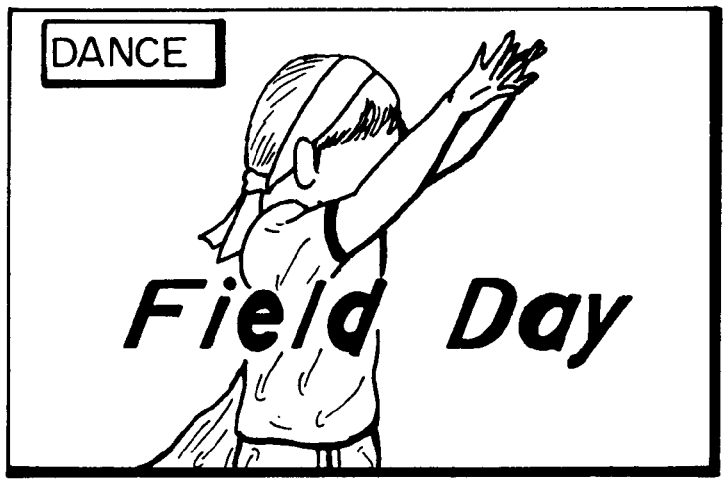
FIG. 50 is a diagram showing another example of synthesized image.

FIG. 50 illustrates another example of a synthesized image. Here the captured (photographic) image of image #n and the video component No. m+1 are combined. In the simplest embodiment, as will be illustrated later, the number of the captured image and the number of the video component to be combined with this image are predetermined. As shown in FIG. 50, however, the user is capable of deciding the combination of the captured image and video component at will.

One image (synthesized image) or one sound to be reproduced is described by an image cast or audio cast, and the sequence in which these are reproduced is described in the script file. The script file, an image cast file, which is a collection of image casts, and an audio cast file, which is a collection of audio casts, are created automatically by the playback machine (or upon being changed or revised by the user) and are recorded on the user's disk.

An example of a script file is depicted in FIG. 51. This script file represents the sequence shown in FIG. 48. "PLAY" represents a playback instruction, "Audio Cast" the audio cast and "Image Cast" the image cast. "PLAY Audio Cast (0)" is one instruction statement and means that the audio cast (0) is to be reproduced. These instruction statements are written in the order in which playback is to be performed. Accordingly, playback is performed in the following order: sound (0), image (0), image (1), sound (1), sound (2). The description of the instruction "PLAY" in the script file can be deleted. The transition time and display time set forth in the image case or video cast may be described in the script file.

FIG. 52 illustrates an example of the structure of an image cast. An image cast includes a header, album name, (merged-type) image file name, merge information, transition time (display time), image appearance effect, image appearance effect time, image resolution, position information and enlargement magnification, etc. An image cast number is assigned to the image cast.

The header indicates that the cast is an image cast.

The album name and the (merged-type) image file name indicate that the image file to be reproduced (the merged-type image file or some other image file).

The merge information is used in a case where the merged-type image file has been designated and includes information (the type of image to be merged) indicating which image data among plural items of image data contained in the merged-type image file is used, and the method of synthesis (merging). The information relating to the type of image to be merged also includes information indicating whether an image is to be merged or not, that is described by an image mix description. In a case where an image is to be merged, the image data to be merged is elucidated as required. In a case where an image is not to be merged, which image (natural image or character image) is used is described. The merging method is an OR, AND, NOR, etc.

The image mix descriptor includes a two-bit descriptor. This descriptor takes on values of "00", "01" and "10".

The descriptor "00" indicates that an image (captured (photographic) image A1, A2 or A3) in an image file is to be displayed as is (i.e., without being merged with another image).

The descriptor "01" indicates that the character image B in the merged-type image file is to be displayed upon being merged with the captured (photographic) image (A1, A2 or A3).

The descriptor "10" indicates that a captured (photographic) image (A1, A2 or A3) in an image file is to be displayed upon being merged with a video component in the resources. As long as there is no specific indication, a video component having a number identical with that of the captured image is construed as being one which is to be merged. The user may of course designate the number of the video component to be merged.

In a case where a video component in the additional image file is desired to be merged with a captured image, it will suffice to designate and describe the number of this video component. In such case "11" may be used as the descriptor.

Since the image cast (0) is decided as being one which indicates display of the start-up image, the image mix descriptor would be ignored in the playback program.

The transition time and display time are as set forth earlier. The display time is not always necessary.

The image appearance effect is for selecting a screen effect when display of an image is started. Specifically, the effect may be to present a display on the entire screen all at once (i.e., to change over from one full screen to the next instantaneously), to display the next image in a form in which double doors (or curtains) open, to display the next image while sweeping from right to left, to start the display of an image while sweeping from top to bottom, or to present a picture while gradually enlarging the display area from the center. The image appearance effect time is the time from the start of appearance of part of an image to the appearance of the entire image.

Among the three types of captured images A1, A2, A3 in an image file, the image that is to be displayed is designated by the resolution of the image. The images A1, A2, A3 are designated by the resolutions 1/64, 1/1, 4/1, respectively.

The position information represents the position, on the display screen, of the image that is to be displayed. For example, the position is expressed by the X, Y coordinates of the center of the image to be displayed.

The enlargement magnification (inclusive of reduction magnification) represents magnification used when enlarging or reducing a displayed image.

FIG. 53 illustrates an example of the structure of an audio cast. An audio cast includes a header, an audio component number and transition time. A number is also allocated to the audio cast. In a case where the audio component of an additional audio file is used and not the audio component of a resource, the audio component number thereof is employed.

An audio component may be audio digital data representing sound, namely data that has been subjected to ADPCM (adaptive differential pulse-code modulation). The audio component may be also data representing a location (track number), at which sound has been recorded, on the medium on which the sound has been recorded, and MIDI (musical instrument digital interface) data. In the former case, data representing the length of time (start time and end time) over which playback is to be performed in a designated track would be stored in the audio cast. The playback machine would be provided with a playback machine or electronic instrument for the recording medium.

(14) Creation of Slide Show

In principle, the creation of a slide show (the creation of an image cast, audio cast and script file) is carried out by the playback machine. An arrangement may of course be adopted in which the slide show is created in the computer system 10B of the laboratory system.

Figure 54:
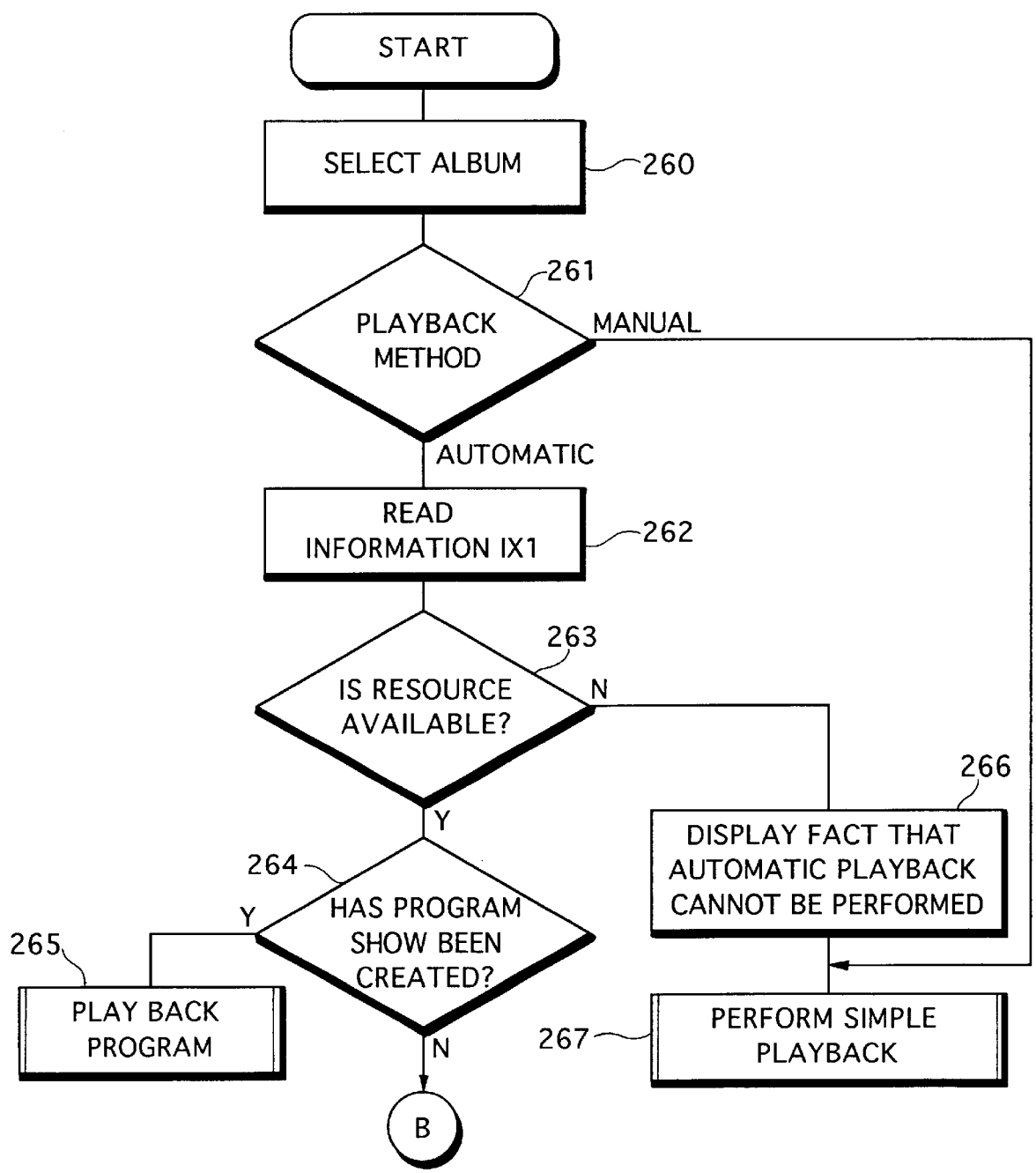
FIG. 54 is a flowchart showing a playback processing procedure.
Figure 55:
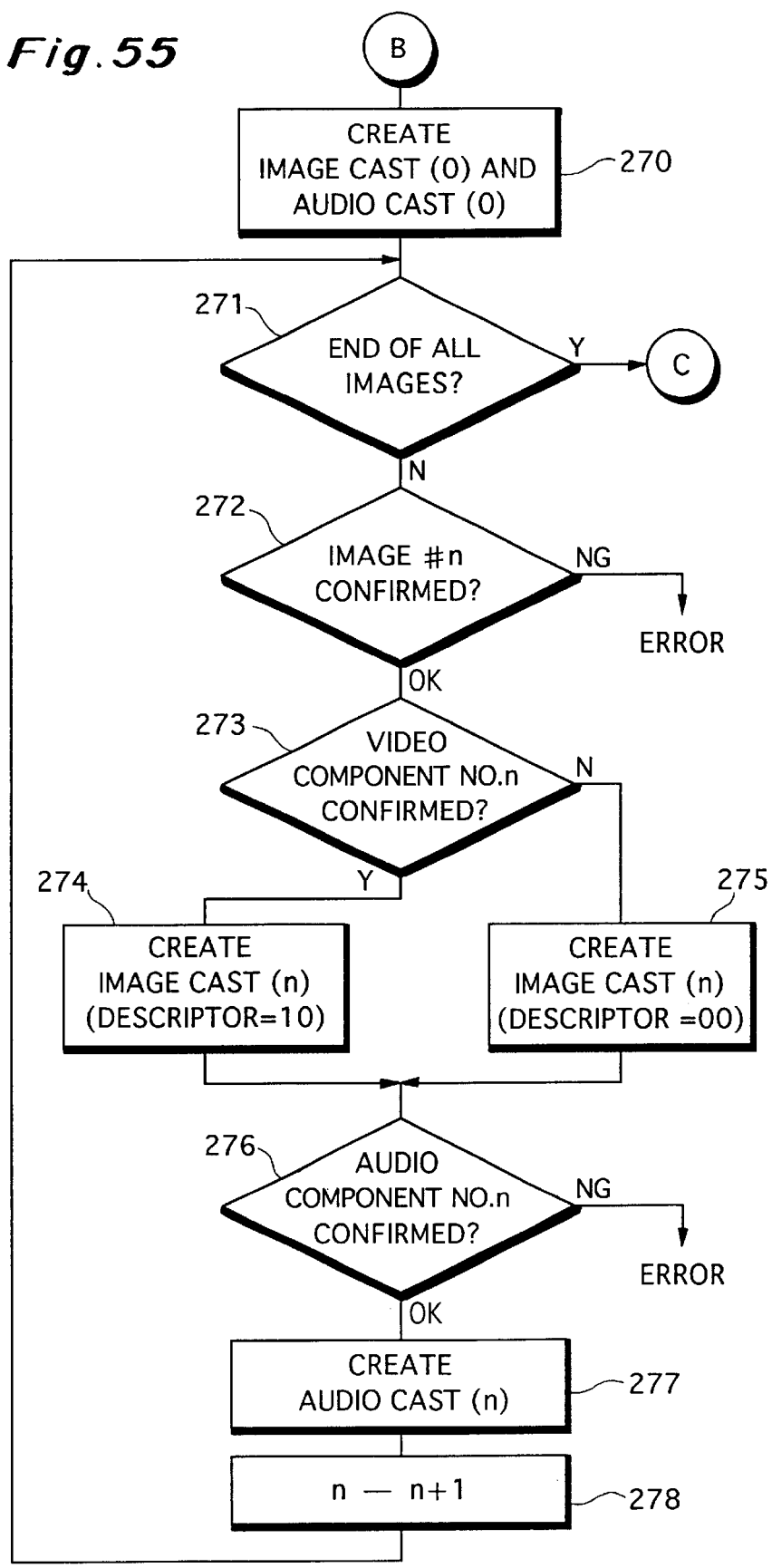
FIGS. 55 and 56 are flowcharts showing a processing procedure for creating a slide show program.
Figure 56:
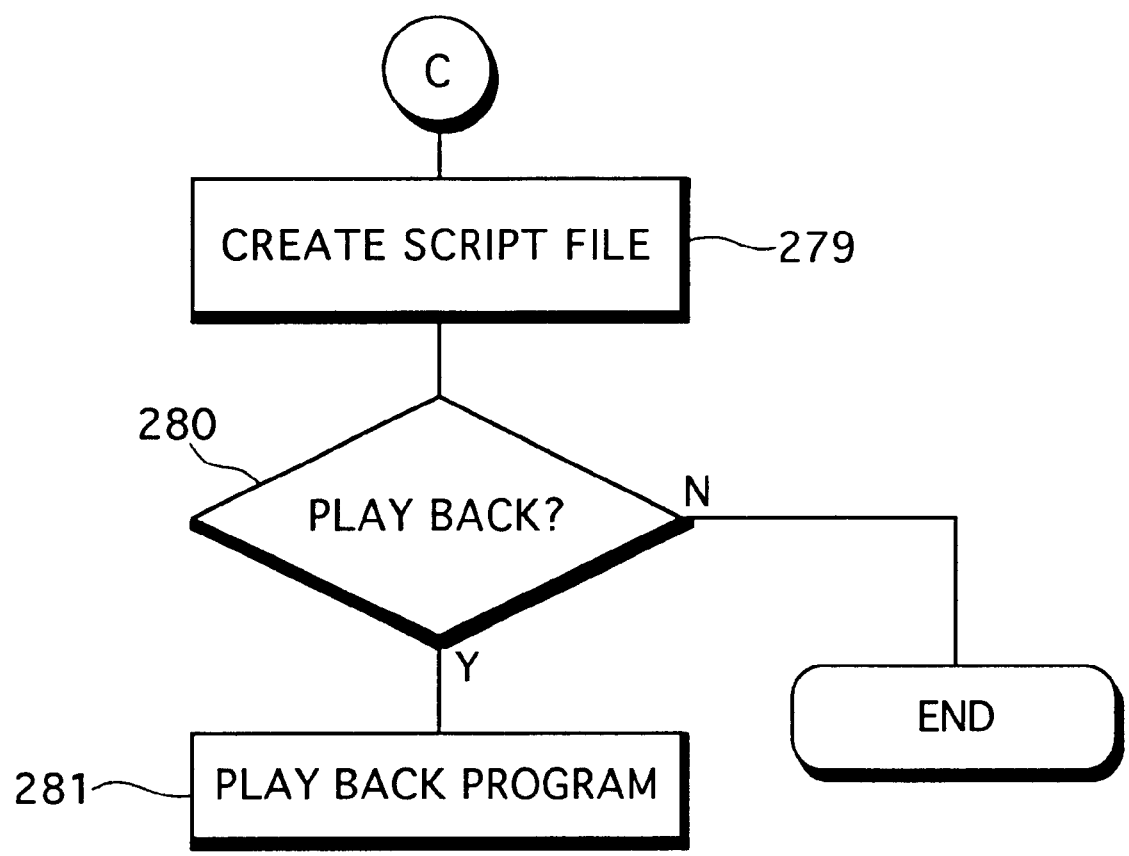

FIGS. 54 through 56 illustrate a processing procedure for playback and slide show creation executed by the playback machine.

In a case where a plurality of albums (image data from plural rolls of film) exist in the user's disk, selection of an album to be played back (the slide show program of which is to be created) is carried out (step 260).

At least the names of all of the albums that have been stored on the user's disk are displayed on the display unit 81. The user selects the desired album from the list of names using the remote controller. The representative images of the albums or the reduced images contained in the albums may be displayed to prompt the selection of the album.

The playback methods available are automatic and manual (step 261). If automatic playback has been selected, the index file of the pertinent album in the user's disk is read out and the film information IX1 in the index file is recognized (step 262). It is determined whether resources relating to the events represented by the information IX1 are present in the user's disk (step 263).

If the pertinent resources exist, automatic playback (playback of a slide show) is possible. It is determined whether the slide show (the script file, image cast and audio cast) corresponding to the designated album name has already been created (step 264). If the slide show has been created, processing proceeds automatic playback of the slide show (step 265).

In automatic playback of a slide show, the pertinent script file is read out and the relevant image cast and audio cast are read out in accordance with the written content of the script file, as described earlier. The data of the captured (photographic) images and video components in the image file is read out in accordance with the designation of various data in the image cast, these items of data are combined and displayed, audio component data is read out in accordance with the designation of the audio cast and the sound of the audio component is reproduced (in the most general case). There are cases where combining of images is not performed, depending upon content of the image mix descriptor. When it has been designated, the image appearance effect is displayed. An image and sound are reproduced during the transition time (display time). An arrangement may be adopted in which sound is brought to an end by completion of playback of all audio data.

In a case where a slide show has not been created, processing proceeds to automatic creation of the slide show (FIGS. 55 and 56). An arrangement may be adopted in which the user is allowed to create the slide show.

In a case where a resource designated by the information IX1 does not exist, a display to the effect that automatic playback cannot be performed is presented (step 266) and processing shifts to simple playback (step 267). Simple playback is performed also when the user selects manual playback.

In simple playback, the captured (photographic) images that have been stored in the image file are successively displayed at fixed time intervals in the order of the image numbers or in response to the pressing of a "NEXT" button by. the user. Images are not combined and sound is not produced. The user is capable of designating a frame number. In such case the image of the designated frame is displayed.

In automatic creation of a slide show, first the image cast (0) of the start-up image and the audio cast (0) of the start-up sound are created (step 270). The value n in a counter is initialized to 1.

An error is generated if the captured image #n designated by the counter n does not exist in the album (image file) (step 272). The user is also capable of making a designation in such a manner that a slide show is created while skipping image #n.

It is determined whether video component No. n having the number n identical with image #n exists in the resources file (step 273). If the video component No. n is exists, then the descriptor of the image mix descriptor is set to "10". If the video component No. n does not exist, the descriptor is set to "00". Then the image cast (n) is created using the video component No. n (steps 274, 275). In creation of the image cast (n), predetermined default values are used as the various parameters (transition time, image appearance effect, method of image synthesis (merging method), etc.). An arrangement may of course be adopted in which the user is allowed to make the designations.

Next, it is determined whether the sound number No. n exists (step 276). If it does exist, an audio cast is created using the audio component No. n (step 277).

An error is generated if the audio component No. n does not exist. In such case the user is allowed to make a designation so as to select another audio component. So doing makes it possible to create an audio cast. An arrangement may be adopted in which, if the audio component No. n is does not exist, the creation of an audio cast is not allowed and no error is generated. Furthermore, in a case where the playback interval of the sound represented by the audio component of an already created audio cast is equivalent to the display time of images of a plurality of frames, steps 276 and 277 can be omitted.

The above-described processing is executed with regard to all images in an album (step 271) while the counter n is incremented (step 278).

Finally, the script file is created (step 279). It will suffice if image casts and audio casts are described in the script file in the order of their numbers. It is not required that the image casts and audio casts always be combined in one-to-one correspondence, as set forth above.

The created image casts, audio casts and script file are saved on the user's disk.

If the user subsequently desires playback (step 280), automatic playback of the created slide show program is performed (step 281). Otherwise, all processing is finished.

Figure 57:
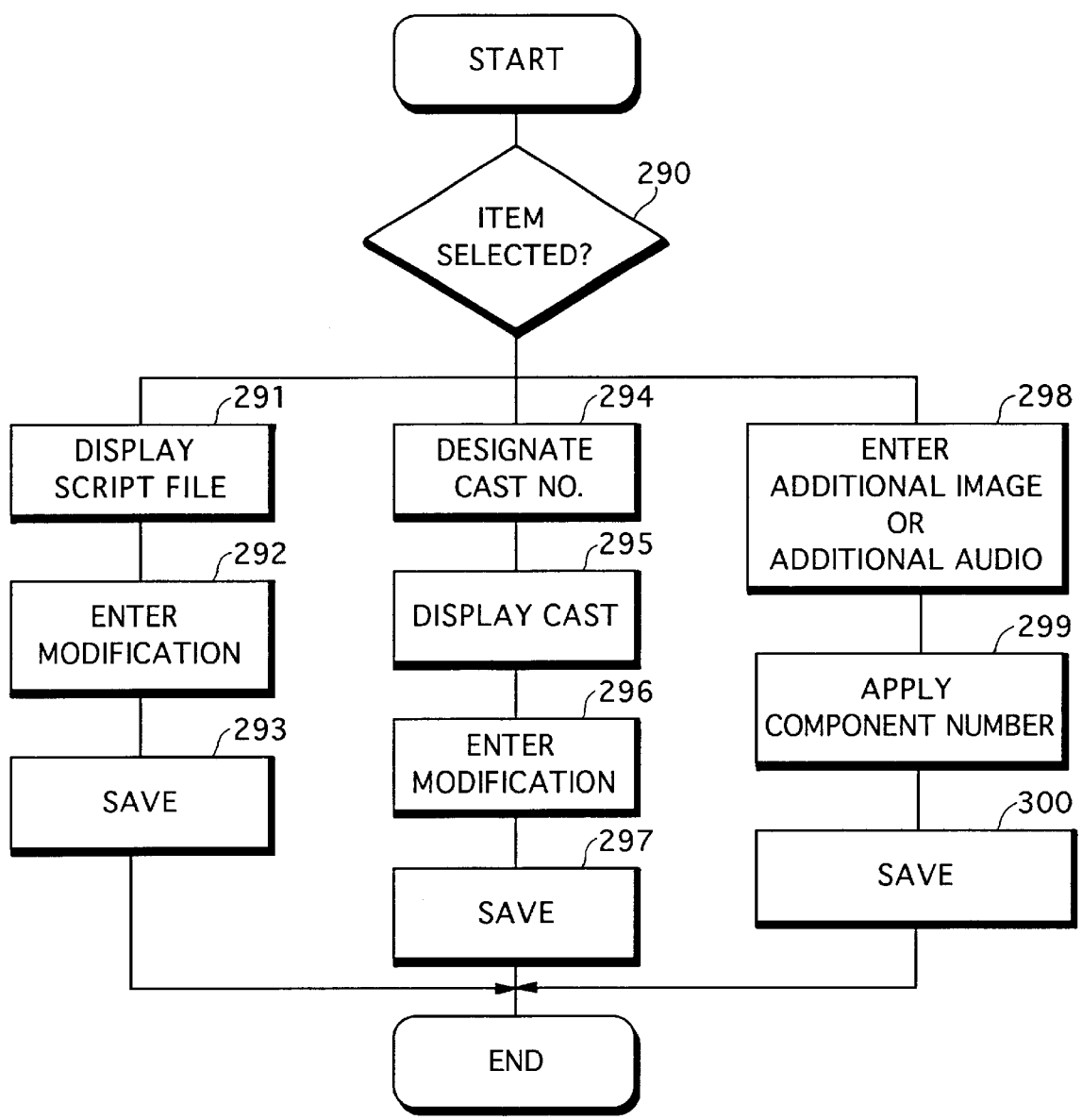
FIG. 57 is a flowchart showing a processing procedure for revising a slide show program.

The slide show program automatically created in this fashion can be revised or changed by the user in conformity with user preference or whenever necessary. Processing for achieving this is illustrated in FIG. 57.

Items which can be revised or changed (or added on) are a script file, an image cast, an audio cast, an additional image and an additional sound, etc. First, these items are selected (step 290).

In a case where the script file is changed, first the script file is read out of the user's disk and displayed on the display unit 81 (step 291). While observing the display screen, the user employs the remote controller (or the keyboard and mouse) to revise the number of each cast, or the order thereof, described in the script file (step 292). The revised script file is saved on the user's disk (step 293).

In revision of a cast, the type of the cast to be revised and the number thereof are entered by the user (step 294), whereupon the content of the cast is displayed (step 295). If the user revises the cast using the input unit in similar fashion (step 296), the revised cast is saved on the user's disk (step 297).

In order that the user may easily select a video component to be combined, it is preferred that the reduced image data of each video component be created (or that this data be created in advance and recorded on the user's disk) and that these items of data be displayed in the form of multiple pictures on the display screen. With regard to the audio components also, it is desired that these be capable of being played back in response to designation by the user.

An image desired to be added on can be entered by the user from the image input circuit 83. The output video signal of a television or video deck or the like can be applied to the circuit 83 and the user can select the desired screen while observing the display of the video signal. Alternatively, an image created by the user can be captured by a video camera and the resulting video signal can be fed into the circuit 83. The user can also enter a desired sound from the playback machine (step 298).

A component number is assigned to the image or sound thus entered (step 299) and the component number is saved in the additional image file or additional sound file on the user's disk (step 300).

The creation of a slide show manually can also be performed in the same manner as the revision or change operation.

(15) Miscellaneous

The user is capable of printing a photograph of a desired image using the playback machine. In order to arrange it so that the user can select a desired image easily, it is desired that each image be displayed for a long period of time (i.e., that the changeover from one image to the next be made slowly).

To accomplish this, the playback machine is provided with a print-screen selection mode. This mode can be selected by the remote controller. When this mode is selected, the fact that the mode is the print-screen selection mode is displayed on the display screen.

In the print-screen selection mode, the transition time in a cast is ignored and displayed images are changed over slowly (e.g., at one-second intervals) in successive fashion (in the sequence set forth in the script file). Sound is not reproduced in this mode.

The screen changeover time interval preferably is capable of being set by the user at will using a button on the remote controller.

When the user finds the desired image, a revision interrupt can be entered using the remote controller. Changeover of the screen is stopped and the image displayed last continues to be displayed. A message reading "VERIFY PRINTING OF IMAGE CURRENTLY BEING DISPLAYED" is displayed on the display screen.

When the user enters verification, image data (image data A3 having the highest resolution) representing the image being displayed is applied to the printer 87 and printing of a photograph is carried out. At this time "PRINTING IN PROGRESS" is displayed on the display screen. The user naturally is capable of printing photographs of the desired number. Operation thenceforth returns to the print-screen selection mode.

(16) Image Data Copying System and Copying Method

Figure 58:
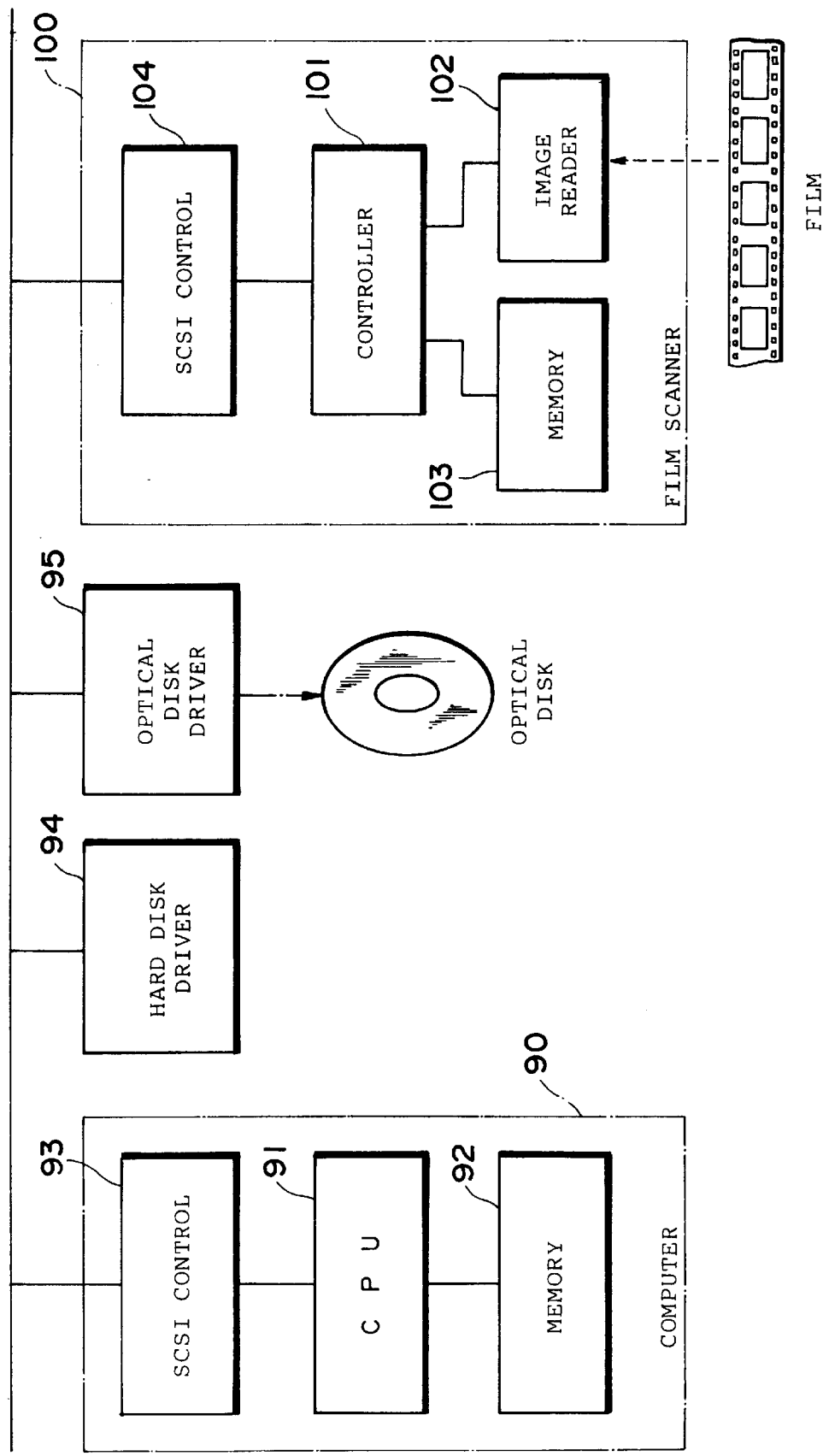
FIG. 58 is a block diagram showing an example of a system for copying image data.

FIG. 58 illustrates an example of a system for copying image data. This system is for transferring the image of a photograph from film (or image data stored in a semiconductor memory upon being obtained by reading the image from the film) (the medium which serves as the source in a copying operation) to an optical disk (a recording medium which is the destination of the copying operation) and storing the image on the optical disk.

A computer 90 is provided to control the overall processing for transferring and copying image data. A hard disk driver 94, an optical disk unit 95 and a film scanner 100 are connected to the computer 90 via an SCSI (small computer systems interface) bus.

The computer system 90 includes a CPU 91 and its periphery circuitry, a memory (a ROM, RAM, floppy disk, etc.) 92, and an SCSI controller 93 for sending and receiving command and data based upon the SCSI scheme. It goes without saying that the computer 90 is provided with a display unit (e.g., a CRT display device) for displaying images and other information, an input unit (a keyboard and mouse, etc.) for entering data and instruction, and an output unit (a printer, etc.), though these are not illustrated.

A film scanner 100 includes an image reader 102 for sensing images which appear on film and outputting image data (e.g., 2048×3072 pixels) representing the images, a memory (RAM, ROM, etc.) 103 for storing the image data as well as other data, an SCSI control unit 104 for sending and receiving commands and data to and from the computer system 90, and a controller 101 for controlling the reading of film images, the storing of the image data and the transfer of the image data, etc.

A hard disk driver 94 writes data to a hard disk and reads data out of the hard disk. Image data transferred from the film scanner 100 is stored temporarily on the hard disk, as will be described later.

An optical disk unit 95 writes data (inclusive of image data) to an optical disk and reads data out of the optical disk.

Figure 59:
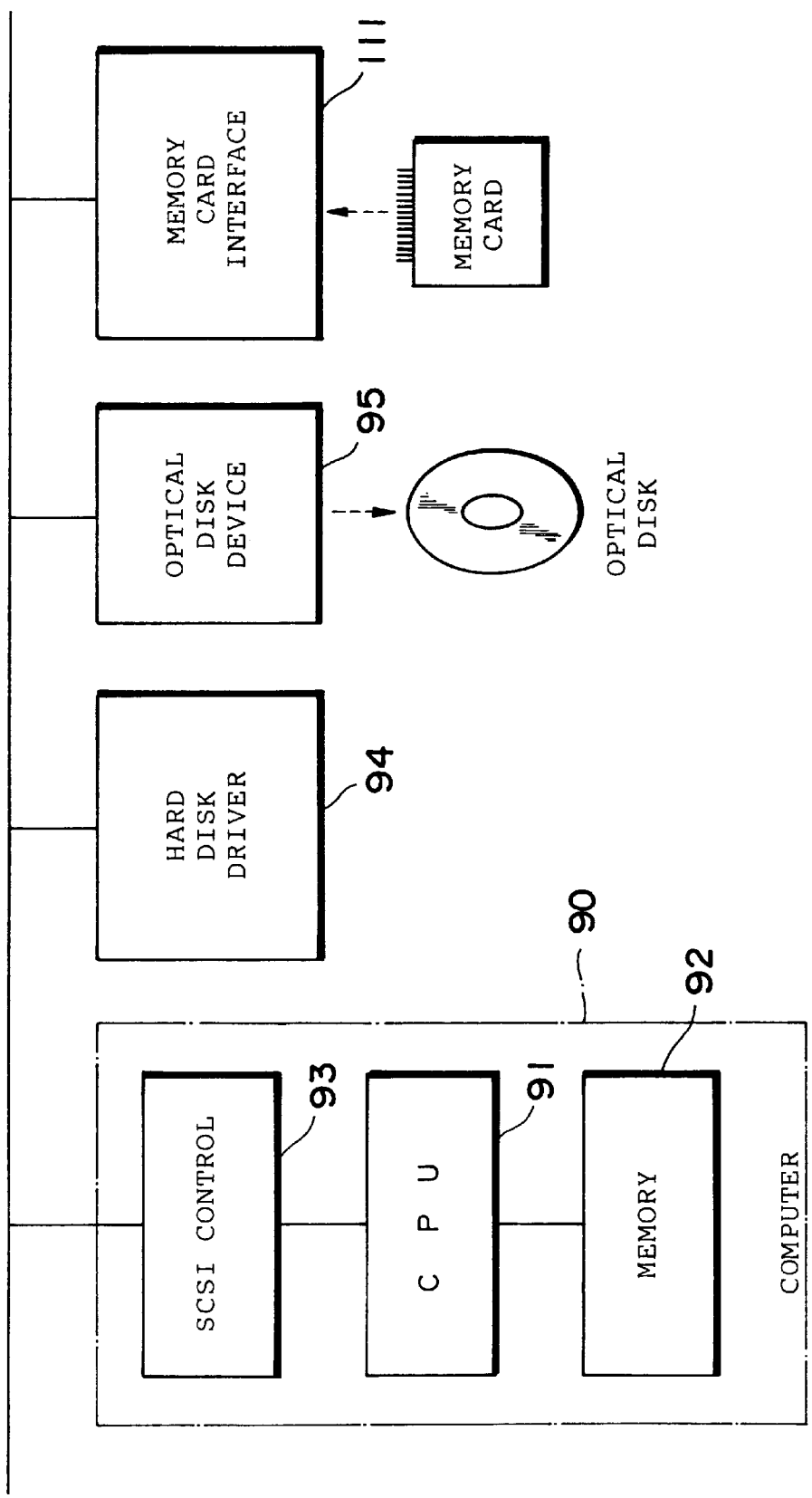
FIG. 59 is a block diagram showing another example of a system for copying image data.

FIG. 59 illustrates another example of a system for copying image data. In this system, image data that has been stored on a memory card is transferred to and stored on an optical disk.

Instead of the film scanner shown in FIG. 58, a memory card interface 111 is connected to the SCSI bus. The image data on a memory card is read out under the control of the CPU 91.

Figure 60:
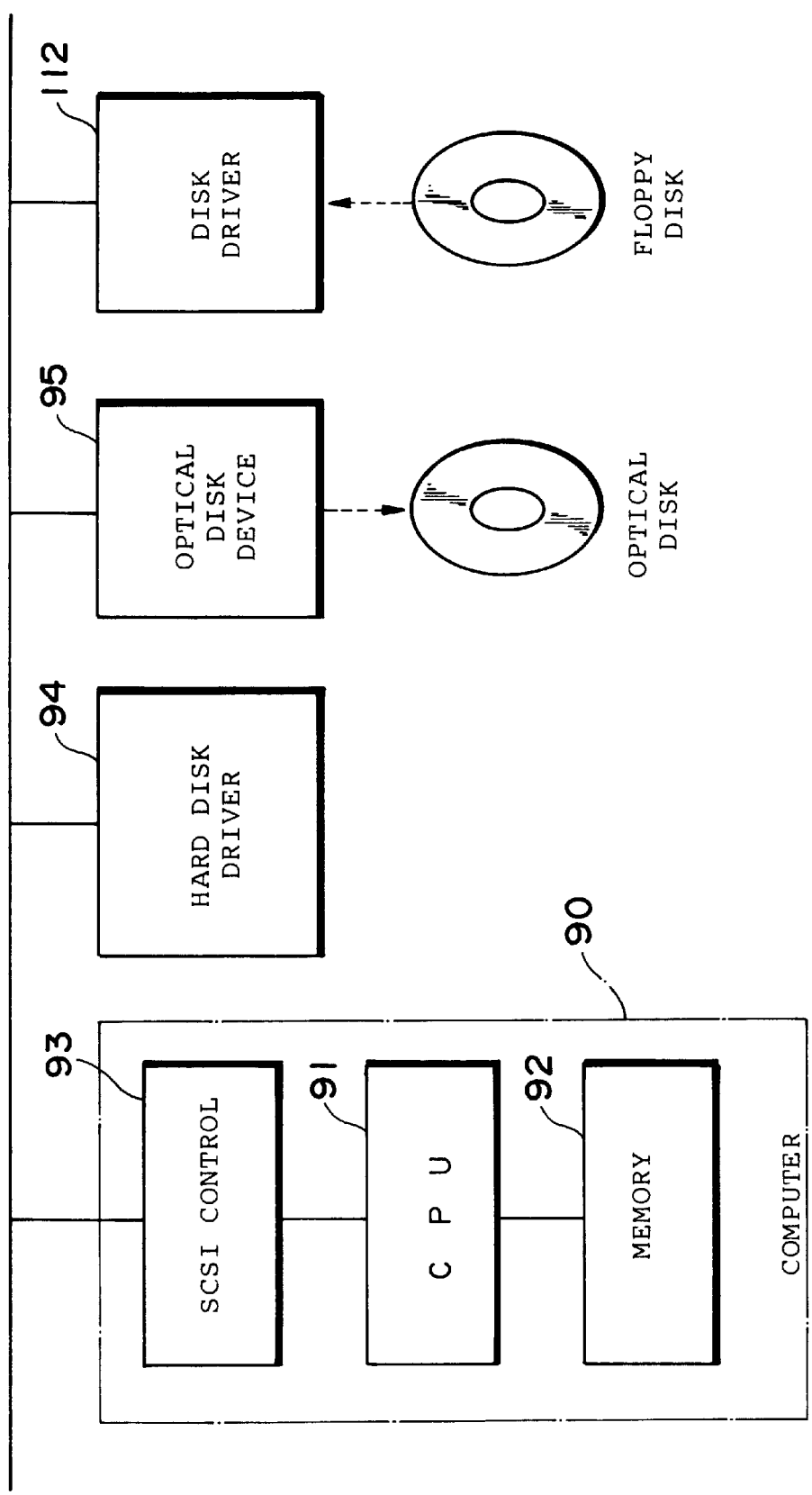
FIG. 60 is a block diagram showing yet another example of a system for copying image data.

FIG. 60 illustrates another example of a system for copying image data. In this system, image data that has been stored on a floppy disk is transferred to and stored on an optical disk.

Instead of the film scanner shown in FIG. 58 and the memory card interface depicted in FIG. 59, a disk driver 112 is connected to the SCSI bus. The image data that has been stored on the floppy disk is transferred to and stored on the optical disk under the control of the CPU 91.

It goes without saying that the disk driver 112 may be constructed so as to be included in the computer 90.

Instead of the disk driver 112, a hard disk driver, a magneto-optical disk device for reading and writing image data from a magneto-optical disk, and a tape recording/playback device for reading or writing image data from an optical tape or magnetic tape can be connected.

A plurality of devices can also be connected to the SCSI bus. For example, a film scanner, a memory card interface and a disk driver, etc. may be connected. Image data on film, image data on a memory card and image data on a disk may be transferred to and stored on an optical disk.

Film, a semiconductor memory, an optical disk, a magneto-optical disk, a magnetic disk, an optical tape and a magnetic tape, etc. are available as the recording medium which is the source of a copying operation, as mentioned earlier. These media generally are portable. In addition, it should at least be possible to read image data from these media.

The recording medium serving as the destination of a copying operation is not limited to the aforesaid optical disk but includes a magnetic disk (a hard disk or floppy disk), a magneto-optical disk, an optical tape, a magnetic tape and a semiconductor memory. In general, these recording media are capable of writing and reading data and have more storage capacity than the recording media for the source of the copying operation.

Next, the operation for transferring and recording image data will be described taking the copying system shown in FIG. 58 as an example.

In order to obtain more appropriate image data, prescanning is performed in the film scanner 100 and parameters for brightness and color correction are set in the computer 90 based upon the results of prescanning. Thereafter, main scanning is performed in the film scanner 100 and the image data obtained thereby is sent to the computer 90. The latter edits the accepted image data (and also executes processing for creating an index which includes reduced image data, as will be described later) and writes the data on the optical disk.

Figure 61:
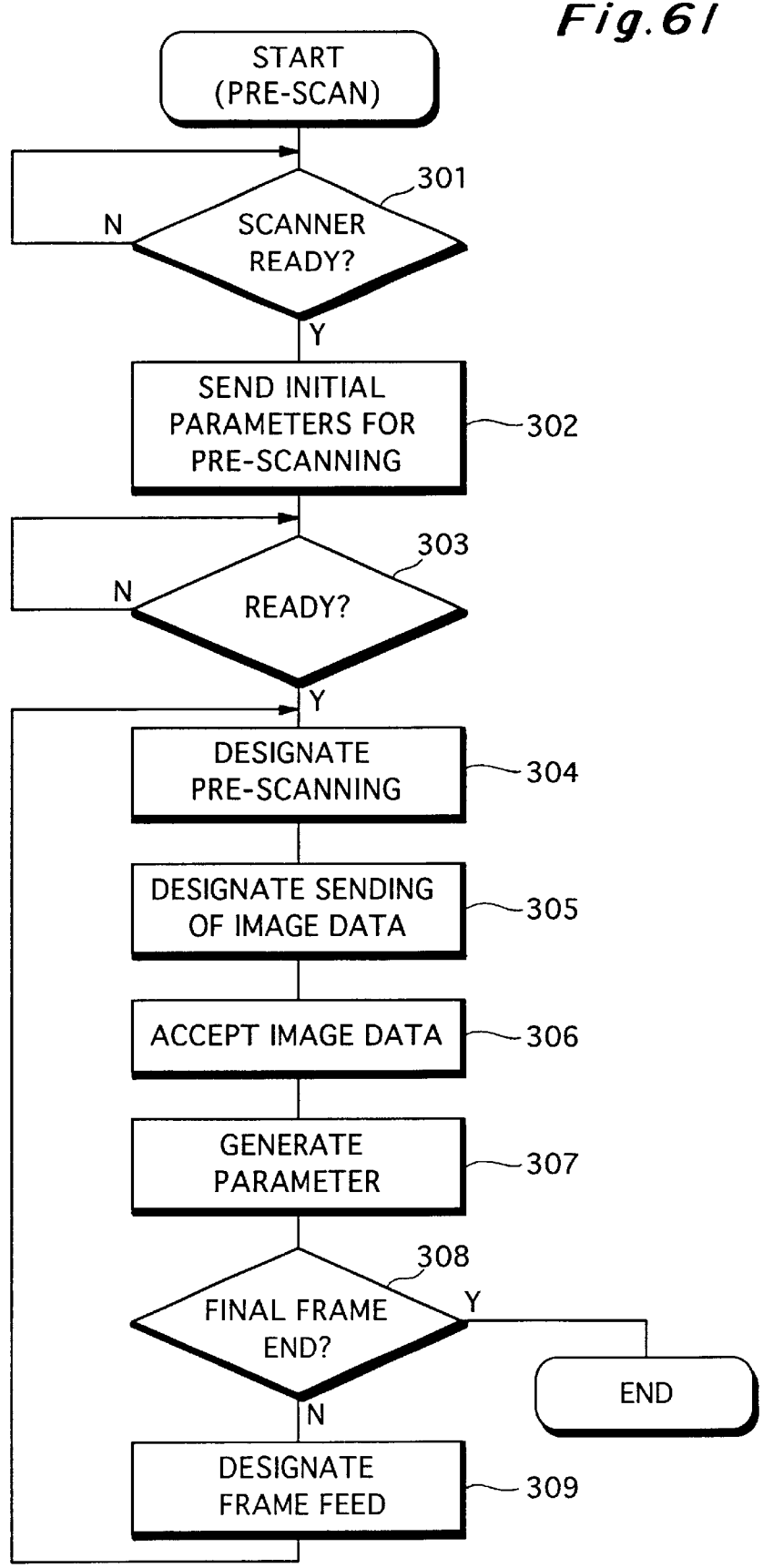
FIG. 61 is a flowchart showing a control procedure executed by a CPU for prescan processing.
Figure 62:
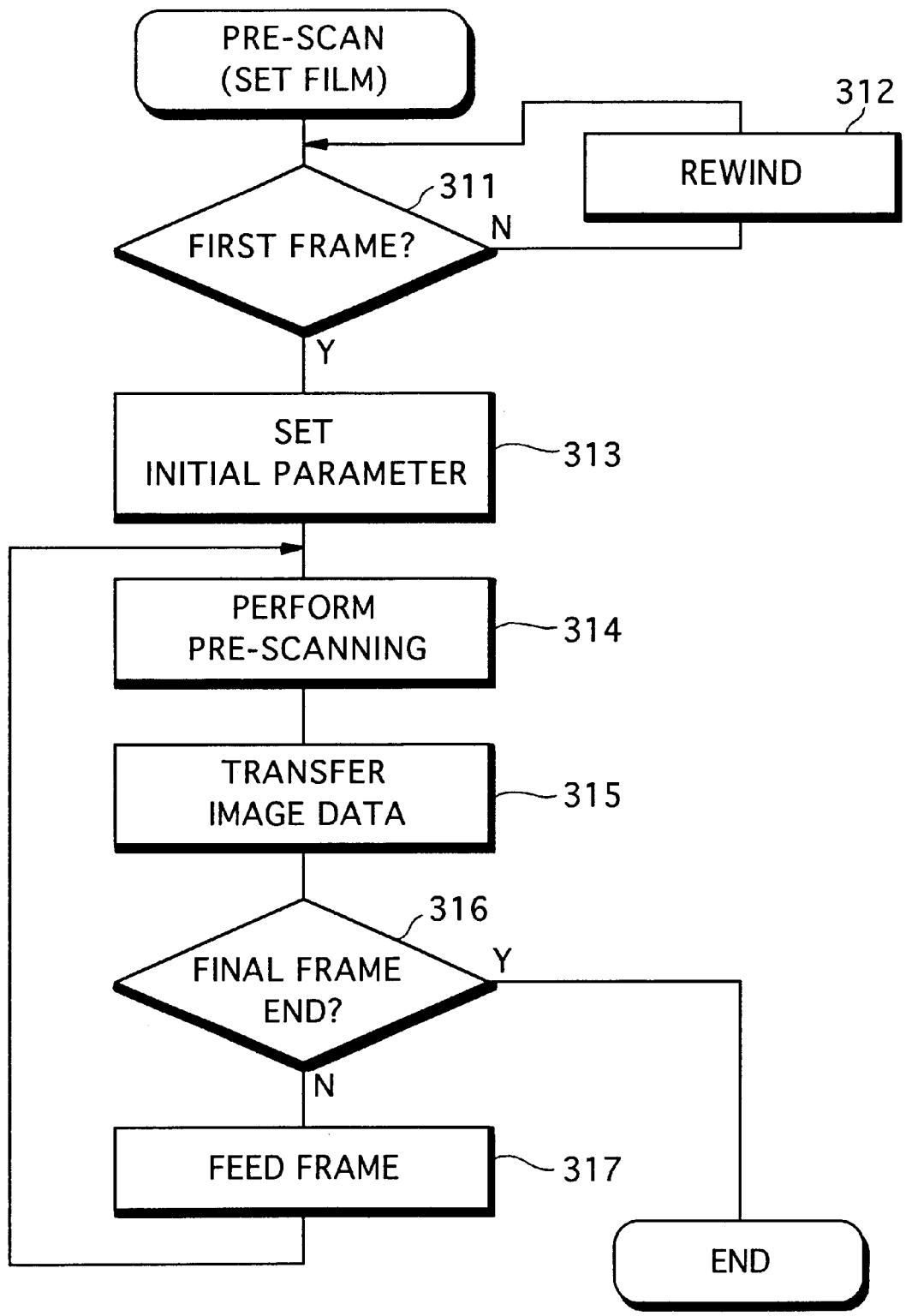
FIG. 62 is a flowchart showing a prescan operation in a film scanner.

FIG. 61 illustrates the operation of the CPU 91 of computer 90 which controls the prescanning operation in the film scanner 100. FIG. 62 illustrates the prescanning operation in the film scanner.

The power supply of the film scanner 100 is turned on and the film to be read is set in the film scanner. Whether the first frame is at the scanning position is checked in the film scanner 100 (step 311). The position of the first frame of the film is provided with a mark or the like to indicate this. By way of example, a symbol such as a hole provided at the position of the first frame of the film and indicating that this frame is the first frame may be read optically. Alternatively, in a new type of film coated with a transparent magnetic layer, the number of frames and the frame numbers are magnetically recorded on the film. Whether or not a frame is the first frame can be recognized by reading these. If the first frame of the film is not at the scanning position, the film is rewound and the first frame is positioned at the scanning position (step 312). As a result, the file scanner 100 is placed in the operative state.

The CPU 91 checks the status of the film scanner 100 and sends initial parameters for prescanning to the film scanner 100 (step 302) if the film scanner is in the operative state (YES at step 301). The initial parameters include the feed pitch of the film (resolution is diminished in comparison with that of main scanning), brightness and color correction values (these are all default values, namely predetermined values).

When the initial parameters are set in the film scanner (step 313), the CPU 91 verifies the fact (step 303), instructs the film scanner 100 to prescan the first frame (step 304) and then instructs the film scanner 100 to transfer the image data obtained by prescanning (305).

In response, the film scanner 100 scans the image of the first frame of the film and obtains image data representing this image (step 314). This digital image data is sent to the CPU 91 (step 315).

Upon accepting the image data (306), the CPU 91 generates the parameters for the main scan based upon the image data and stores the parameters in the memory 92 in correspondence with the frame number (step 307). Further, the CPU instructs the film scanner 100 to advance the film by one frame (step 309).

In response to the instruction for frame feed, the film scanner 100 positions the next frame at the scanning position (step 317).

The issuance of the prescanning instruction and the issuance of the instruction for sending the image data (steps 304, 305) executed by the CPU 91, the prescanning of an image of one frame and the sending of the image data obtained (steps 314, 315) executed by the film scanner 100 in response, and the generation of parameters (step 307) by the CPU 91 based upon the accepted image data are repeated until this processing has been applied to the final frame (steps 308, 316). The judgment as to whether or not a frame is the final frame is performed in the film scanner 100 based upon a hole, mark or magnetic data attached to the film.

Figure 63:
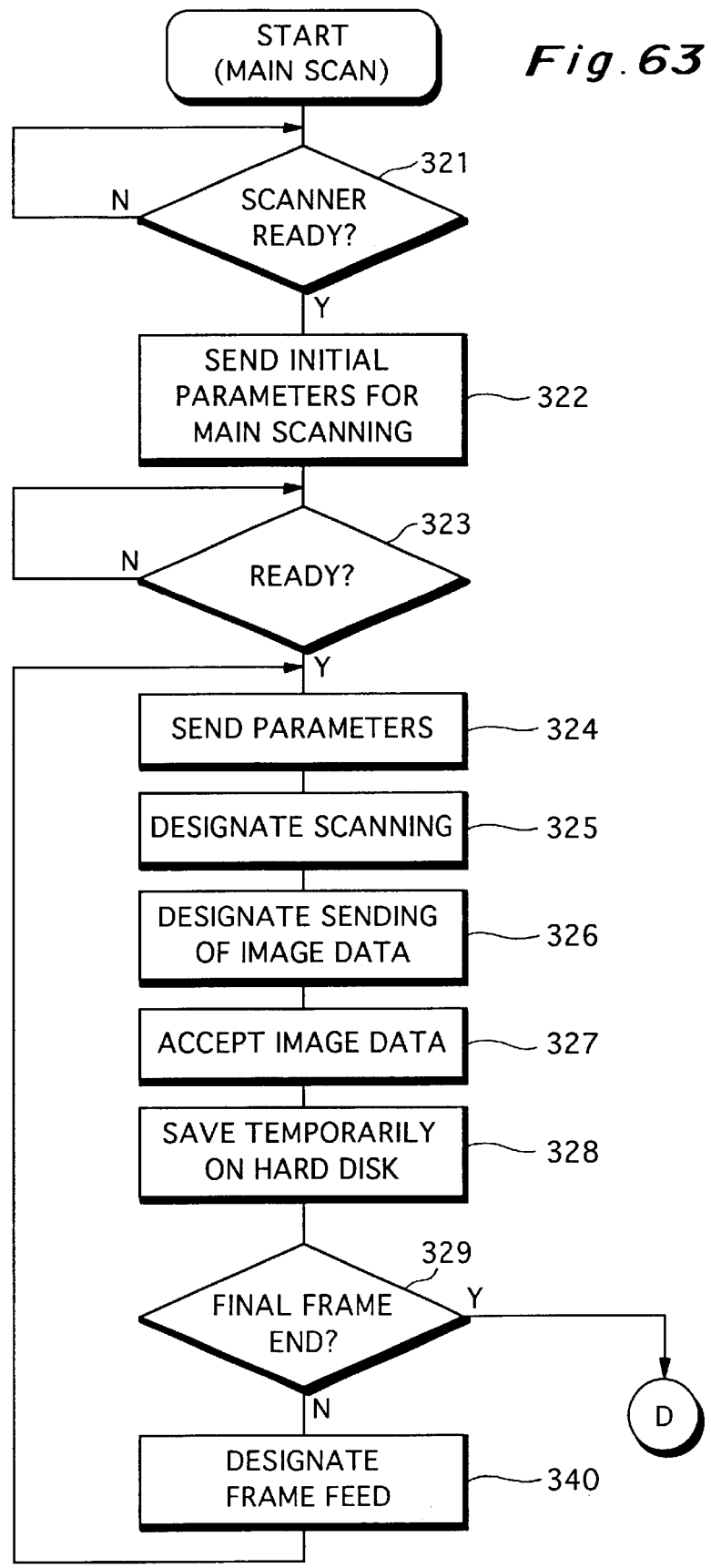
FIG. 63 is a flowchart showing a control procedure executed by a CPU for main scan processing.
Figure 64:
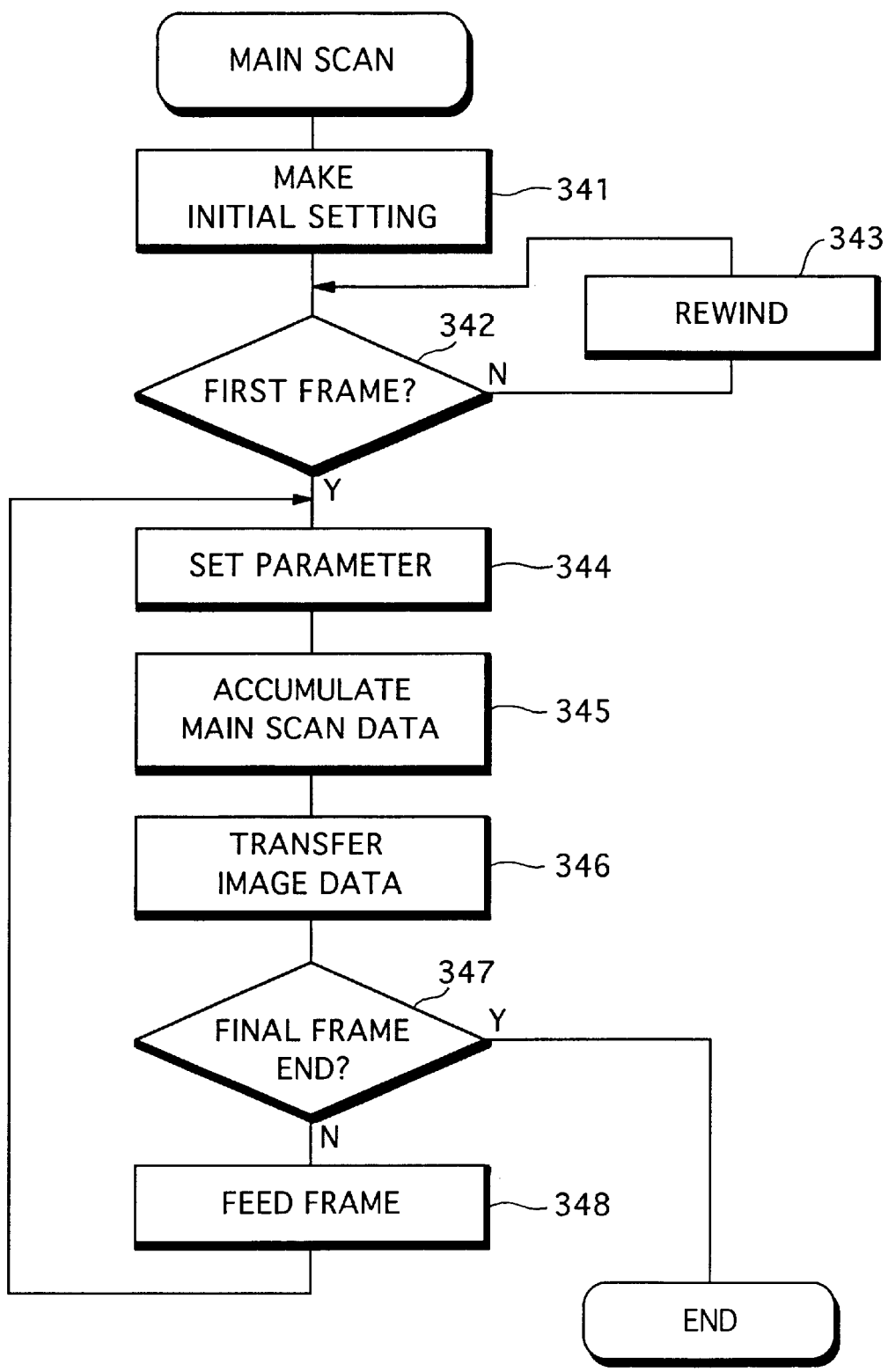
FIG. 64 is a flowchart showing the main scan operation in the film scanner.

FIG. 63 illustrates the operation of the CPU 91 which controls the main scanning operation of the film scanner 100. FIG. 64 illustrates the main scanning operation in the film scanner 100. only the steps that differ from those of prescanning processing will be described.

The CPU 91 sends initial parameters for main scanning to the film scanner 100 (step 322). The initial parameters include the feed pitch of the film. This feed pitch is for obtaining a high resolution and is set in such a manner that a resolution of, say, 2048×3072 pixels is obtained.

Further, the parameters (brightness, color correction values, etc.) created for each frame in prescanning processing are applied to the film scanner 100 by the CPU 91 every main scan of each frame (step 324).

The film scanner 100 responds by setting the parameters, which have been furnished by the CPU 91, prior to the scanning of each frame (step 344).

The film scanner 100 accumulates the obtained high-resolution digital image data in the memory 103 while scanning the image of each frame (step 345). When the scanning of one frame of an image ends, the film scanner 100 sends the obtained image data to the CPU 91 (step 346). It goes without saying that trimming and enlargement processing and the like may be performed when the image data of each frame of the film is obtained.

The CPU 91 controls the hard disk driver 94 in such a manner that the image data transferred from the film scanner 100 is saved temporarily on the hard disk (steps 327, 328).

Figure 65:
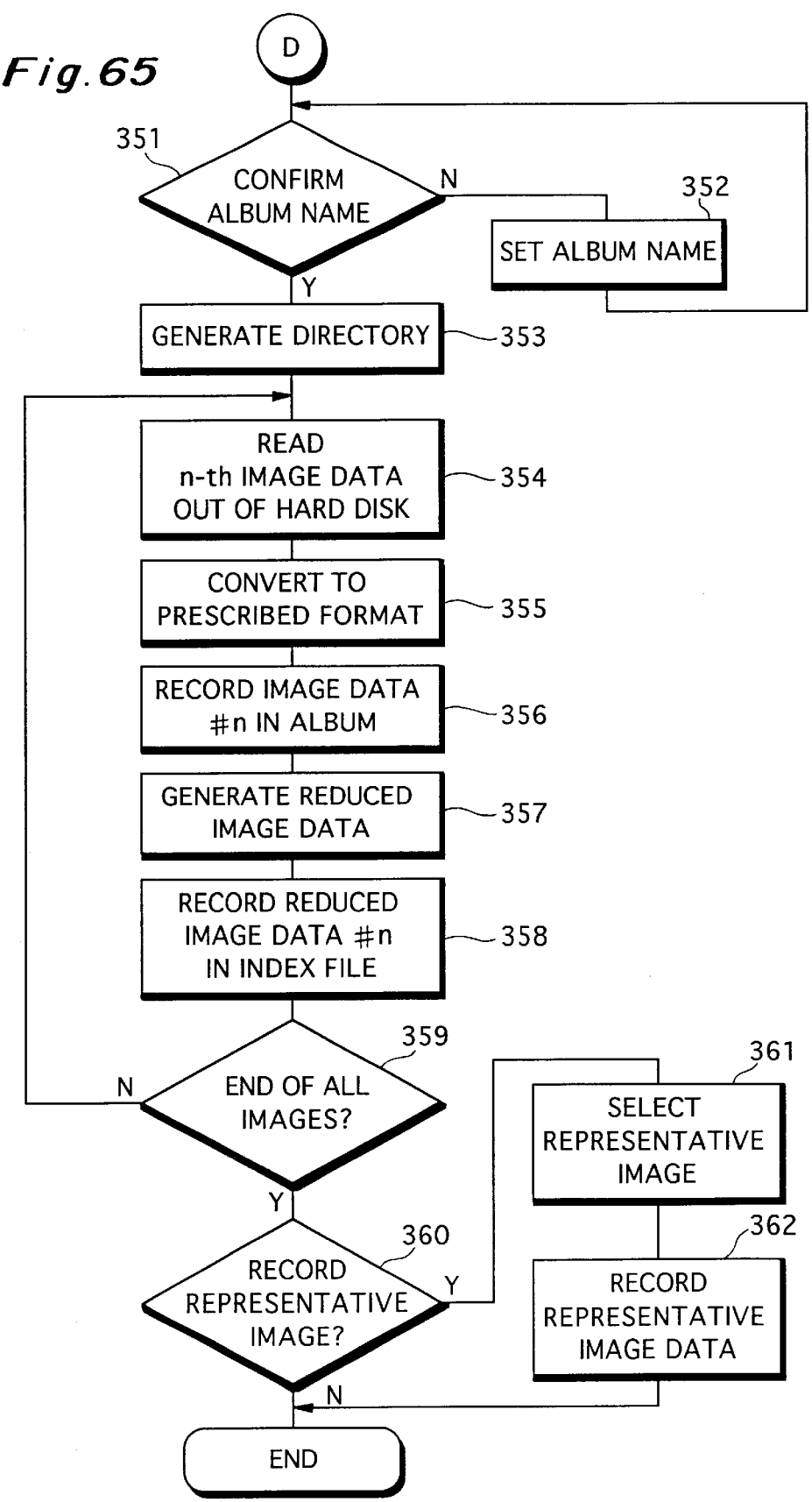
FIG. 65 is a flowchart showing a processing procedure executed by a CPU to create an album and an index file.

When the image data regarding all frames on one roll of film is accepted and saved on the hard disk, the CPU 91 shifts to processing for editing these items of image data and storing them on the optical disk. This processing is illustrated in FIG. 65.

Basically, one name is assigned to a collection (image file) of image data obtained from one roll of film. Here the name is referred to as the "album name" (generally the file name). As will be set forth later, the album name or file name can be given a hierarchical structure.

In the computer system 90, the album name is entered from the input unit in accordance with an indication displayed on the display screen (steps 351, 352). In a case where the album name has been used in the past, it will suffice if the operator makes an entry verifying the album name displayed. The creation of a directory (the addition of directory data) in the optical disk is carried out using the entered or verified album name (step 353).

The image data of an n-th (n=1, 2, 3, . . . ) image (frame) stored temporarily in the hard disk is read out (step 354), converted to a predetermined format (the conversion includes image data compression) and written in the album (image file) in the optical disk (steps 355, 356).

Furthermore, reduced image data representing the reduced image of the n-th image is created (step 357). The reduced image data is generated by pixel elimination (thinning out), averaging processing, etc. The reduced image data is stored in the index file in the optical disk (step 358).

The processing of steps 354–358 is applied successively, image by image (frame by frame), to all image data saved temporarily on the hard disk.

When the storage of all image data on the optical disk is finished (YES at step 359), a representative image is selected (steps 360, 361). The reduced images created earlier are displayed on the display unit of the computer 90 and the operator selects a reduced image that directly expresses the images contained in one roll of film (or that the operator believes will be useful for retrieval performed at a later date). The data of the reduced image that has been selected is registered in the index file as representative image data (step 362).

Thus, image data representing all of the images appearing on one roll of film, reduced image data representing these images in reduced form, and representative image data are recorded on the optical disk in consolidated form under one album name (file name).

A reduced image or a representative image is utilized when retrieving the images on the film or the film itself at a later date. This greatly facilitates search and retrieval.

The image data contained on plural rolls of film may be stored on the optical disk as one set under one album. This would be effective in a case where photographs on plural rolls of film are taken for one event. In this case also it is preferred that a film number be assigned to each roll of film so as to identify these rolls of film.

Also, in a case where image data is read out of a memory card, the image data read out of the memory card would be stored temporarily on the hard disk, in a manner similar to that of the above-described processing, and the processing illustrated in FIG. 65 would be executed. In this case also all of the image data read out of one memory card (or out of a plurality of memory cards if required) would be treated as one set and would have one album name assigned to it.

The same holds true for a case where image data read out of the hard disk or floppy disk is stored on the optical disk. In a case where a plurality of mutually identifiable image files (collections of image data representing a plurality of images) having respective file names have already been created in these disks, each of these image files may be stored on the optical disk as a single class unit.

FIGS. 66 through 69 illustrate the recording format (data structure) in a copy-destination recording medium for recording an album and an index file in units of the copy-source medium (or in units of the image files recorded on the copy-source recording medium).

Figure 66:
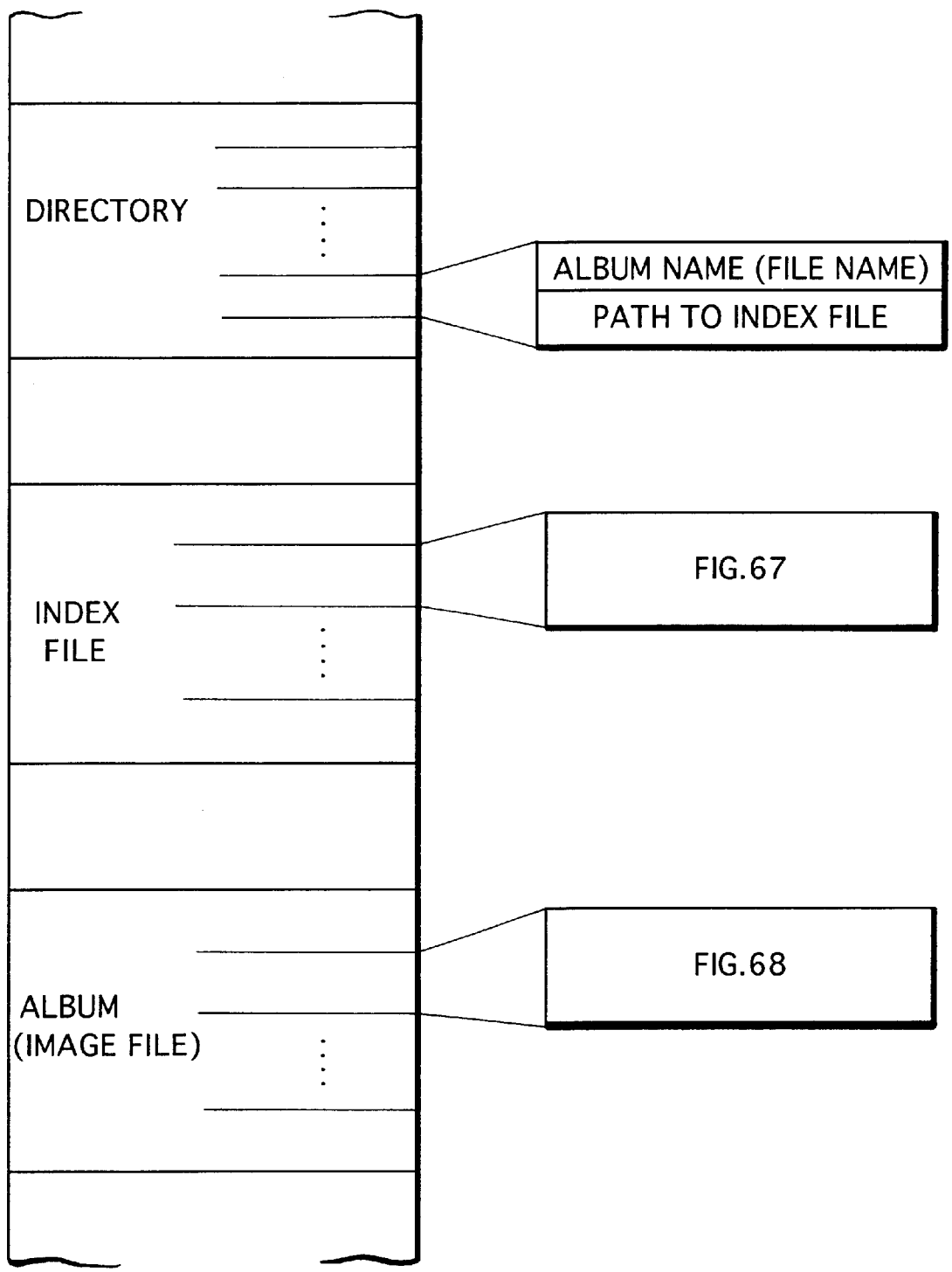
FIG. 66 is a diagram showing the entirety of a recording format in a copy-destination recording medium.

FIG. 66 illustrates the overall recording structure, which is provided with a directory, index files and albums (image files). The album name, such as "FIELD DAY", "SUMMER FESTIVAL" and "FAMILY EXCURSION", and the path to the index file of this album (the path is the offset or address length up to each index file or other information necessary for accessing each index file) are set forth in the directory on a per-album basis.

A large number of albums can also be classified according to a hierarchical structure. For example, the albums may be classified by year, such as 1991, 1992, 1993 and 1994 in the upper level of the hierarchy. There would be lower levels of the hierarchy under this broad classification. For example, each year may be classified by season, such as spring, summer, autumn and winter. Accordingly, an album name would read "1993, SPRING", "1994, SUMMER". In such case a directory would be provided with subdirectories and the retrieval route of each album would be described in a subdirectory.

Smaller classes may be provided to furnish three or more hierarchical levels. For example, an album name may be set in the manner "1994, SUMMER, 'SUMMER FESTIVAL'", "1994, SUMMER, 'FIREWORKS'".

Figure 67:
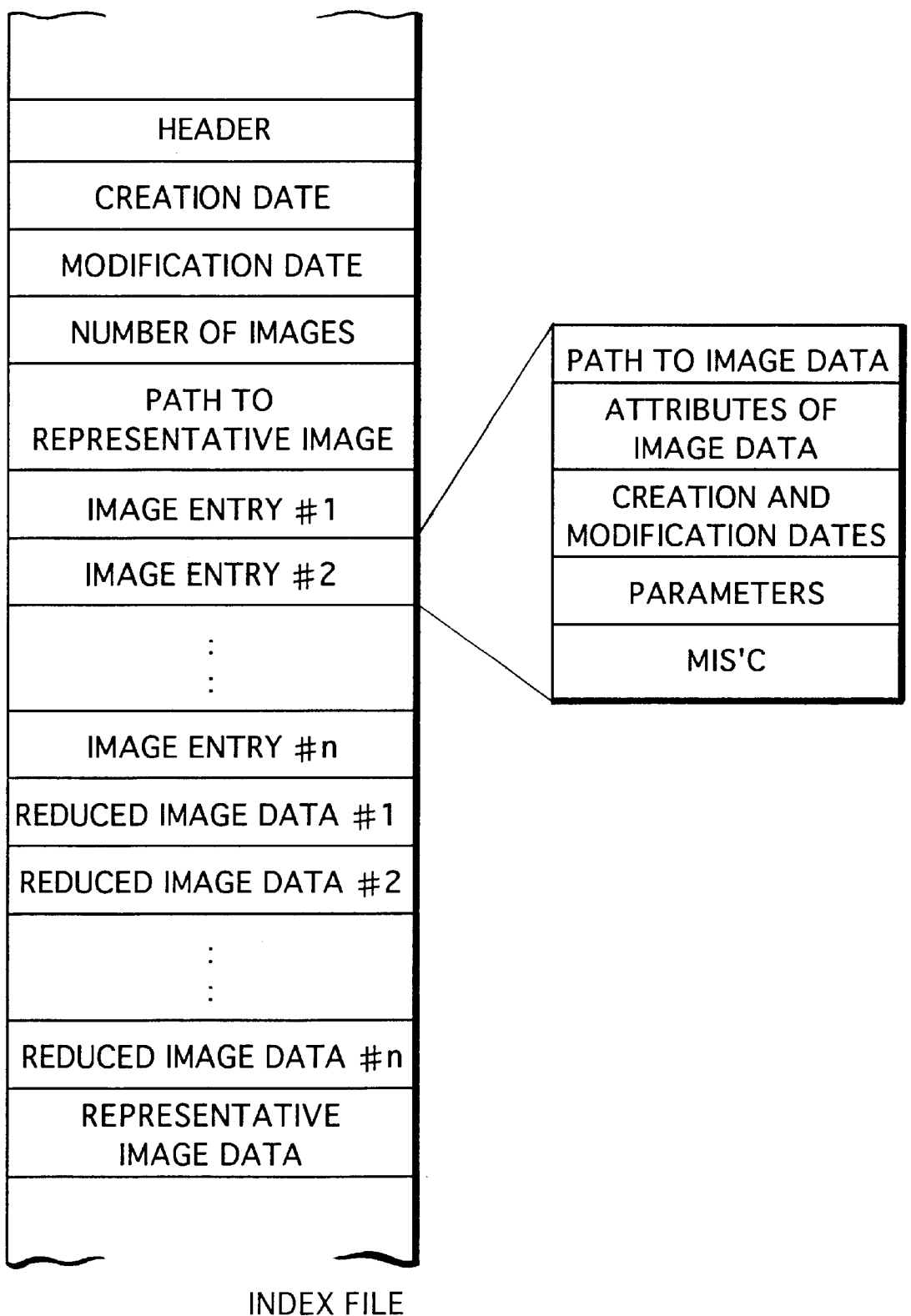
FIG. 67 is a diagram showing an example of an index file.

FIG. 67 illustrates an example of an index file regarding one album (image file). An index file header, the date on which the index file was created, the date on which the index file was modified, the number (n, for example) of images (frames) stored in this album (index file), the path to the representative image of this album, image entries the number of which is equivalent to the number n of images, reduced image data regarding each of the n-number of images and representative image data are recorded in the index file. Since the data lengths of all of these items are fixed, all of the items can be accessed from the position of the header.

Instead of the path to the representative image, the representative image data may be stored at this position. If it is decided in advance that the representative image data will be placed at the end of all of the reduced image data, then the path to the representative image will be unnecessary.

Described in the image entry are the path for accessing the image data of the particular frame stored in the album (image file), the attributes (e.g., the direction of rotation of the image, namely vertical or horizontal, or the angle thereof) of the image or image data, the image data creation date and modification date, parameters (a keyword directly representing the image, the brightness of the image, the camera shutter speed prevailing when this image was obtained, etc.) regarding the image data, and other information.

Figure 68:
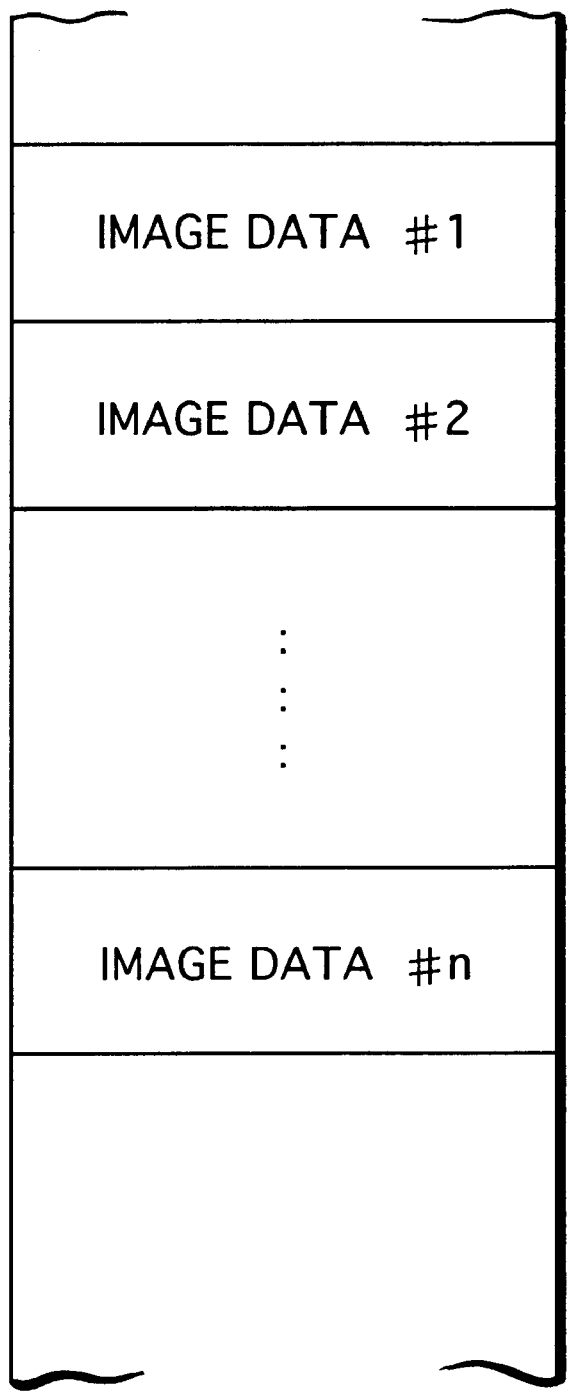
FIG. 68 is a diagram showing an example of an album (image file)

FIG. 68 illustrates the structure of an album (image file). As shown in FIG. 68, n frames of image data contained in one album are stored in the file.

Figure 69:
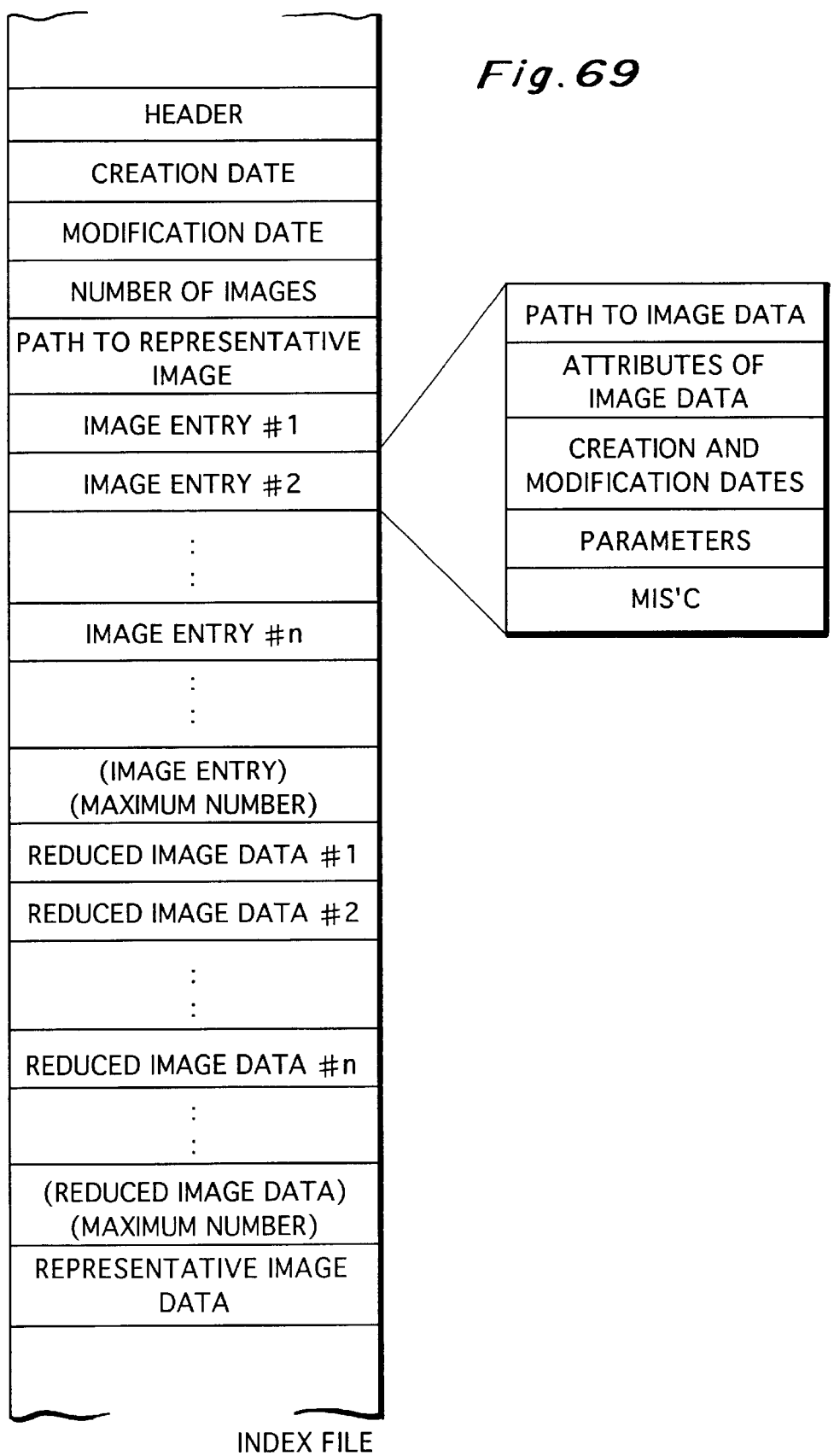
FIG. 69 is a diagram showing another example of an index file.

Photographic films are available in 12-, 24- and 36-exposure formats, by way of example. Since the number of frames included on a roll of film differs depending upon the type of format, the number of images contained in one album also differs. In order that an index file will be compatible with all types of copy-source recording media that may be utilized, areas which store image entries and areas which store reduced image data may be provided beforehand in a number equivalent to the maximum number of images contained in all types of copy-source recording media. An index file thus created is illustrated in FIG. 69.

FIGS. 70 through 73 illustrate another example of a recording format in a copy-destination recording medium.

Figure 70:
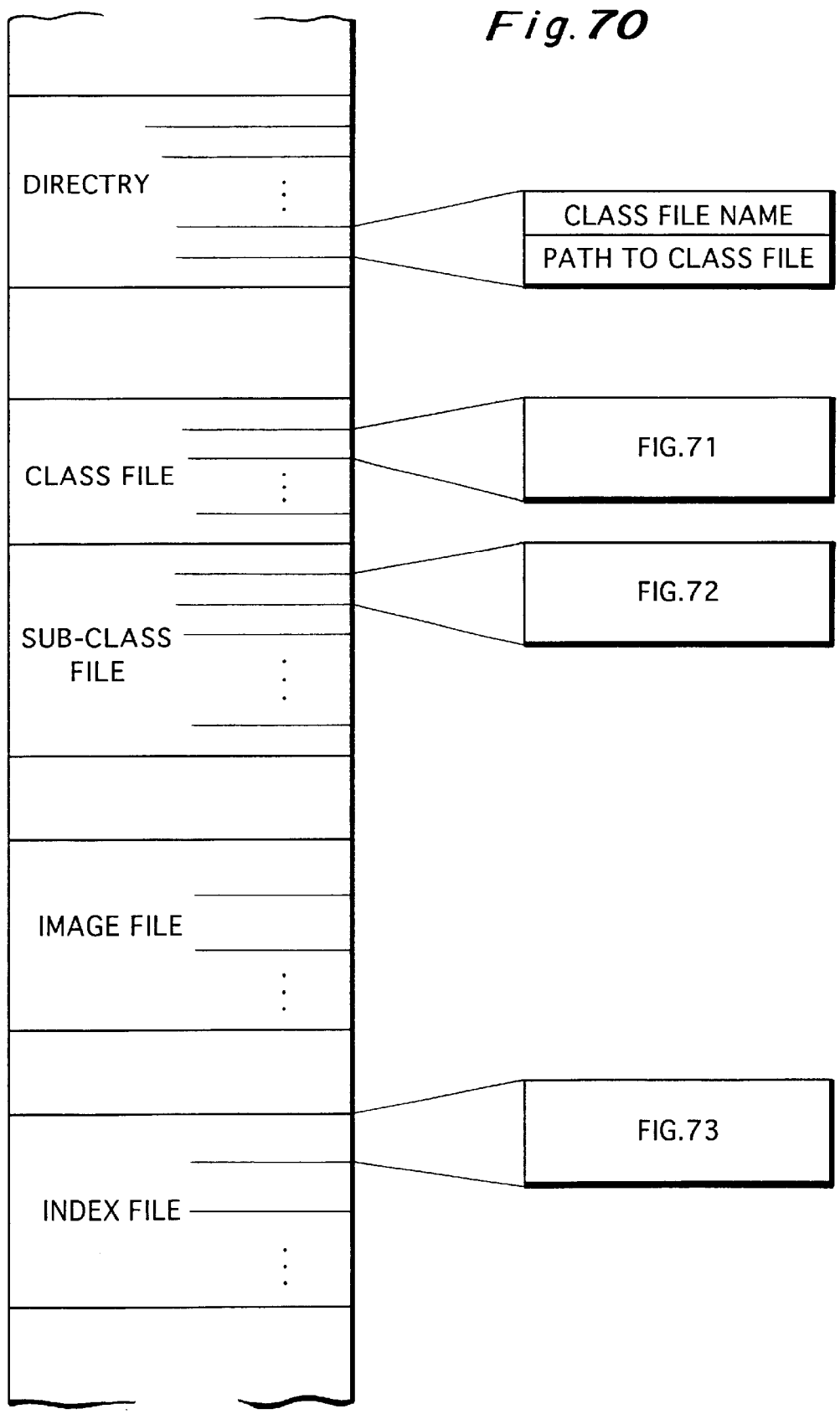
FIG. 70 is a diagram showing an example of a recording format in a copy-destination recording medium.

As shown in FIG. 70, a class file is provided in order to describe the higher-order classification of an album and a subclass file is provided in order to described the lower-order classification of the album. Furthermore, directories, image files and index files are provided.

Information for accessing a class file for the higher-order classification is stored in a directory.

Figure 71:
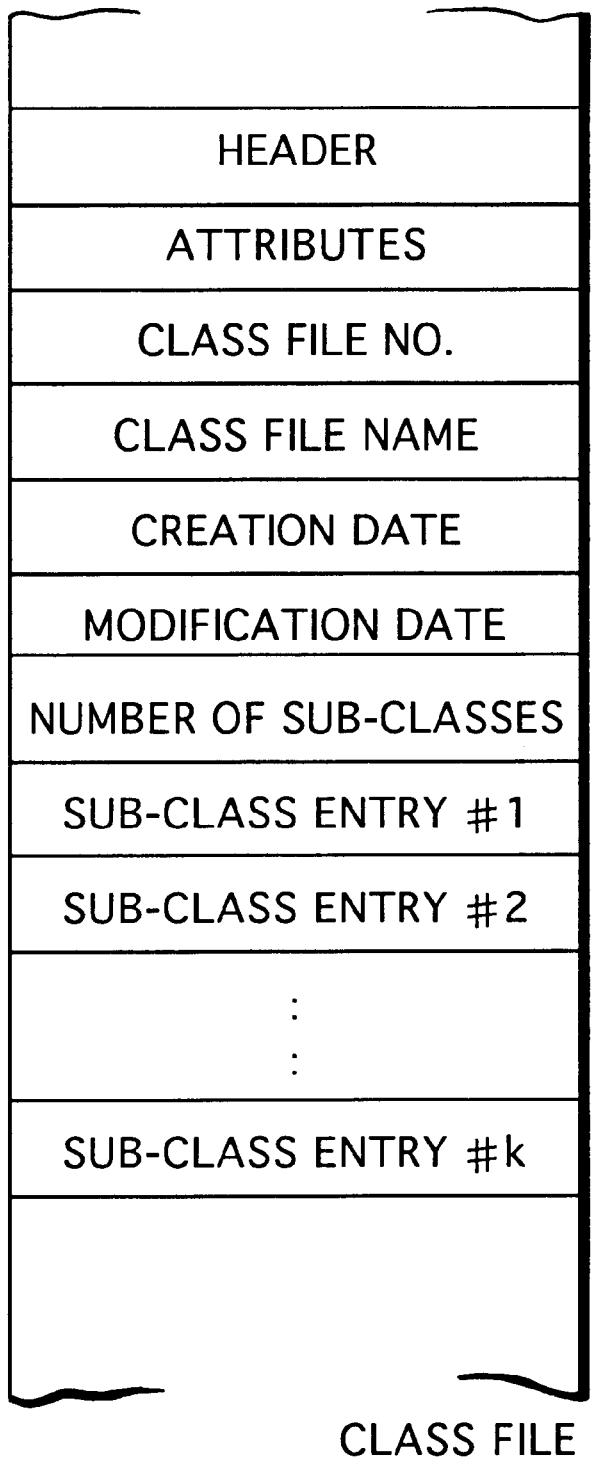
FIG. 71 is a diagram showing an example of a class file.

As shown in FIG. 71, a class file includes a class file header, the class file attributes (depth of the hierarchical level from the route), consecutive number of the class file, class file name, class file creation date and modification date, the number of subclasses belonging to this class file and the subclass entries (the number of which is equivalent to the number of subclasses), etc. Each subclass entry includes information such as the path to the subclass.

Figure 72:
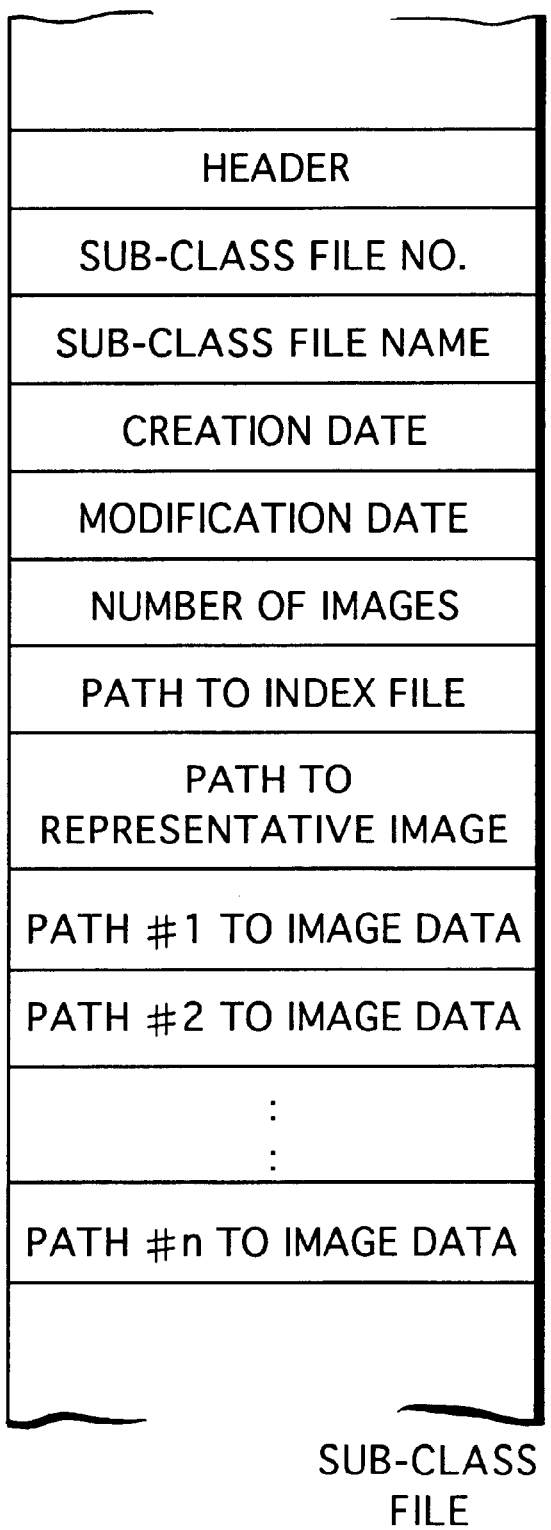
FIG. 72 is a diagram showing an example of a sub-class file.

The content of a subclass file is shown in FIG. 72. Information relating to an image contained in a subclass (i.e., an album) and information relating to an index file is described in this subclass file. Image data (an image file or album) and index file can be accessed using the information of the subclass file. An arrangement may be adopted in which a path to each item of reduced image data is recorded instead of a path to an index file.

Figure 73:
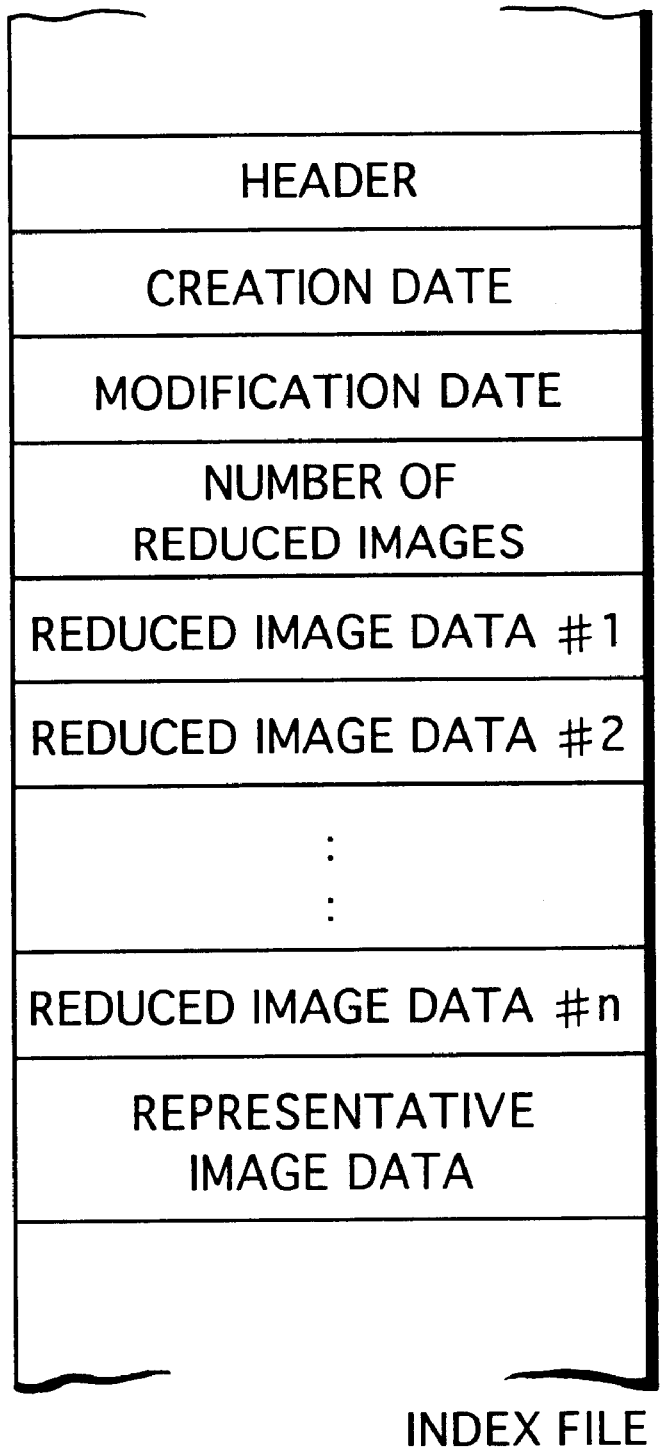
FIG. 73 is a diagram showing an example of an index file.

FIG. 73 illustrates an index file. The index file includes reduced image data.

In a case where a lower-order classification is unnecessary, the subclasses are not provided. In a case where smaller classification is required, it goes without saying that class files of an order lower than that of the subclasses would be provided.

File structures having various formats are conceivable, as set forth above. In any case, it will suffice if the format is one in which image data and the index file thereof (inclusive of reduced image data) can be recorded with the copy-source recording medium serving as one unit.

Retrieval is facilitated if the representative image of the copy-source recording medium is used by being displayed on a menu screen that is for the purpose of searching the recording medium. The album names (file names) of a plurality of copy-source recording media are displayed on the menu screen along with the representative images of these album names. The user can observe the representative images and readily retrieve a desired copy-source recording medium in the copy-destination recording medium.

The reduced images are used to retrieve, in the copy-destination recording medium, any of a plurality of images in one copy-source recording medium. Since the reduced images of a plurality of images contained in one copy-source recording medium are displayed on the menu screen, the user is capable of selecting a desired reduced image from among these images.

As many apparently widely different embodiments of the present invention can be made without departing from the spirit and scope thereof, it is to be understood that the invention is not limited to the specific embodiments thereof except as defined in the appended claims.

What is claimed is:

1. A system for copying image data, comprising:
   an image data reader for reading image data out of a copy-source recording medium image by image;
   an image data writing device for writing data, which includes the image data read out of the copy-source recording medium, to a copy-destination recording medium;
   a control means for creating, image by image, reduced image data representing images obtained by reducing images represented by the image data read out of the copy-source recording medium, and for controlling said image data writing device so as to write the data to the copy-destination recording medium in such a manner that an index file, which includes the created reduced image data, is formed on the copy-destination recording medium, and in such a manner that an image file, which includes the image data that has been read out of the copy-source recording medium, is formed in a manner associated with the index file on the copy-destination recording medium; and processing means for receiving information regarding an album, including an album name, wherein the album is formed on the copy-destination medium and includes the image file and the index file including reduced image data.

2. The system according to claim 1, wherein said control means performs control in such a manner that image data of an image typifying the images on the copy-source recording medium is written on the copy-destination recording medium in association with the image file or index file.

3. The system according to claim 1, wherein in a case where the copy-source recording medium includes a plurality of image files, said control means performs control in such a manner that said index file and said image file are formed in units of the image files of the copy-source recording medium.

4. The system according to claim 1, further comprising a temporary storage device for temporarily storing image data read out of the copy-source recording medium.

5. The system of claim 1, wherein the copy-source recording medium is an electronic recording medium.

6. The system of claim 1, wherein the copy-destination recording medium is an electronic recording medium.

7. A method of copying image data, comprising the steps of:

receiving information regarding an album, including an album name;

reading image data out of a copy-source recording medium image by image;

creating, image by image, reduced image data representing images obtained by reducing images represented by the image data read out of the copy-source recording medium; and recording an image file, which includes the image data that has been read out of the copy-source recording medium, and an index file, which includes the created reduced image data, on a copy-destination recording medium so that the image file and index file are associated with each other, wherein the album is formed on the copy-destination medium and includes the image file and the index file including the reduced image data.

8. The method according to claim 7, wherein the reduced image data is created immediately after the image data is read out of the copy-source recording medium or immediately before or after the image data is written on the copy-destination recording medium.

9. The method according to claim 7, wherein representative image data typifying the images on the copy-source recording medium is written on the copy-destination recording medium in association with the image file or index file.

10. The method according to claim 9, wherein the representative image data is reduced image data.

11. The method according to claim 7, wherein in a case where the copy-source recording medium includes a plurality of image files, said index file and said image file are recorded on the copy-destination recording medium in units of respective ones of the image files.

12. The method of claim 7, wherein both the image file and index file are formed in units of the copy-source recording medium.

13. A system for copying image data, comprising:

an image data reader for reading image data out of a copy-source recording medium image by image;

an image data writing device for writing data, which includes the image data read out of the copy-source recording medium, to a copy-destination recording medium which is different from the copy-source recording medium;

a controller structured and arranged to create, image by image, reduced image data representing images obtained by reducing images represented by the image data read out of the copy-source recording medium, and to control said image data writing device so as to write the data in the copy-destination recording medium in such a manner that an index file, which includes the created reduced image data, is formed on the copy-destination recording medium, and in such a manner that an image file, which includes the image data that has been read out of the copy-source recording medium, is formed in units of the copy-source recording medium in a manner associated with the index file on the copy-destination recording medium;

processing means for receiving information regarding an album, including an album name, wherein the album is formed on the copy-destination medium and includes the image file and the index file including reduced image data.

14. The system according to claim 13, wherein said controller is structured and arranged to perform control in such a manner that image data of an image typifying the images on the copy-source recording medium is written on the copy-destination recording medium in association with the image file or index file.

15. The system according to claim 13, wherein in a case where the copy-source recording medium includes a plurality of image files, said controller is structured and arranged to perform control in such a manner that said index file and said image file are formed in units of the image files of the copy-source recording medium.

16. The system according to claim 13, further comprising a temporary storage device for temporarily storing image data read out of the copy-source recording medium.

17. The system of claim 13, wherein the copy-source recording medium is an electronic recording medium.

18. The system of claim 13, wherein the copy-destination recording medium is an electronic recording medium.

19. A method of copying image data, comprising the steps of:

receiving information regarding an album, including an album name;

reading image data out of a copy-source recording medium image by image;

creating, image by image, reduced image data representing reduced images obtained by reducing images represented by the image data read out of the copy-source recording medium; and recording an image file, which includes the image data that has been read out of the copy-source recording medium, and an index file, which includes the created reduced image data, on a copy-destination recording medium so that the image file and index file are associated with each other, and are in units of the copy-source recording medium, wherein the album is formed on the copy-destination medium and includes the image file and the index file including the reduced image data.

20. The method according to claim 19, wherein the reduced image data is created immediately after the image data is read out of the copy-source recording medium or immediately before or after the image data is written on the copy-destination recording medium.

21. The method according to claim 19, wherein representative image data typifying the images on the copy-source recording medium is written on the copy-destination recording medium in association with the image file or index file.

22. The method according to claim 21, wherein the representative image data is reduced image data.

23. The method according to claim 19, wherein in a case where the copy-source recording medium includes a plurality of image files, said index file and said image file are recorded on the copy-destination recording medium in units of respective ones of the image files.

* * * * *